United States Patent
Rhyne et al.

(10) Patent No.: US 12,505,029 B2
(45) Date of Patent: Dec. 23, 2025

(54) SYSTEMS, METHODS, AND GRAPHICAL USER INTERFACES FOR GENERATING A COMPUTER-EXECUTABLE USABILITY STUDY APPLICATION

(71) Applicant: JMP Statistical Discovery LLC, Cary, NC (US)

(72) Inventors: Jacob Davis Rhyne, Dallas, NC (US); Mark Wallace Bailey, Haddonfield, NJ (US); Ryan Adam Lekivetz, Cary, NC (US); Peng Liu, Naperville, IL (US); Joseph Albert Morgan, Raleigh, NC (US); Laura Castro-Schilo, Chapel Hill, NC (US)

(73) Assignee: JMP Statistical Discovery LLC, Cary, NC (US)

( * ) Notice: Subject to any disclaimer, the term of this patent is extended or adjusted under 35 U.S.C. 154(b) by 0 days.

(21) Appl. No.: 18/420,858

(22) Filed: Jan. 24, 2024

(65) Prior Publication Data
US 2025/0004932 A1    Jan. 2, 2025

Related U.S. Application Data

(60) Provisional application No. 63/601,671, filed on Nov. 21, 2023, provisional application No. 63/523,597, filed on Jun. 27, 2023.

(51) Int. Cl.
G06F 9/44       (2018.01)
G06F 11/3668    (2025.01)
G06F 11/3698    (2025.01)

(52) U.S. Cl.
CPC ...... *G06F 11/3688* (2013.01); *G06F 11/3698* (2025.01)

(58) Field of Classification Search
CPC .................. G06F 11/3688; G06F 11/3664
See application file for complete search history.

(56) References Cited

U.S. PATENT DOCUMENTS

| | | | |
|---|---|---|---|
| 9,483,393 B1 * | 11/2016 | Suttle | G06F 11/3692 |
| 11,087,033 B1 | 8/2021 | Lekivetz et al. | |
| 11,818,227 B1 * | 11/2023 | Kumar | H04L 41/16 |
| 2012/0310618 A1 * | 12/2012 | B'Far | G06F 11/3447 703/13 |
| 2012/0310870 A1 * | 12/2012 | Caves | G06F 11/2247 706/14 |
| 2013/0282626 A1 * | 10/2013 | White | G06F 40/00 706/11 |
| 2013/0346950 A1 | 12/2013 | Horovitz et al. | |
| 2016/0261675 A1 * | 9/2016 | Block | G06F 3/04842 |
| 2017/0128838 A1 * | 5/2017 | Burge | A63F 13/79 |
| 2018/0373799 A1 * | 12/2018 | Koren | G06F 3/0484 |

* cited by examiner

*Primary Examiner* — Bradley A Teets
*Assistant Examiner* — Lenin Paulino
(74) *Attorney, Agent, or Firm* — Padowithz Alce; Quintin Scheitlin; Alce PLLC

(57) ABSTRACT

A system, method, and computer-program product includes obtaining application configuration data; computing, via an execution of a designed experiment, a plurality of application usability tests based on the application configuration data; generating a computer-executable application based at least on the plurality of application usability tests; and deploying the computer-executable application to a target computing environment for execution by one or more users.

31 Claims, 28 Drawing Sheets

FIG. 8

Subject

Type of Study
○ Comparative Study: Use designed experiment to create usability study
● Observational Study: Do not use a designed experiment
○ Choice Study: Give participants sets of images to choose between

Observational Study Tasks
Enter names for the tasks you want participants to complete Fit Model Equivalence Test
FDE Wavelets ☐ Create multiple versions of this usability study. (Randomize order of tasks in each version).
Number of Exercises in Study: 2  *Increase if you want tasks to be repeated.*

[Continue] [Back]

| | Choice Set | Favorite | Least Favorite | Position | Image | Choice | Subject | |
|---|---|---|---|---|---|---|---|---|
| 2202a | 1 | 2 | 3 | 1 | 2 | 1 | 81338315... | |
| 2202b | 2 | 2 | 3 | 2 | 3 | -1 | 81338315... | |
| 2202c | 3 | 2 | 3 | 3 | 4 | 0 | 81338315... | |
| 2202d | 4 | 4 | 3 | 1 | 3 | -1 | 81338315... | |
| 2202e | 5 | 4 | 3 | 2 | 4 | 1 | 81338315... | |
| 2202f | 6 | 4 | 3 | 3 | 1 | 0 | 81338315... | |
| 2202g | 7 | 2 | 1 | 1 | 4 | 0 | 81338315... | |
| 2202h | 8 | 2 | 1 | 2 | 1 | -1 | 81338315... | |
| 2202i | 9 | 2 | 1 | 3 | 2 | 1 | 81338315... | |
| 2202j | 10 | 2 | 3 | 1 | 1 | 0 | 81338315... | |
| 2202k | 11 | 2 | 3 | 2 | 2 | 1 | 81338315... | |
| 2202l | 12 | 2 | 3 | 3 | 3 | -1 | 81338315... | |

FIG. 22

| | Exercise | Time (s) | Finishing Script Result | Participant ID | |
|---|---|---|---|---|---|
| 2302a | 1 | 168.867463 | factors == expectedF... | 9839253662 | |
| 2302b | 2 | 79.808531 | factors[2] == 'Discret... | 9839253662 | |
| 2302c | 3 | 4.711296 | factors == expectedF... | 9839253662 | |
| 2302d | 4 | 0.729744 | factors == expectedF... | 9839253662 | |
| 2302e | 5 | 1.087055 | factors[2] == 'Discret... | 9839253662 | |
| 2302f | 6 | 2.012956 | factors == expectedF... | 9839253662 | |
| 2302g | 7 | 0.944434 | factors == expectedF... | 9839253662 | |
| 2302h | 8 | 0.951009 | factors[2] == 'Discret... | 9839253662 | |

FIG. 23

| | Exercise | Question | Answer | Participant ID |
|---|---|---|---|---|
| 2402a 1 | Exercise 1 | Did you have any trouble completing this exercise? | No | 9839253662 |
| 2402b 2 | Exercise 6 | Did you have any trouble completing this exercise? | No | 9839253662 |
| 2402c 3 | Q&A | 1. Did you find it easier to use the Tarsh Icon or the Delete Icon? | Delete | 9839253662 |
| 2402d 4 | Q&A | 2. Did you use the Undo button? | Not in this demo | 9839253662 |

SYSTEMS, METHODS, AND GRAPHICAL USER INTERFACES FOR GENERATING A COMPUTER-EXECUTABLE USABILITY STUDY APPLICATION

CROSS-REFERENCE TO RELATED APPLICATIONS

This application claims the benefit of U.S. Provisional Application No. 63/601,671, filed on 21 Nov. 2023, and U.S. Provisional Application No. 63/523,597, filed on 27 Jun. 2023, which are incorporated in their entireties by this reference.

TECHNICAL FIELD

This invention relates generally to the usability testing field and, more specifically, to new and useful systems and methods for generating computer-executable usability study applications.

BACKGROUND

A usability study may be conducted to assess the ease of use and effectiveness of a software application. Determining the specific usability tests to include in a traditional usability study is challenging, as it requires a creator of the usability study to carefully balance the inclusion of a diverse set of usability tests with the constraints of time, budget, and personnel available for the study. Typically, these decisions are subjective and rely on the expertise of the creator of the usability study, which may be burdensome, error prone, and impose a significant cognitive load on the creator.

Accordingly, there is a need for new and useful systems and methods that utilize design of experiments (DoE) to automate and optimize the creation of usability studies. The embodiments of the present application provide technical solutions that at least address the needs described above, as well as the deficiencies of the start of the art.

BRIEF SUMMARY OF THE INVENTION(S)

In some embodiments, a computer-program product embodied in a non-transitory machine-readable storage medium storing computer instructions that, when executed by one or more processors, perform operations comprising: obtaining application configuration data specifying a set of possible configurations for one or more features of an application; computing, via an execution of a designed experiment, a plurality of application usability tests based on the application configuration data; generating a computer-executable application based at least on the plurality of application usability tests, wherein the computer-executable application is configured to: present the plurality of application usability tests in a sequence determined by the designed experiment, present, during a respective application usability test of the plurality of application usability tests, one or more representative instances of the application that satisfy usability test conditions of the respective application usability test, and collect activity data associated with one or more user operations during one or more of the plurality of application usability tests; and deploying the computer-executable application to a target computing environment for execution by one or more users.

In some embodiments, the computer-program product further comprises obtaining an input that specifies a respective type of usability study to use to assess the application for usability, wherein: when the respective type of usability study corresponds to a choice usability study, obtaining the application configuration data includes obtaining a plurality of graphical representations of different configurations of the application.

In some embodiments, the application configuration data includes a plurality of graphical representations of different configurations of the application, and a respective application usability test of the plurality of application usability tests defines: a set of graphical representations from the plurality of graphical representations to present via the computer-executable application; a visual layout for presenting the set of graphical representations to the one or more users; and an exercise order value that defines when the computer-executable application is to present the respective application usability test.

In some embodiments, the designed experiment corresponds to a MaxDiff designed experiment when a total number of graphical representations included in the application configuration data exceeds a pre-determined number of graphical representations, and the designed experiment corresponds to a Choice designed experiment when the total number of graphical representations does not exceed the pre-determined number of graphical representations.

In some embodiments, when presenting a respective application usability test computed by the MaxDiff designed experiment, the computer-executable application is configured to prompt the one or more users to select a preferred graphical representation and a least preferred graphical representation from a set of graphical representations specified by the respective application usability test computed by the MaxDiff designed experiment, and when presenting a respective application usability test computed by the Choice designed experiment, the computer-executable application is configured to prompt the one or more users to select a preferred graphical representation from a set of graphical representations specified by the respective application usability test computed by the Choice designed experiment.

In some embodiments, the computer-program product further comprises: obtaining an input that specifies a respective type of usability study to use to assess the application for usability, wherein: when the respective type of usability study corresponds to a comparative usability study, obtaining the application configuration data includes: obtaining a usability task factor defining one or more usability tasks to be assessed in the comparative usability study, obtaining one or more application-configuration factors that each relate to a distinct configurable feature of the application and enumerate possible configurations of the distinct configurable feature, and obtaining one or more response variables that each define a usability objective of the comparative usability study.

In some embodiments, the application configuration data defines a plurality of design of experiment factors including a usability task factor and one or more application-configuration factors, the designed experiment computes the plurality of application usability tests via an optimal design of experiments module, and a respective application usability test of the plurality of application usability tests computed via the optimal design of experiments module defines: a value of the usability task factor during the respective application usability test, a value for each of the one or more application-configuration factors during the respective application usability test, an exercise order value that defines when the computer-executable application is to present the respective application usability test, and a participant value that specifies which of the one or more users is to complete the respective application usability test.

In some embodiments, the plurality of application usability tests include a first application usability test, and presenting, during the first application usability test, the one or more representative instances of the application includes presenting a first instance of the application that is dynamically generated based on values of one or more application-configuration factors in the first application usability test.

In some embodiments, the first application usability test further includes a usability task factor with a value corresponding to a respective usability task, and the first instance of the application is configured to receive one or more user inputs for performing the respective usability task.

In some embodiments, the plurality of application usability tests include the first application usability test and a second application usability test, values of the one or more application-configuration factors in the second application usability test are different from the values of the one or more application-configuration factors in the first application usability test, and presenting, during the second application usability test, the one or more representative instances of the application includes presenting a second instance of the application, different from the first instance of the application, that is dynamically generated based on the values of the one or more application-configuration factors in the second application usability test.

In some embodiments, the plurality of application usability tests include a first application usability test and a second application usability test, and presenting the plurality of application usability tests in the sequence determined by the designed experiment includes: presenting the first application usability test before the second application usability test if an exercise order value defined in the first application usability test is smaller than an exercise order value defined in the second application usability test, and presenting the first application usability test after the second application usability test if the exercise order value of the first application usability test is larger than the exercise order value of the second application usability test.

In some embodiments, the plurality of application usability tests include a first application usability test, and presenting, during the first application usability test, the one or more representative instances of the application includes: presenting a set of graphical representations associated with the first application usability test, wherein the set of graphical representations are presented according to a visual layout defined by the first application usability test, and presenting the set of graphical representations in association with one or more selectable user interface elements that are configured to receive a user input indicating a preferred graphical representation and a least preferred graphical representation from the set of graphical representations.

In some embodiments, the computer-program product further comprises obtaining an input that specifies a respective type of usability study to use to assess the application for usability, wherein: when the respective type of usability study corresponds to an observational usability study, obtaining the application configuration data includes obtaining a usability task factor defining one or more usability tasks to be assessed in the observational usability study.

In some embodiments, deploying the computer-executable application includes deploying the computer-executable application as a software extension that is accessible to the computer-program product.

In some embodiments, the computer-executable application, once deployed, is launchable by the one or more users, and when launched, the computer-executable application presents the plurality of application usability tests in the sequence determined by the designed experiment and collects the activity data associated with the one or more user operations received during a presentation of one or more of the plurality of application usability tests.

In some embodiments, a computed-implemented method comprises: obtaining application configuration data specifying a set of possible configurations for one or more features of an application; computing, via an execution of a designed experiment, a plurality of application usability tests based on the application configuration data; generating a computer-executable application based at least on the plurality of application usability tests, wherein the computer-executable application is configured to: present the plurality of application usability tests in a sequence determined by the designed experiment, present, during a respective application usability test of the plurality of application usability tests, one or more representative instances of the application that satisfy usability test conditions of the respective application usability test, and collect activity data associated with one or more user operations during one or more of the plurality of application usability tests; and deploying the computer-executable application to a target computing environment for execution by one or more users.

In some embodiments, the computed-implemented method further comprises obtaining an input that specifies a respective type of usability study to use to assess the application for usability, wherein: when the respective type of usability study corresponds to a choice usability study, obtaining the application configuration data includes obtaining a plurality of graphical representations of different configurations of the application.

In some embodiments, the application configuration data includes a plurality of graphical representations of different configurations of the application, and a respective application usability test of the plurality of application usability tests defines: a set of graphical representations from the plurality of graphical representations to present via the computer-executable application; a visual layout for presenting the set of graphical representations to the one or more users; and an exercise order value that defines when the computer-executable application is to present the respective application usability test.

In some embodiments, the designed experiment corresponds to a MaxDiff designed experiment when a total number of graphical representations included in the application configuration data exceeds a pre-determined number of graphical representations, and the designed experiment corresponds to a Choice designed experiment when the total number of graphical representations does not exceed the pre-determined number of graphical representations.

In some embodiments, when presenting a respective application usability test computed by the MaxDiff designed experiment, the computer-executable application is configured to prompt the one or more users to select a preferred graphical representation and a least preferred graphical representation from a set of graphical representations specified by the respective application usability test computed by the MaxDiff designed experiment, and when presenting a respective application usability test computed by the Choice designed experiment, the computer-executable application is configured to prompt the one or more users to select a preferred graphical representation from a set of graphical representations specified by the respective application usability test computed by the Choice designed experiment.

In some embodiments, the computed-implemented method further comprises: obtaining an input that specifies a respective type of usability study to use to assess the application for usability, wherein: when the respective type of usability study corresponds to a comparative usability study, obtaining the application configuration data includes: obtaining a usability task factor defining one or more usability tasks to be assessed in the comparative usability study, obtaining one or more application-configuration factors that each relate to a distinct configurable feature of the application and enumerate possible configurations of the distinct configurable feature, and obtaining one or more response variables that each define a usability objective of the comparative usability study.

In some embodiments, the application configuration data defines a plurality of design of experiment factors including a usability task factor and one or more application-configuration factors, the designed experiment computes the plurality of application usability tests via an optimal design of experiments module, and a respective application usability test of the plurality of application usability tests computed via the optimal design of experiments module defines: a value of the usability task factor during the respective application usability test, a value for each of the one or more application-configuration factors during the respective application usability test, an exercise order value that defines when the computer-executable application is to present the respective application usability test, and a participant value that specifies which of the one or more users is to complete the respective application usability test.

In some embodiments, a computer-implemented system comprises: one or more processors; a memory; a computer-readable medium operably coupled to the one or more processors, the computer-readable medium having computer-readable instructions stored thereon that, when executed by the one or more processors, cause a computing device to perform operations comprising: obtaining application configuration data specifying a set of possible configurations for one or more features of an application; computing, via an execution of a designed experiment, a plurality of application usability tests based on the application configuration data; generating a computer-executable application based at least on the plurality of application usability tests, wherein the computer-executable application is configured to: present the plurality of application usability tests in a sequence determined by the designed experiment, present, during a respective application usability test of the plurality of application usability tests, one or more representative instances of the application that satisfy usability test conditions of the respective application usability test, and collect activity data associated with one or more user operations during one or more of the plurality of application usability tests; and deploying the computer-executable application to a target computing environment for execution by one or more users.

In some embodiments, the application configuration data defines a plurality of design of experiment factors including a usability task factor and one or more application-configuration factors, the designed experiment computes the plurality of application usability tests via an optimal design of experiments module, and a respective application usability test of the plurality of application usability tests computed via the optimal design of experiments module defines: a value of the usability task factor during the respective application usability test, a value for each of the one or more application-configuration factors during the respective application usability test, an exercise order value that defines when the computer-executable application is to present the respective application usability test, and a participant value that specifies which of the one or more users is to complete the respective application usability test.

In some embodiments, the plurality of application usability tests include a first application usability test, and presenting, during the first application usability test, the one or more representative instances of the application includes presenting a first instance of the application that is dynamically generated based on values of one or more application-configuration factors in the first application usability test.

In some embodiments, the first application usability test further includes a usability task factor with a value corresponding to a respective usability task, and the first instance of the application is configured to receive one or more user inputs for performing the respective usability task.

In some embodiments, the plurality of application usability tests include the first application usability test and a second application usability test, values of the one or more application-configuration factors in the second application usability test are different from the values of the one or more application-configuration factors in the first application usability test, and presenting, during the second application usability test, the one or more representative instances of the application includes presenting a second instance of the application, different from the first instance of the application, that is dynamically generated based on the values of the one or more application-configuration factors in the second application usability test.

In some embodiments, the plurality of application usability tests include a first application usability test and a second application usability test, and presenting the plurality of application usability tests in the sequence determined by the designed experiment includes: presenting the first application usability test before the second application usability test if an exercise order value defined in the first application usability test is smaller than an exercise order value defined in the second application usability test, and presenting the first application usability test after the second application usability test if the exercise order value of the first application usability test is larger than the exercise order value of the second application usability test.

In some embodiments, the plurality of application usability tests include a first application usability test, and presenting, during the first application usability test, the one or more representative instances of the application includes: presenting a set of graphical representations associated with the first application usability test, wherein the set of graphical representations are presented according to a visual layout defined by the first application usability test, and presenting the set of graphical representations in association with one or more selectable user interface elements that are configured to receive a user input indicating a preferred graphical representation and a least preferred graphical representation from the set of graphical representations.

In some embodiments, the computer-implemented system further comprises obtaining an input that specifies a respective type of usability study to use to assess the application for usability, wherein: when the respective type of usability study corresponds to an observational usability study, obtaining the application configuration data includes obtaining a usability task factor defining one or more usability tasks to be assessed in the observational usability study.

BRIEF DESCRIPTION OF THE FIGURES

FIGS. 8-10 illustrate example graphical user interfaces for obtaining application configuration data according to at least one embodiment of the present technology.

FIGS. 12-14 illustrate examples of application usability tests computed by a designed experiment according to at least one embodiment of the present technology.

FIGS. 15-21 illustrate example schematics and user interfaces for generating a computer-executable application according to at least one embodiment of the present technology.

FIGS. 22 and 23 illustrate examples of activity data collected by a computer-executable application according to at least one embodiment of the present technology.

FIGS. 25 and 26 illustrate examples of a computer-executable application displaying an application usability tests according to at least one embodiment of the present technology.

DESCRIPTION OF THE PREFERRED EMBODIMENTS

The following description of the preferred embodiments of the inventions are not intended to limit the inventions to these preferred embodiments, but rather to enable any person skilled in the art to make and use these inventions.

DETAILED DESCRIPTION

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional operations not included in a figure. A process may correspond to a method, a function, a procedure, a subroutine, a subprogram, etc. When a process corresponds to a function, its termination can correspond to a return of the function to the calling function or the main function.

Example Systems

Systems depicted in some of the figures may be provided in various configurations. In some embodiments, the systems may be configured as a distributed system where one or more components of the system are distributed across one or more networks in a cloud computing system.

Figure 1:
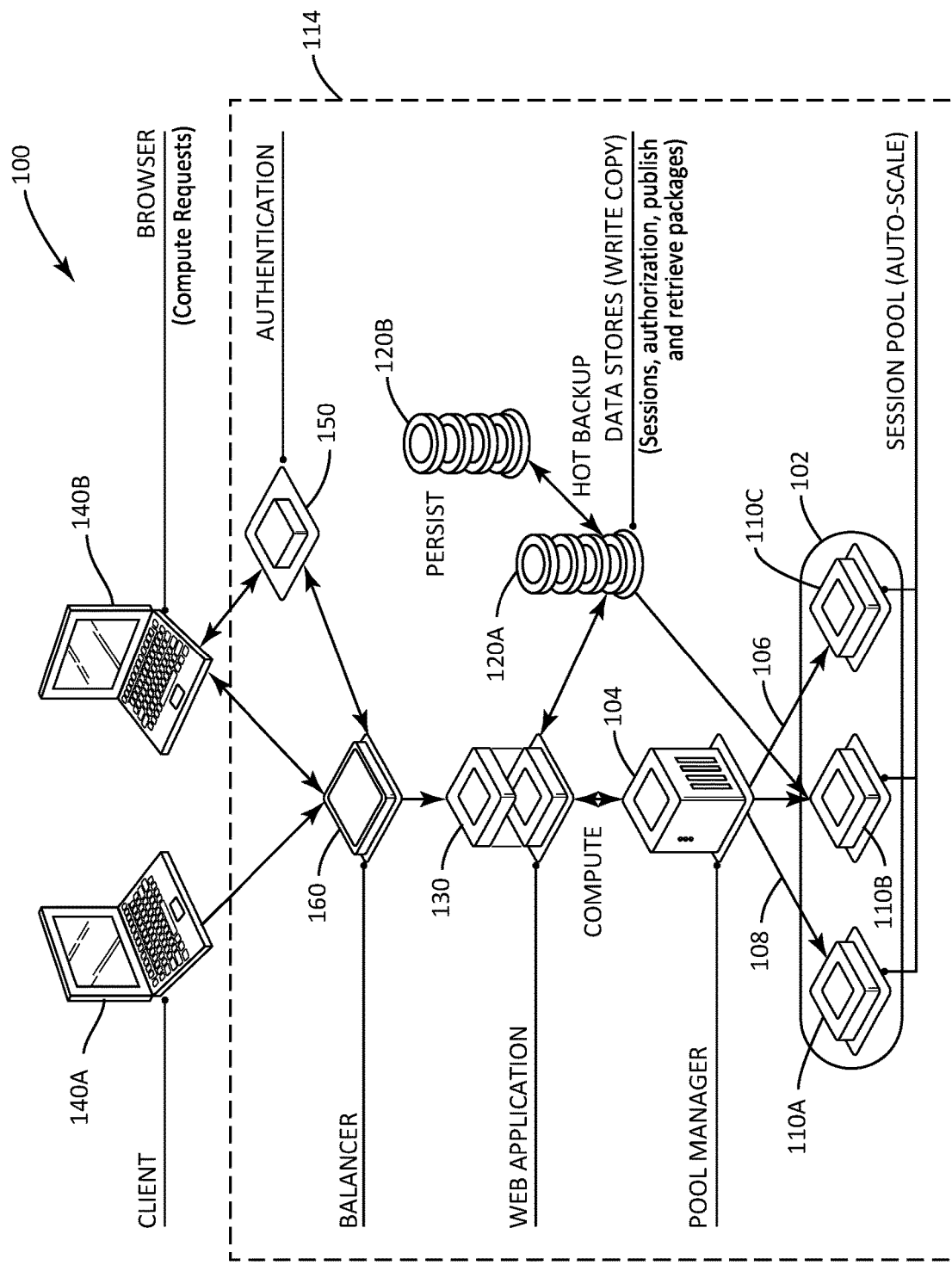
FIG. 1 illustrates an example network, including an example set of devices communicating with each other, according to at least one embodiment of the present technology.

FIG. 1 illustrates an example network 100 including an example set of devices communicating with each other (e.g., over one or more of an exchange system or a network), according to embodiments of the present technology. Network 100 includes network devices configured to communicate with a variety of types of client devices, for example, client devices 140, over a variety of types of communication channels. A client device 140 may be configured to communicate over a public or private network (e.g., client device 140B is configured to support a browser for computing requests or providing authentication).

Network devices and client devices can transmit a communication over a network 100. Network 100 may include one or more of different types of networks, including a wireless network, a wired network, or a combination of a wired and wireless network. Examples of suitable networks include the Internet, a personal area network, a local area network (LAN), a wide area network (WAN), a wireless local area network (WLAN), cloud network, or a cellular network. A wireless network may include a wireless interface or combination of wireless interfaces. As an example, a network in the one or more networks may include a short-range communication channel, such as a Bluetooth or a Bluetooth Low Energy channel. A wired network may include a wired interface. The wired and/or wireless networks may be implemented using routers, access points, base stations, bridges, gateways, or the like, to connect devices in the network. The one or more networks can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS), or other available protocols such as according to an Open Systems Interaction model. In addition, data and/or transactional details may be encrypted. Networks may include other devices for infrastructure for the network. For example, a cloud network may include cloud infrastructure systems on demand. As another example, one or more client devices may utilize an Internet of Things (IoT) infrastructure where things (e.g., machines, devices, phones, sensors) can be connected to networks and the data from these things can be collected and processed within the things and/or external to the things. IoT may be implemented with various infrastructure such as for accessibility (technologies that get data and move it), embed-ability (devices with embedded sensors), and IT services. Industries in the IoT space may include automotive (connected car), manufacturing (connected factory), smart cities, energy and retail.

Network devices and client devices can be different types of devices or components of devices. For example, client device 140 is shown as a laptop and balancer 160 is shown as a processor. Client devices and network devices could be other types of devices or components of other types of devices such as a mobile phone, laptop computer, tablet computer, temperature sensor, motion sensor, and audio sensor. Additionally, or alternatively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, and flow rate sensors. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current. The sensors may be mounted to various components used as part of a variety of different types of systems (e.g., an oil drilling operation). The network devices may detect and record data related to the environment that it monitors, and transmit that data to network 100.

As noted, one type of system that may include various sensors that collect data to be processed and/or transmitted to a computing environment (not shown) according to certain embodiments includes an oil drilling system. For example, the one or more drilling operation sensors may include, for example, surface sensors that measure a standpipe pressure, a surface torque, and a rotation speed of a drill pipe, and downhole sensors that measure a rotation speed of a bit and fluid densities. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, for example, the rate of penetration and pump pressure may also be stored and used for modeling, prediction, or classification.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device or client device may include a home automation switch that may be coupled with a home appliance. In another embodiment, a network or client device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment (e.g., computing environment or another computing environment not shown) according to certain embodiments includes a manufacturing environment (e.g., manufacturing products or energy). A variety of different network devices may be included in an energy pool, such as various devices within one or more power plants, energy farms (e.g., wind farm, and solar farm) energy storage facilities, factories, homes and businesses of consumers. One or more of such devices may include one or more sensors that detect energy gain or loss, electrical input or output or loss, and a variety of other efficiencies. These sensors may collect data to inform users of how the energy pool, and individual devices within the pool, may be functioning and how they may be made more efficient. In a manufacturing environment, image data can be taken of the manufacturing process or other readings of manufacturing equipment. For example, in a semiconductor manufacturing environment, images can be used to track, for example, process points (e.g., movement from a bonding site to a packaging site), and process parameters (e.g., bonding force, electrical properties across a bond of an integrated circuit).

Network device sensors may also perform processing on data it collects before transmitting the data to a computing environment, or before deciding whether to transmit data to a computing environment. For example, network devices may determine whether data collected meets certain rules, for example by comparing data or values calculated from the data and comparing that data to one or more thresholds. The network device may use this data and/or comparisons to determine if the data should be transmitted to a computing environment for further use or processing.

Devices in computing environment 114 may include specialized computers, servers, or other machines that are configured to individually and/or collectively process large amounts of data (e.g., using a session pool 102). The computing environment 114 may also include storage devices (e.g., data stores 120) that include one or more databases of structured data, such as data organized in one or more hierarchies, or unstructured data. The databases may communicate with the processing devices within computing environment 114 to distribute data to them and store data used in the computing environment 114. Computing environment 114 may collect, analyze and/or store data from or pertaining to communications, client device operations, client rules, and/or user-associated actions stored at one or more devices in computing environment 114. Such data may influence communication routing to the devices within computing environment 114, and how data is stored or processed within computing environment 114, among other actions.

Network 100 may also include one or more network-attached data stores 120. Network-attached data stores 120 are used to store data to be processed by the computing environment 114 as well as any intermediate or final data generated by the computing system in non-volatile memory. For instance, data stores 120 can perform functions such as writing and copying data and can provide data storage for network functions such as sessions, authorization, publishing and retrieving packages. In certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores 120 may store a variety of different types of data organized in a variety of different ways and from a variety of different sources. For example, network-attached data stores 120 may include storage other than primary storage located within computing environment 114 that is directly accessible by processors located therein. Network-attached data stores 120 may include secondary, tertiary, auxiliary, or back-up storage (e.g., data storage 120B), such as large hard drives, servers, and virtual memory, among other types. Storage devices may include portable or non-portable storage devices, optical storage devices, and various other mediums capable of storing and containing data (e.g., computer a machine-readable storage medium or computer-readable storage medium such as computer readable medium 210 in FIG. 2).

Furthermore, the data stores may hold a variety of different types of data. For example, network-attached data stores 120 may hold unstructured (e.g., raw) data, such as manufacturing data (e.g., a database containing records identifying products being manufactured with parameter data for each product, such as performance metrics or criteria) or product sales databases (e.g., a database containing individual data records identifying details of individual product performance).

The unstructured data may be presented to the computing environment 114 in different forms such as a flat file or a conglomerate of data records and may have data values and accompanying time stamps. The computing environment 114 may be used to analyze the unstructured data in a variety of ways to determine the best way to structure (e.g., hierarchically) that data, such that the structured data is tailored to a type of further analysis on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Other devices can further be used to influence communication routing and/or processing between devices within computing environment 114 and with devices outside of computing environment 114. For example, as shown in FIG. 1, computing environment 114 may include a device 130 supporting a web application. Thus, computing environment 114 can retrieve data of interest, such as client information (e.g., product information, client rules, etc.), technical product details, news, current or predicted weather, and so on. Balancer 160 can be used to balance and direct load within the computing environment 114. Authentication device 150 can be used to provide authentication or other security protocols for a client device, user or group accessing computing environment 114.

In addition to computing environment 114 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from sensors as the sensors continuously sense, monitor and track changes in their environments. Devices within computing environment 114 may also perform pre-analysis on data it receives to determine if the data received should be processed as part of an ongoing project. The data received and collected by computing environment 114, no matter what the source or method or timing of receipt, may be processed over a period of time for a client to determine results data based on the client's needs and rules.

FIG. 1 includes a pool of devices with a pool manager 104 and session pool 102. Network 100 includes a variety of pool managers (e.g., pool manager 104) and worker nodes 110 (e.g., devices, servers, or server farms of session pool 102), according to embodiments of the present technology. Devices of session pool 102 are communicatively connected (e.g., via communication path 108 and communication path 106). Therefore, the pool manager may transmit information (e.g., related to the session pool 102 or notifications), to and receive information from each other. Although only one pool manager 104 is shown in FIG. 1, the network 100 may include more pool managers or a different kind of device manager (e.g., a dedicated resource manager).

Session pool 102 includes one or more worker nodes (e.g., worker node 110A). Shown in FIG. 1 are three worker nodes 110A-C merely for illustration, more or less worker nodes could be present. For instance, the pool manager 104 may itself be a worker node and may not need further worker nodes to complete a task. A given worker node could include dedicated computing resources or allocated computing resources as needed to perform operations as directed by the pool manager 104. The number of worker nodes included in a session pool 102 may be dependent, for example, upon how large the project or data set is being processed by the session pool 102, the capacity of each worker node, and the time designated for the session pool 102 to complete the project. Each worker node within the session pool 102 may be connected (wired or wirelessly, and directly or indirectly) to pool manager 104. Therefore, each worker node may receive information from the pool manager 104 (e.g., an instruction to perform work on a project) and may transmit information to the pool manager 104 (e.g., a result from work performed on a project). Furthermore, worker nodes 110 may communicate with each other (either directly or indirectly). For example, worker nodes 110 may transmit data between each other related to a job being performed or an individual task within a job being performed by that worker node. However, in certain embodiments, worker nodes 110 may not, for example, be connected (communicatively or otherwise) to certain other worker nodes. In an embodiment, worker nodes may only be able to communicate with the pool manager 104 that controls it, and may not be able to communicate with other worker nodes in the session pool 102.

The pool manager 104 may connect with other devices of network 100 or an external device (e.g., a pool user, such as a server or computer). For example, a server or computer may connect to pool manager 104 and may transmit a project or job to the node. The project may include a data set. The data set may be of any size. Once the pool manager 104 receives such a project including a large data set, the pool manager 104 may distribute the data set or projects related to the data set to be performed by worker nodes 110. Alternatively, for a project including a large data set, the data set may be received or stored by a machine other than a pool manager 104 or worker node 110 (e.g., a Hadoop data node).

Pool managers may maintain knowledge of the status of the worker nodes 110 in the session pool 102 (i.e., status information), accept work requests from clients, subdivide the work across worker nodes 110, and coordinate the worker nodes 110, among other responsibilities. Worker nodes 110 may accept work requests from a pool manager 104 and provide the pool manager 104 with results of the work performed by the worker nodes 110. A session pool 102 may be started from a single node (e.g., a machine, computer, server, etc.). This first node may be assigned or may start as the primary pool manager 104 that will control any additional nodes that enter the session pool 102.

When a project is submitted for execution (e.g., by a client or a pool manager 104), it may be assigned to a set of nodes. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A pool manager may be designated as the primary pool manager among multiple pool managers. A server, computer or other external device may connect to the primary pool manager. Once the pool manager receives a project, the primary pool manager may distribute portions of the project to its worker nodes for execution. For example, when a project is initiated on session pool 102, primary pool manager 104 controls the work to be performed for the project to complete the project as requested or instructed. The primary pool manager may distribute work to the worker nodes 110 based on various factors, such as which subsets or portions of projects may be completed most efficiently and in the correct amount of time. For example, a worker node may perform analysis on a portion of data that is already local (e.g., stored on) the worker node. The primary pool manager also coordinates and processes the results of the work performed by each worker node after each worker node executes and completes its job. For example, the primary pool manager may receive a result from one or more worker nodes, and the pool manager may organize (e.g., collect and assemble) the results received and compile them to produce a complete result for the project received from the end user.

Any remaining pool manager (not shown) may be assigned as backup pool manager for the project. In an embodiment, the backup pool manager may not control any portion of the project. Instead, the backup pool manager may serve as a backup for the primary pool manager and take over as primary pool manager if the primary pool manager were to fail.

To add another node or machine to the session pool 102, the primary pool manager may open a pair of listening sockets, for example. A socket may be used to accept work requests from clients, and the second socket may be used to accept connections from other pool nodes. The primary pool manager may be provided with a list of other nodes (e.g., other machines, computers, servers) that will participate in the pool, and the role that each node will fill in the pool. Upon startup of the primary pool manager (e.g., the first node on the pool), the primary pool manager may use a network protocol to start the server process on every other node in the session pool 102. Command line parameters, for example, may inform each node of one or more pieces of information, such as: the role that the node will have in the pool, the host name of the primary pool manager, and the port number on which the primary pool manager is accepting connections from peer nodes. The information may also be provided in a configuration file, transmitted over a secure shell tunnel, and recovered from a configuration server. While the other machines in the pool may not initially know about the configuration of the pool, that information may also be sent to each other node by the primary pool manager. Updates of the pool information may also be subsequently sent to those nodes.

For any pool manager other than the primary pool manager added to the pool, the pool manager may open multiple sockets. For example, the first socket may accept work requests from clients, the second socket may accept connections from other pool members, and the third socket may connect (e.g., permanently) to the primary pool manager. When a pool manager (e.g., primary pool manager) receives a connection from another pool manager, it first checks to see if the peer node is in the list of configured nodes in the pool. If it is not on the list, the pool manager may clear the connection. If it is on the list, it may then attempt to authenticate the connection. If authentication is successful, the authenticating node may transmit information to its peer, such as the port number on which a node is listening for connections, the host name of the node, and information about how to authenticate the node, among other information. When a node, such as the new pool manager, receives information about another active node, it will check to see if it already has a connection to that other node. If it does not have a connection to that node, it may then establish a connection to that pool manager.

Any worker node added to the pool may establish a connection to the primary pool manager and any other pool manager on the pool. After establishing the connection, it may authenticate itself to the pool (e.g., any pool manager, including both primary and backup, or a server or user controlling the pool). After successful authentication, the worker node may accept configuration information from the pool manager.

When a node joins a session pool 102 (e.g., when the node is powered on or connected to an existing node on the pool or both), the node is assigned (e.g., by an operating system of the pool) an identifier (e.g., a universally unique identifier (UUID)). This identifier may help other nodes and external entities (devices, users, etc.) to identify the node and distinguish it from other nodes. When a node is connected to the pool, the node may share its identifier with the other nodes in the pool. Since each node may share its identifier, each node may know the identifier of every other node on the pool. Identifiers may also designate a hierarchy of each of the nodes (e.g., backup pool manager) within the pool. For example, the identifiers of each of the backup pool managers may be stored in a list of backup pool managers to indicate an order in which the backup pool manager will take over for a failed primary pool manager to become a new primary pool manager. However, a hierarchy of nodes may also be determined using methods other than using the unique identifiers of the nodes. For example, the hierarchy may be predetermined, or may be assigned based on other predetermined factors.

The pool may add new machines at any time (e.g., initiated from any pool manager). Upon adding a new node to the pool, the pool manager may first add the new node to its table of pool nodes. The pool manager may also then notify every other pool manager about the new node. The nodes receiving the notification may acknowledge that they have updated their configuration information.

Primary pool manager 104 may, for example, transmit one or more communications to backup pool manager or other control or worker nodes within the session pool 102). Such communications may be sent using protocols such as periodically, at fixed time intervals, or between known fixed stages of the project's execution. The communications transmitted by primary pool manager 104 may be of varied types and may include a variety of types of information. For example, primary pool manager 104 may transmit snapshots (e.g., status information) of the session pool 102 so that backup pool manager 104 always has a recent snapshot of the session pool 102. The snapshot or pool status may include, for example, the structure of the pool (including, for example, the worker nodes in the pool, unique identifiers of the nodes, or their relationships with the primary pool manager) and the status of a project (including, for example, the status of each worker node's portion of the project). The snapshot may also include analysis or results received from worker nodes in the session pool 102. The backup pool manager may receive and store the backup data received from the primary pool manager. The backup pool manager may transmit a request for such a snapshot (or other information) from the primary pool manager, or the primary pool manager may send such information periodically to the backup pool manager.

As noted, the backup data may allow the backup pool manager to take over as primary pool manager if the primary pool manager fails without requiring the pool to start the project over from scratch. If the primary pool manager fails, the backup pool manager that will take over as primary pool manager may retrieve the most recent version of the snapshot received from the primary pool manager and use the snapshot to continue the project from the stage of the project indicated by the backup data. This may prevent failure of the project as a whole.

A backup pool manager may use various methods to determine that the primary pool manager has failed. In one example of such a method, the primary pool manager may transmit (e.g., periodically) a communication to the backup pool manager that indicates that the primary pool manager is working and has not failed, such as a heartbeat communication. The backup pool manager may determine that the primary pool manager has failed if the backup pool manager has not received a heartbeat communication for a certain predetermined period of time. Alternatively, a backup pool manager may also receive a communication from the primary pool manager itself (before it failed) or from a worker node that the primary pool manager has failed, for example because the primary pool manager has failed to communicate with the worker node.

Different methods may be performed to determine which backup pool manager of a set of backup pool managers will take over for failed primary pool manager 104 and become the new primary pool manager. For example, the new primary pool manager may be chosen based on a ranking or "hierarchy" of backup pool managers based on their unique identifiers. In an alternative embodiment, a backup pool manager may be assigned to be the new primary pool manager by another device in the session pool 102 or from an external device (e.g., a system infrastructure or an end user, such as a server or computer, controlling the session pool 102). In another alternative embodiment, the backup pool manager that takes over as the new primary pool manager may be designated based on bandwidth or other statistics about the session pool 102.

A worker node within the session pool 102 may also fail. If a worker node fails, work being performed by the failed worker node may be redistributed amongst the operational worker nodes. In an alternative embodiment, the primary pool manager may transmit a communication to each of the operable worker nodes still on the session pool 102 that each of the worker nodes should purposefully fail also. After each of the worker nodes fail, they may each retrieve their most recent saved checkpoint of their status and re-start the project from that checkpoint to minimize lost progress on the project being executed.

Figure 2:
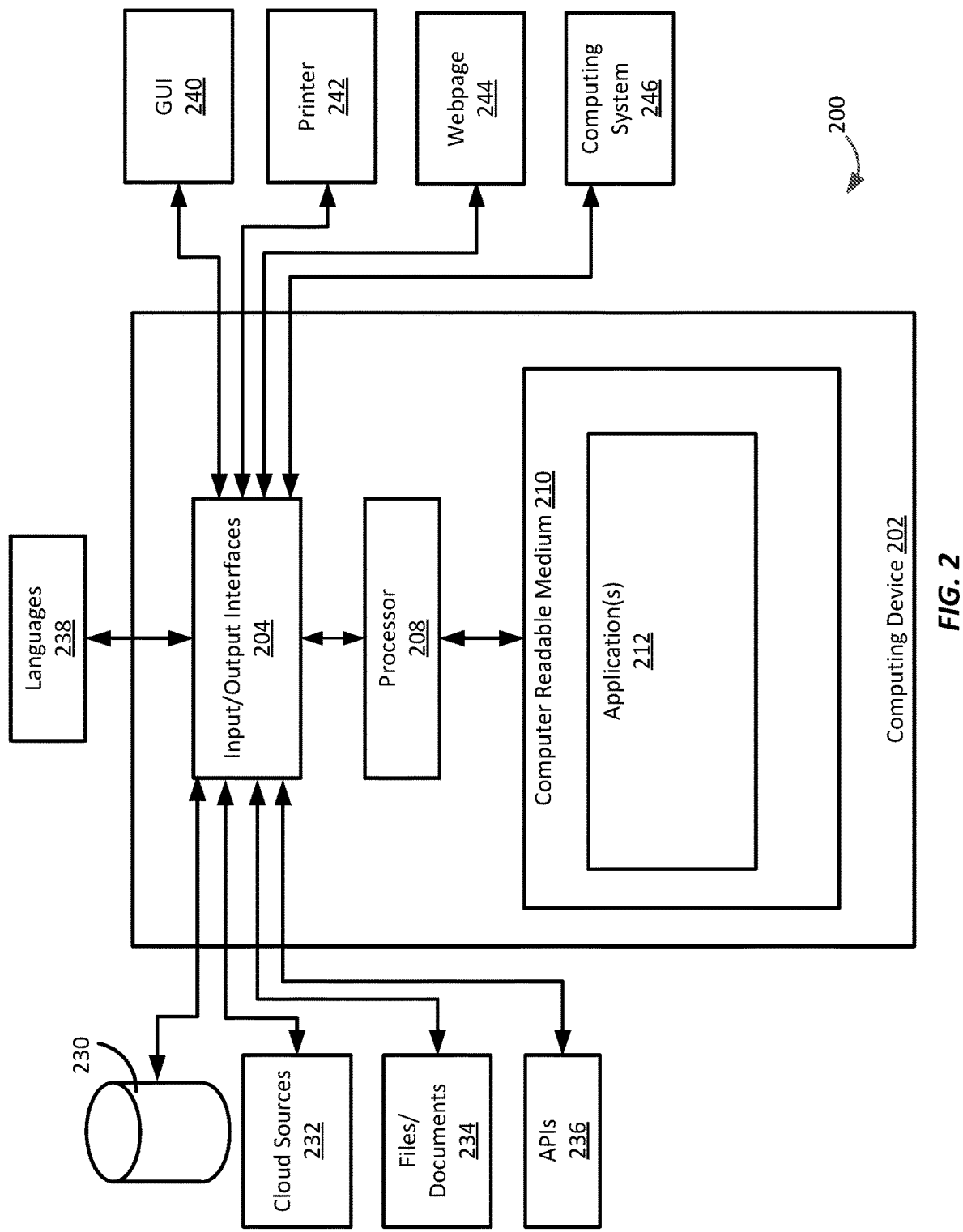
FIG. 2 illustrates a block diagram that provides an illustration of the hardware components of a computing system according to at least one embodiment of the present technology.

While each device in FIG. 1 is shown as a single device, it will be appreciated that multiple devices may instead be used. FIG. 2 shows an example computing structure for a device in FIG. 2. FIG. 2 includes a computing device 202. The computing device 202 has a computer-readable medium 210 and a processor 208. Computer-readable medium 210 is an electronic holding place or storage for information so the information can be accessed by processor 208. The computer readable medium 210 is a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including, for example, memory sharing, message passing, token passing, and network transmission.

Computer-readable medium 210 can include, but is not limited to, any type of random-access memory (RAM), any type of read only memory (ROM), any type of flash memory, etc. such as magnetic storage devices (e.g., hard disk, floppy disk, magnetic strips), optical disks (e.g., compact disc (CD), digital versatile disc (DVD)), smart cards, flash memory devices, etc.

Processor 208 executes instructions (e.g., stored at the computer-readable medium 210). The instructions can be carried out by a special purpose computer, logic circuits, or hardware circuits. In one or more embodiments, processor 208 is implemented in hardware and/or firmware. Processor 208 executes an instruction, meaning it performs or controls the operations called for by that instruction. The term "execution" is the process of running an application or the carrying out of the operation called for by an instruction. The instructions can be written using one or more programming languages, scripting languages, assembly languages, etc. Processor 208 in one or more embodiments can retrieve a set of instructions from a permanent memory device and copy the instructions in an executable form to a temporary memory device that is generally some form of RAM, for example. Processor 208 operably couples with components of computing device 202 (e.g., input/output interface 204 and with computer readable medium 210) to receive, to send, and to process information.

For instance, in one or more embodiments, computing device 202 sends and/or receives information from one or more of databases 230, cloud sources 232, application programming interfaces 236 (API's), graphical user interfaces 240 (GUIs), printers 242, webpages 244, and computing systems 246. The input/output interface 204 may be configured to receive languages 238 (e.g., to communicate with other computing systems 246) or specific electronic files or documents 234 (e.g., inputs for building models or designing experiments). The input/output interface 204 may be a single interface (e.g., an output interface only to output reports to a printer 242), multiple interface (e.g., a graphical user interface 240 may be interactive and send and receive data over input/output interface 204), or a set of interfaces (e.g., to connect with multiple devices).

In one or more embodiments, computer-readable medium 210 stores instructions for execution by processor 208. In one or more embodiments, one or more applications stored on computer-readable medium 210 are implemented in software (e.g., computer-readable and/or computer-executable instructions) stored in computer-readable medium 210 and accessible by processor 208 for execution of the instructions.

Figure 3:
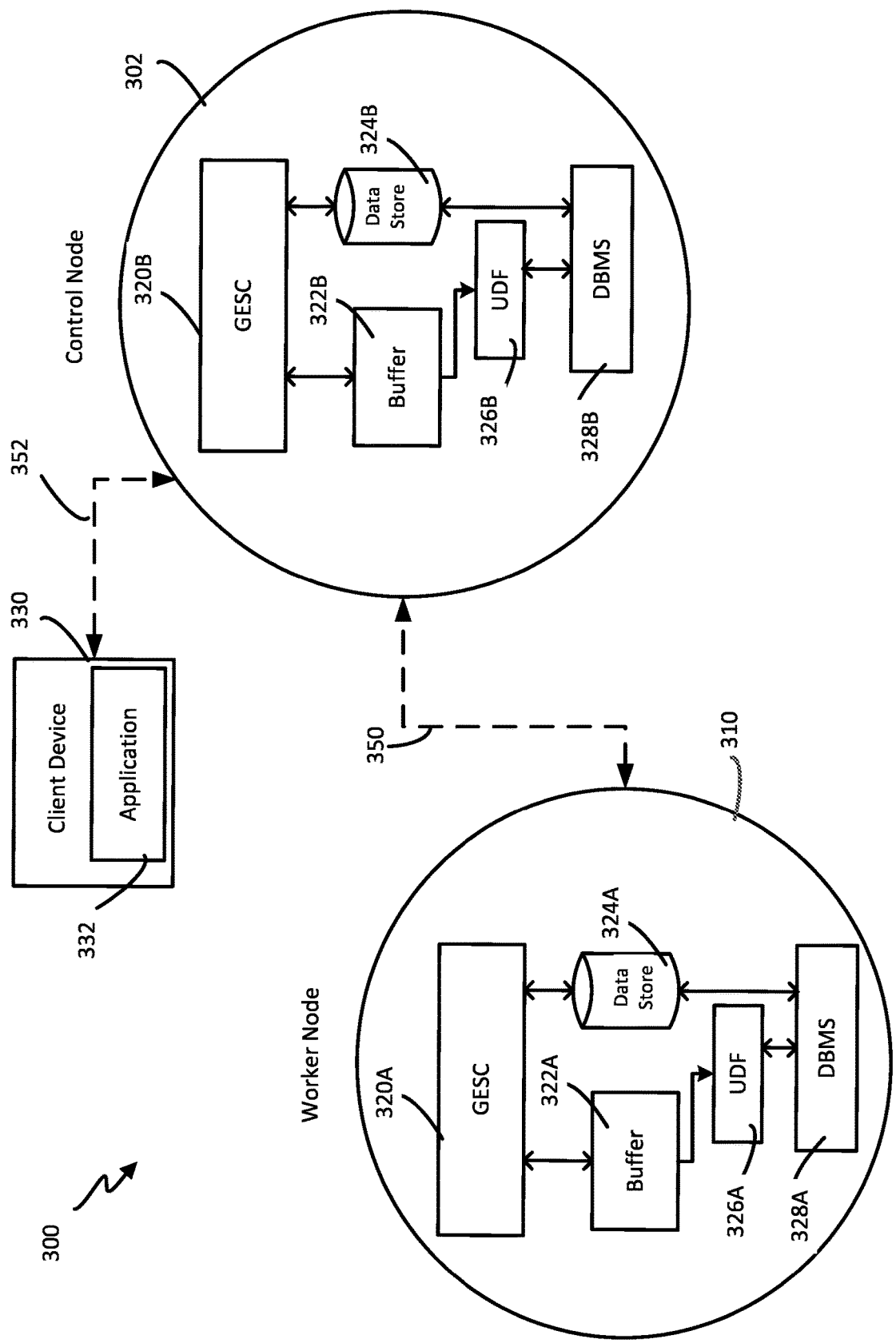
FIG. 3 illustrates a portion of a communications grid computing system, including a control node and a worker node, according to at least one embodiment of the present technology.

FIG. 3 illustrates a system 300 including a control node (e.g., pool manager 104 of FIG. 1) and a worker node (e.g., worker nodes 110 of FIG. 1), according to embodiments of the present technology. System 300 includes one control node (control node 302) and one worker node (worker node 310) for purposes of illustration but may include more worker and/or control nodes. The control node 302 is communicatively connected to worker node 310 via communication path 350. Therefore, control node 302 may transmit information (e.g., related to the session pool 102 or notifications), to and receive information from worker node 310 via path 350.

System 300 includes data processing nodes (e.g., control node 302 and worker node 310). Control node 302 and worker node 310 can include multi-core data processors. Each control node 302 and worker node 310 in this example includes a grid-enabled software component (GESC) 320 that executes on the data processor associated with that node and interfaces with buffer memory 322 also associated with that node. Each control node 302 and worker node 310 in this example includes a database management software (DBMS) 328 that executes on a database server (not shown) at control node 302 and on a database server (not shown) at worker node 310.

Each control node 302 and worker node 310 in this example also includes a data storage 324. Data storage 324, similar to network-attached data stores 120 in FIG. 1, are used to store data to be processed by the nodes in the computing environment. Data storage 324 may also store any intermediate or final data generated by the computing system after being processed, for example in non-volatile memory. However, in certain embodiments, the configuration of the system 300 allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the pool receives queries (e.g., ad hoc) from a client device 330 and when responses, which are generated by processing large amounts of data, need to be generated quickly or on-the-fly. In such a situation, the pool may be configured to retain the data within memory so that responses can be generated at different levels of detail and so that a client may interactively query against this information.

Each control node 302 and worker node 310 in this example also includes a user-defined function (UDF) 326. The UDF 326 provides a mechanism for the DBMS 328 to transfer data to or receive data from the database stored in the data storage 324 that are managed by the DBMS. For example, UDF 326 can be invoked by the DBMS 328 to provide data to the GESC 320 for processing. The UDF 326 may establish a socket connection (not shown) with the GESC 320 to transfer the data. Alternatively, the UDF 326 can transfer data to the GESC 320 by writing data to shared memory accessible by both the UDF 326 and the GESC 320.

The GESC 320 at the control node 302 and worker node 310 may be connected via a network. Therefore, control node 302 and worker node 310 can communicate with each other via the network using a predetermined communication protocol such as, for example, the Message Passing Interface (MPI). Each GESC 320 can engage in point-to-point communication with the GESC at another node or in collective communication with multiple GESCs via the network. The GESC 320 at each node may contain identical (or nearly identical) software instructions. Each control node 302 and worker node 310 may be configured to operate as either a pool manager or a worker node. The GESC 320B at the control node 302 can communicate, over a communication path 352, with a client device 330. More specifically, control node 302 may communicate with client application 332 hosted by the client device 330 to receive queries and to respond to those queries after processing large amounts of data.

DBMS 328 may control the creation, maintenance, and use of database or data structure (not shown) within control node 302 and worker node 310. The database may organize data stored in data storage 324. The DBMS 328 at control node 302 may accept requests for data and transfer the appropriate data for the request. With such a process, collections of data may be distributed across multiple physical locations. In this example, each control node 302 and worker node 310 stores a portion of the total data managed by the management system in its associated data storage 324.

Furthermore, the DBMS 328 may be responsible for protecting against data loss using replication techniques. Replication includes providing a backup copy of data stored on one node on one or more other nodes. Therefore, if one node fails, the data from the failed node can be recovered from a replicated copy residing at another node. Data or status information for each node in the session pool 102 may also be shared with each node on the pool.

Figure 4:
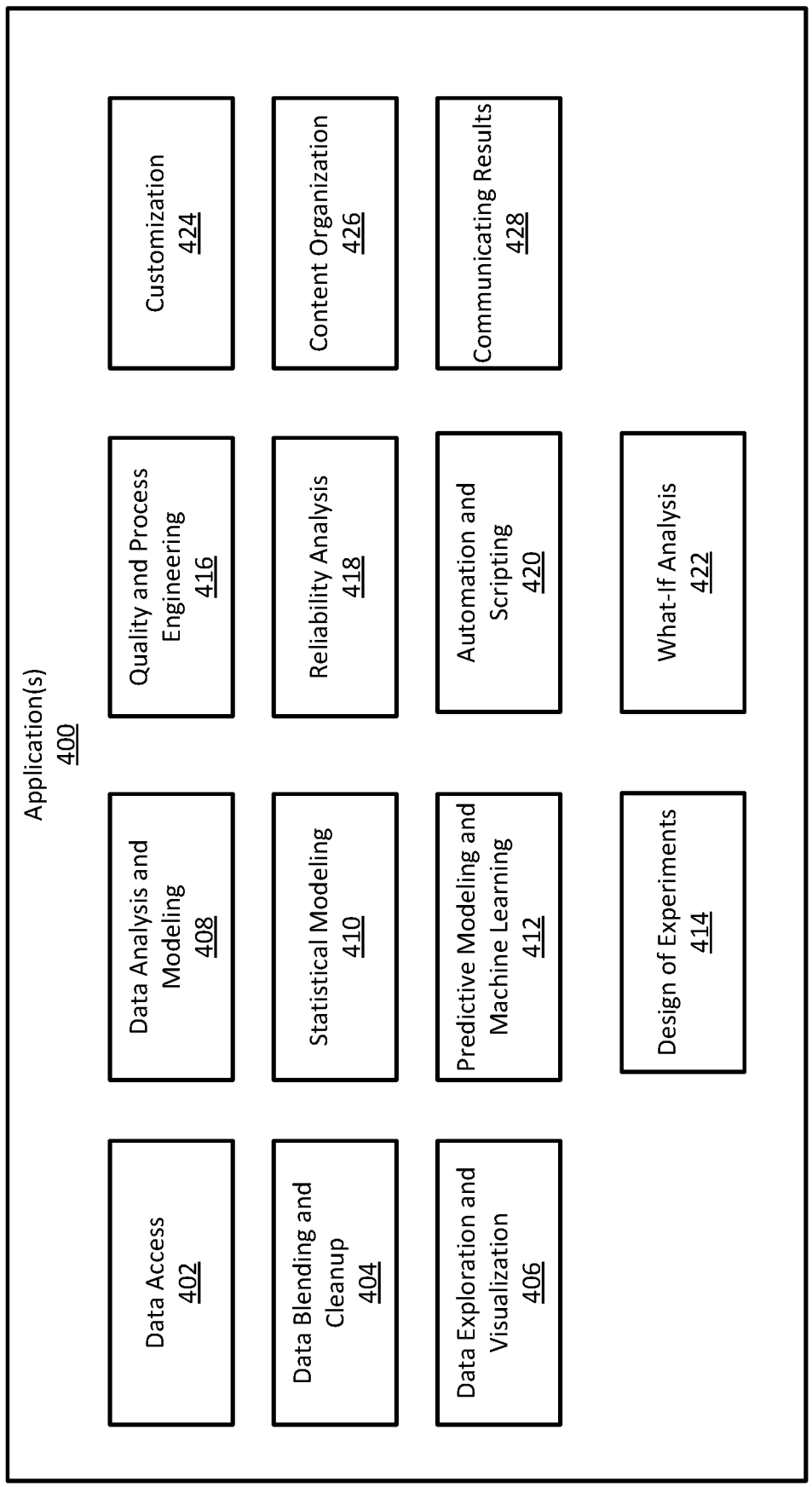
FIG. 4 illustrates a block diagram of example applications according to at least one embodiment of the present technology.

FIG. 4 provides example applications 400 (e.g., applications executed by a computing device 202, worker node 310, or control node 302) for performing one or more tasks or operations.

For example, data access operations 402 can be used for accessing data from different sources (e.g., importing and/or reading Excel files, flat files, relational databases, APIs, R, Python, and SAS® files and databases). For instance, data can be imported for data visualization, exploration and analysis. Data can be formatted or optimized. For instance, data blending and cleanup operations 404 can be used to remove complexity (e.g., in text, images and functions data) and for screening data (e.g., screening data for outliers, entry errors, missing values and other inconsistencies that can compromise data analysis). This can be useful for visual and interactive tools. Data can also be transformed, blended, grouped, filtered, merged into a single table or into subsets, or otherwise arranged for a particular scenario.

In one or more embodiments, one or more applications 400 include data exploration and visualization operations 406 that can be used to support plot and profiler tools. For instance, plot tools can be used to create data plots (e.g., to plot data to spot patterns and patterns that do not fit a trend). Some example plots include bubble plots, scatter plots (matrix and 3D), parallel plots, cell plots, contour plots, ternary plots, and surface plots. Profilers are tools that can be used to create a specialized set of plots in which changing one plot changes the other plots. For instance, profiling is an approach to generate visualizations of response surfaces by seeing what would happen if a user changed just one or two factors at a time. Profiler tools can be used to create interactive profiles of data (e.g., to explore and graph data dynamically and uncover hidden relationships between graphed data or interface with linked data, to interpret and understand the fit of equations to data, and to find factor values to optimize responses). Some example profiler tools include prediction profiler, contour profiler, surface profiler, mixture profiler, custom profiler, and excel profiler. A prediction profiler can be used to show vertical slices across each factor, holding other factors at a current value. A contour profiler allows horizontal slices showing contour lines for two factors at a time. A surface profiler generates three-dimensional plots for two factors at a time, or contour surface plot for 3 factors at a time. A mixture profiler is a contour profiler for mixture of factors. A custom profiler is a numerical optimizer. An excel profiler allows for visualization of models or formulas stored in electronic worksheets. Accordingly, profiler tools can allow for one or more of simulation, surface visualization, optimization, and desirability studies. Graphs (e.g., from plot or profiler tools) can be exported to electronic or print reports for presenting findings. Further, data exploration and visualization operations 406 can include text exploration such as computer extraction of symbols, characters, words and phrases; or computer visualization such as to organize symbols, characters, words and phrases to uncover information regarding a text or classify the text.

In one or more embodiments, one or more applications 400 include data analysis and modeling operations 408 can be used to analyze one or many variables or factors in linked analysis. Analysis results may be linked with specific graphs designed for different types of data or metrics (e.g., graphs related to histograms, regression modeling and distribution fitting). Data analysis and modeling can be performed real-time (or just-in-time). For instance, applications 400 can include statistical modeling operations 410. For instance, statistical modeling operations 410 can be used for a diversity of modeling tasks such as univariate, multivariate and multifactor. Data can be transformed from its collected form (e.g., text or functional form) and data can be used for building models for better insights (e.g., discovery trends or patterns in data). As another example, one or more applications 400 can include predictive modeling and machine learning operations 412 to build models using predictive modeling techniques, such as regression, neural networks and decision trees. The operations 412 can be used to fit multiple predictive models and determine the best performing model with model screening. Validation (e.g., cross-validation and k-fold cross-validation) can be used (e.g., to prevent over-fitting or to select a best model). Machine learning methods can be used by the user without having to write code and tune algorithms. Examples of machine learning techniques are described in more detail with respect to FIGS. 5 and 6).

In one or more embodiments, one or more applications 400 include design of experiments (DOE) operations 414 used to create designs for experiments that provide test conditions for one or more factors tested in the experiment. For example, the design of experiments operations 414 can be used to create optimally designed experiments, efficient experiments to meet constraints, process limitations and budget, and/or screening designs to untangle important effects between multiple factors. DOE operations 414 can also be used for evaluating designs (e.g., design diagnostic measures such as efficiency metrics).

In one or more embodiments, one or more applications 400 include quality and process engineering operations 416 to track and visualize quality and processes. For instance, the quality and process engineering operations 416 can generate charts to explore root causes of quality or process problems (e.g., causes of variation in manufacturing processes and drill down into problem processes). Additionally, or alternatively, they can be used to generate notifications for metrics that exceed a threshold such as an out-of-control signal or a control chart warning. Additionally, or alternatively, they can be used to study the capability and performance of one or more variables to identify processes that are not meeting user-defined goals. Objective data from processes or consumer data can be used to release better products and react to market trends.

In one or more embodiments, one or more applications 400 include reliability analysis operations 418. For example, in manufacturing, reliability analysis tools can be used to prevent failure, improve warranty or product performance, find and address important design vulnerabilities, and pinpoint defects in materials or processes. Reliability analysis tools can also be used to determine how to reduce or improve these issues (e.g., by identifying trends and outliers in data and model predictions). What-if Analysis operations 422 can be used to demonstrate patterns of predicted responses and the effect of each factor on the response with scenario analysis. For example, a graphical user interface can be used for a user to put in different inputs, assumptions or constraints for a system and observe responses or effects. For instance, in a measurement system analysis analyzing whether parts would be in-specification, different estimated variances between parts and operators testing the parts could be varied to determine the effect on modeled output for the measurement system analysis.

In one or more embodiments, one or more applications 400 include automation and scripting operations 420. For example, automation can allow code-free access for a user to automation routines all the way up to completely customized applications (e.g., code free access to SAS®, MATLAB®, Python® and R routines). For example, a design created for experiments can be automated such that automatic testing is performed for the design.

In one or more embodiments, one or more applications 400 include operations for greater user control and interaction. For instance, customization operations 424 can be used for user customization (e.g., mass customizations, and customizations of graphics, statistics, and default views). As another example, content organization operations 426 can be used to organize data (e.g., translate statistical results to a simplified view to communicate findings and organize, summarize, and document content to better aid the accountability and reproducibility of projects). As another example, the communicating results operations 428 can be used for presentation of results, models, or other output from one or more applications 400 (e.g., presented in print, graphical user interface, or web-based versions).

In one or more embodiments, fewer, different, and additional components can be incorporated into computing device 202. In one or more embodiments, the input/output interface has more than one interface that uses the same or different interface technology.

In one or more embodiments, the one or more applications 400 can be integrated with other analytic or computing tools not specifically shown here. For instance, one or more applications are implemented using or integrated with one or more software tools such as JMPR, Base SAS, SAS® Enterprise Miner™, SAS/STAT®, SAS® High Performance Analytics Server, SAS® Visual Data Mining and Machine Learning, SAS® LASR™ SAS® In-Database Products, SAS® Scalable Performance Data Engine, SAS® Cloud Analytic Services, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, and SAS/IML®.

Figure 5:
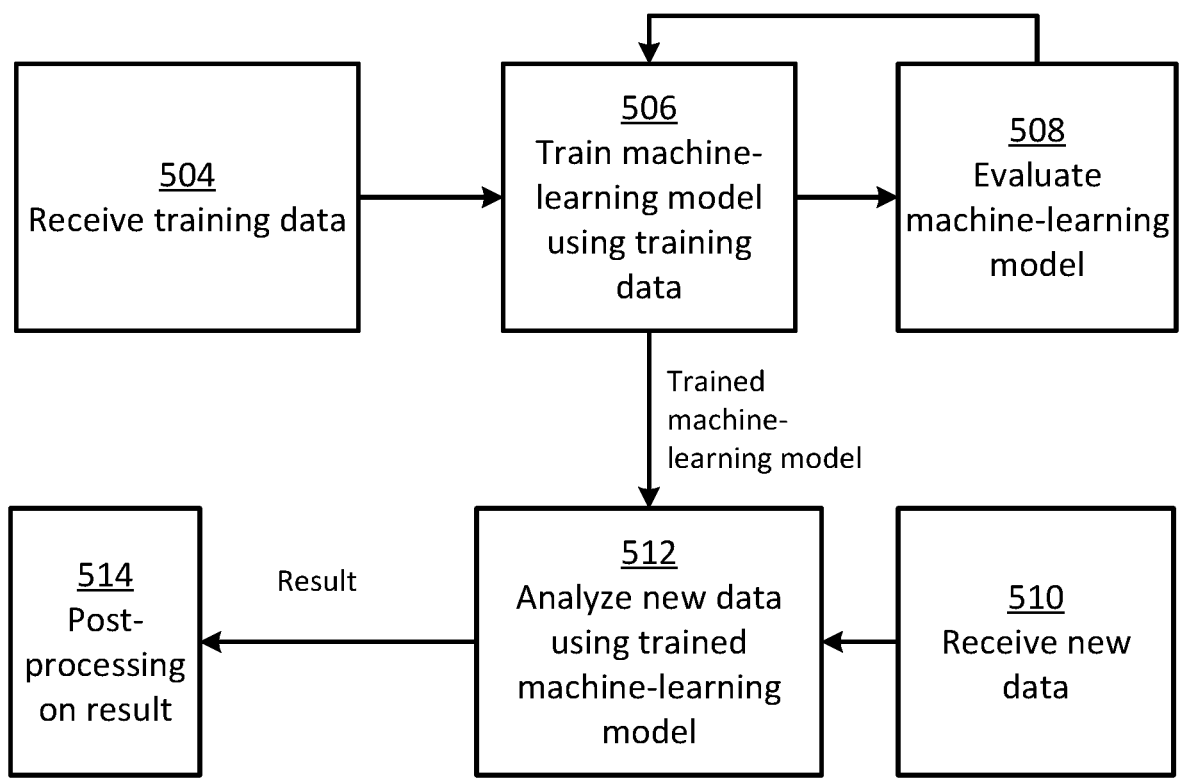
FIG. 5 illustrates a flow chart of an example of a process for generating and using a machine-learning model according to at least one embodiment of the present technology.

One or more embodiments are useful for generating and using machine-learning models. FIG. 5 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector operator (LASSO) classifiers, and support vector machines; (iv) clusterers, such as k-means clustering, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, North Carolina.

Machine-learning models construction can be at least partially automated (e.g., with little or no human involvement) in a training process. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 5.

In block 504, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 506, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 508, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 506, where the machine-learning model can be further trained using additional training data or otherwise modified to improve accuracy. If the machine-learning model has an adequate degree of accuracy for the particular task, the process can continue to block 510.

In block 510, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 512, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 514, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 6:
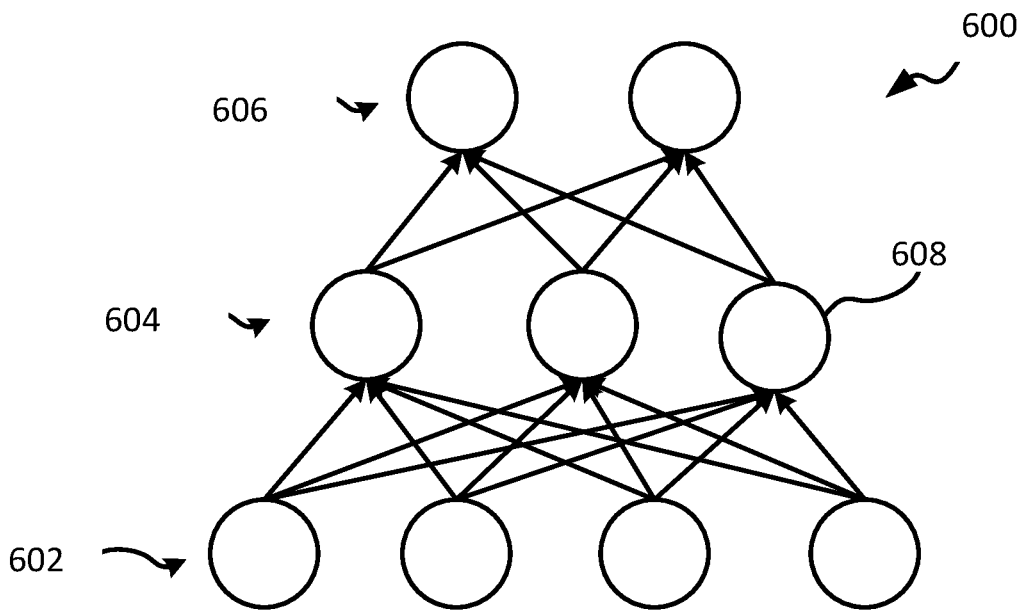
FIG. 6 illustrates an example of a machine-learning model as a neural network according to at least one embodiment of the present technology.

A more specific example of a machine-learning model is the neural network 600 shown in FIG. 6. The neural network 600 is represented as multiple layers of interconnected neurons, such as neuron 608, that can exchange data between one another. The layers include an input layer 602 for receiving input data, a hidden layer 604, and an output layer 606 for providing a result. The hidden layer 604 is referred to as hidden because it may not be directly observable or have its input directly accessible during the normal functioning of the neural network 600. Although the neural network 600 is shown as having a specific number of layers and neurons for exemplary purposes, the neural network 600 can have any number and combination of layers, and each layer can have any number and combination of neurons.

The neurons and connections between the neurons can have numeric weights, which can be tuned during training. For example, training data can be provided to the input layer 602 of the neural network 600, and the neural network 600 can use the training data to tune one or more numeric weights of the neural network 600. In some examples, the neural network 600 can be trained using backpropagation. Backpropagation can include determining a gradient of a particular numeric weight based on a difference between an actual output of the neural network 600 and a desired output of the neural network 600. Based on the gradient, one or more numeric weights of the neural network 600 can be updated to reduce the difference, thereby increasing the accuracy of the neural network 600. This process can be repeated multiple times to train the neural network 600. For example, this process can be repeated hundreds or thousands of times to train the neural network 600.

In some examples, the neural network 600 is a feed-forward neural network. In a feed-forward neural network, every neuron only propagates an output value to a subsequent layer of the neural network 600. For example, data may only move one direction (forward) from one neuron to the next neuron in a feed-forward neural network.

In other examples, the neural network 600 is a recurrent neural network. A recurrent neural network can include one or more feedback loops, allowing data to propagate in both forward and backward through the neural network 600. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 600 operates by receiving a vector of numbers from one layer; transforming the vector of numbers into a new vector of numbers using a matrix of numeric weights, a nonlinearity, or both; and providing the new vector of numbers to a subsequent layer of the neural network 600. Each subsequent layer of the neural network 600 can repeat this process until the neural network 600 outputs a final result at the output layer 606. For example, the neural network 600 can receive a vector of numbers as an input at the input layer 602. The neural network 600 can multiply the vector of numbers by a matrix of numeric weights to determine a weighted vector. The matrix of numeric weights can be tuned during the training of the neural network 600. The neural network 600 can transform the weighted vector using a nonlinearity, such as a sigmoid tangent or the hyperbolic tangent. In some examples, the nonlinearity can include a rectified linear unit, which can be expressed using the following equation: y=max(x, o), where y is the output and x is an input value from the weighted vector. The transformed output can be supplied to a subsequent layer, such as the hidden layer 604, of the neural network 600. The subsequent layer of the neural network 600 can receive the transformed output, multiply the transformed output by a matrix of numeric weights and a nonlinearity, and provide the result to yet another layer of the neural network 600. This process continues until the neural network 600 outputs a final result at the output layer 606.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the session pool 102 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. Furthermore, these processors may also be employed in heterogeneous computing architectures with a number of and a variety of different types of cores, engines, nodes, and/or layers to achieve various energy efficiencies, chip-level thermal processing considerations, processing speed improvements, data communication speed improvements, and/or data efficiency targets and improvements throughout various parts of the system when compared to a homogeneous computing architecture that employs CPUs for general purpose computing.

Associated Processes

Figure 7:
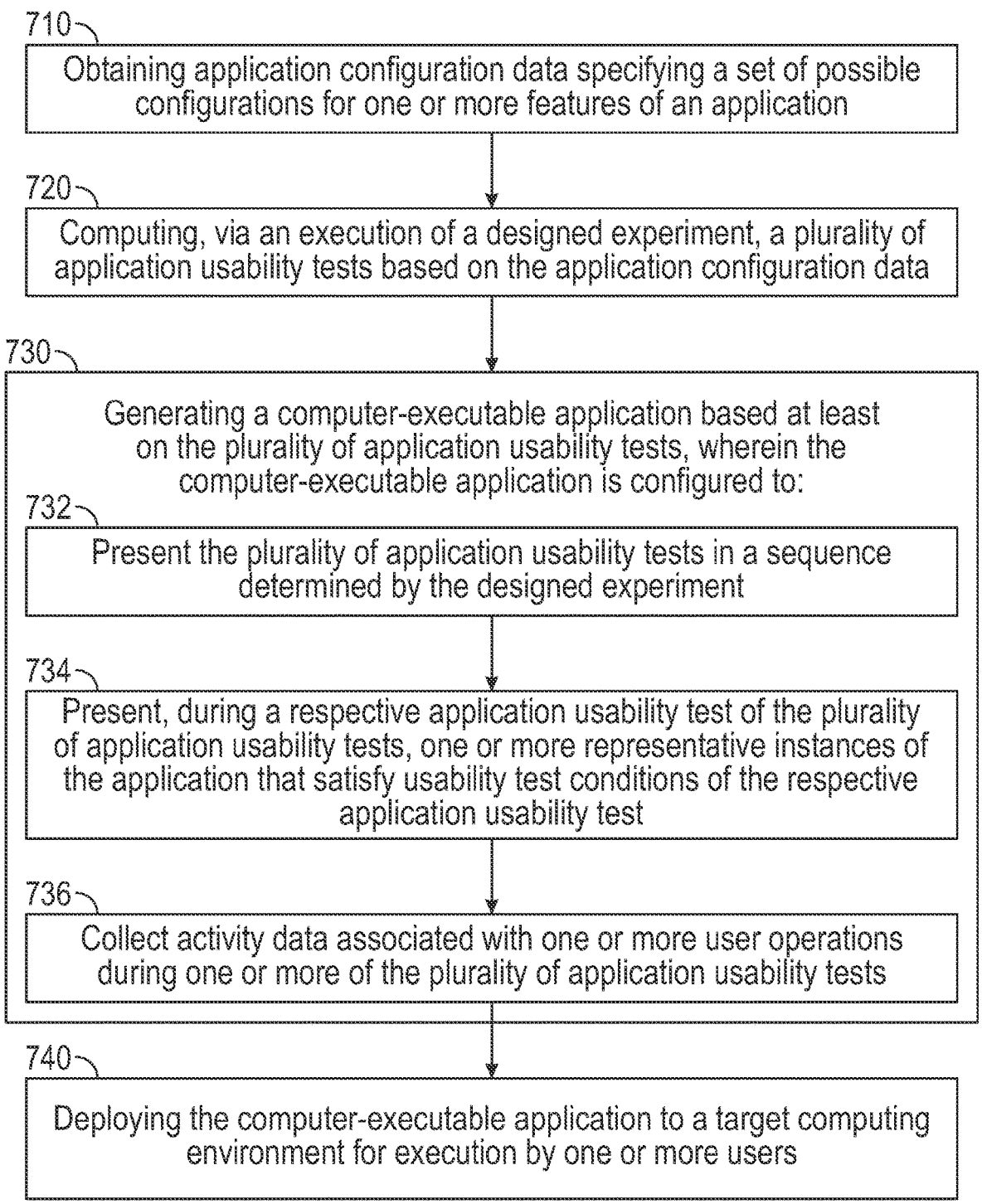
FIG. 7 illustrates an example method for generating a computer-executable usability study application according to at least one embodiment of the present technology.

FIG. 7 illustrates one embodiment of method 700 for generating a computer-executable usability study application. It shall be appreciated that other examples contemplated within the scope of the present disclosure may involve more operations, fewer operations, different operations, or a different order of operations than as shown in FIG. 7.

Figure 10:
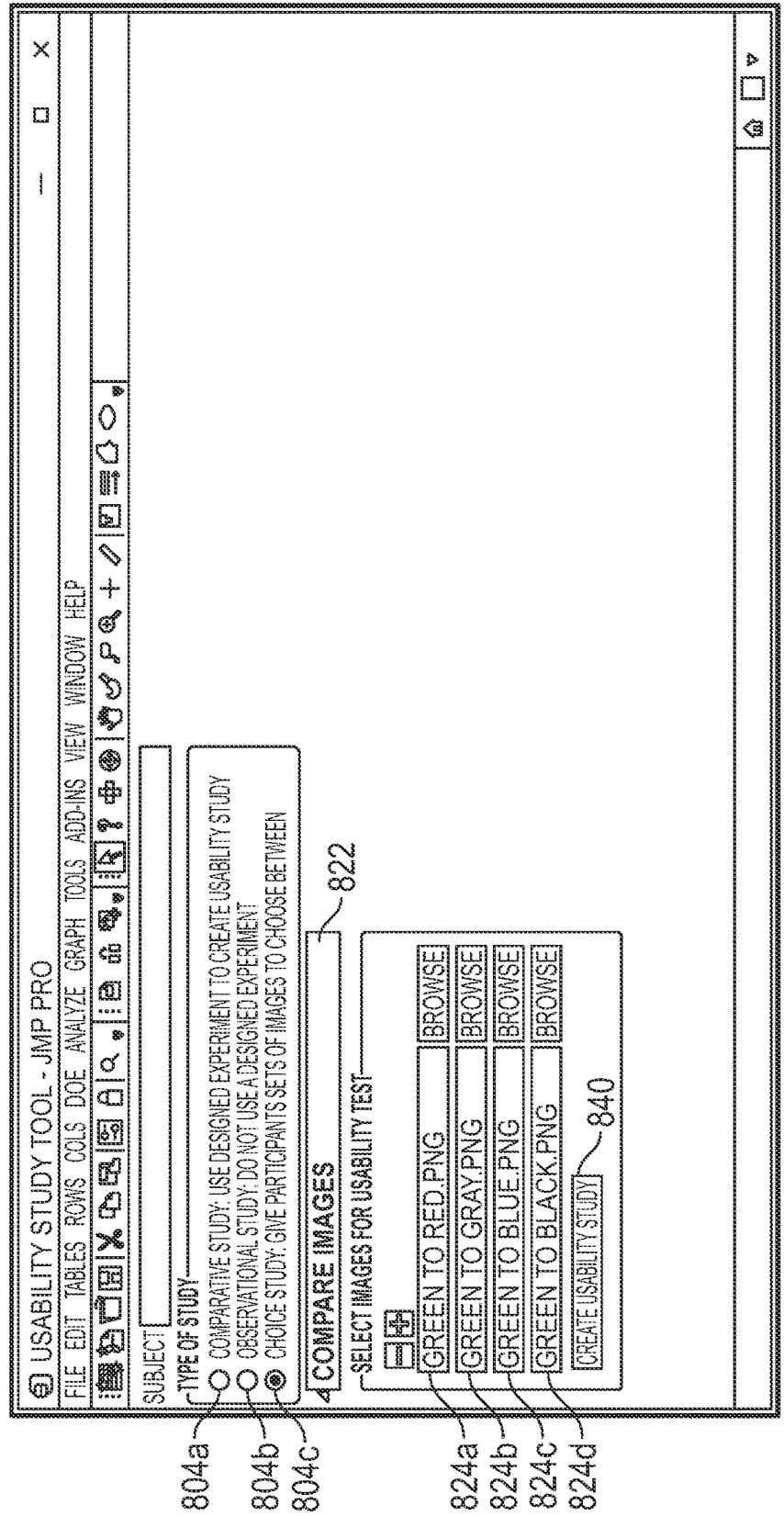

In some embodiments, method 700 may include process 710 that functions to obtain application configuration data specifying a set of possible configurations for one or more features of an application. As described in more detail herein, the application configuration data obtained via process 710 may be used, by method 700, to generate a respective type of computer-executable usability study application. For instance, in a non-limiting example, method 700 may use the application configuration data to generate a computer-executable comparative usability study application, a computer-executable observational usability study application, a computer-executable choice usability study application, and/or the like. Various non-limiting examples of process 710 obtaining application configuration data will now be described with respect to FIGS. 8-10.

In some embodiments, process 710 may display a user interface to obtain the application configuration data. The user interface, in some embodiments, may display one or more usability study type options that, when selected, instruct method 700 to generate a respective type of computer-executable usability study application. For instance, in the example illustrated in FIG. 8, process 710 is displaying a user interface 802 that includes a plurality of usability study type options 804a-804c. The usability study type option 804a, when selected, may instruct method 700 to generate a computer-executable comparative usability study application (e.g., an application that assesses a usability of a target software application by presenting different configurations, each of which may change one or more settings of the target software application). Conversely, the usability study type option 804b, when selected, may instruct method 700 to generate a computer-executable observational usability study application (e.g., an application that assesses a usability of a target software application by instructing users to interact with the target software application in specific ways). Lastly, the usability study type option 804c, when selected, may instruct method 700 to generate a computer-executable choice usability study application (e.g., an application that assesses a usability of a target software application by presenting one or more sets of alternatives to one or more users).

It shall be noted that, in the context of the disclosure, the term "usability" may refer to the extent in which a target software application can be used by one or more users. The usability of a target software application may be evaluated based on various qualitative or quantitative aspects including, but not limited to, the effectiveness and efficiency of user interaction(s) with the target software application, the learnability of the target software application, the cognitive load imposed on a user during the user interaction(s), overall user satisfaction with the target software application, adaptability to different user requirements, adaptability to different contexts of use, the accurate interpretation of information in the target software application, and/or the like.

In some embodiments, when a selection of the usability study type option 804a corresponding to "Comparative Study" is detected, the user interface 802 may display user interface elements associated with generating a computer-executable comparative usability study application. For instance, in the example illustrated in FIG. 8, the user interface 802 receives a user input selecting the usability study option 804a and, in response, displays a design choices section 806 that is configured to receive user inputs for defining parameters of the comparative usability study (e.g., responses and factors for the comparative usability study).

In some embodiments, the design choices section 806 may include selectable options 808a and 808b. The selectable option 808a, when selected, may cause the user interface 802 to display one or more user interface elements that allow the parameters of the comparative usability study to be interactively defined. Conversely, the selectable option 808b, when selected, may cause the user interface 802 to display one or more user interface elements that allow the parameters of the comparative usability study to be programmatically defined. Specifically, in the example illustrated in FIG. 8, the user interface 802 receives user input selecting the selectable option 808a and, in response, displays a responses sub-section 810a that is configured to obtain user input for defining one or more response variables for the comparative usability study and a factors sub-section 810b that is configured to obtain user input for defining one or more factors for the comparative usability study.

Figure 8:
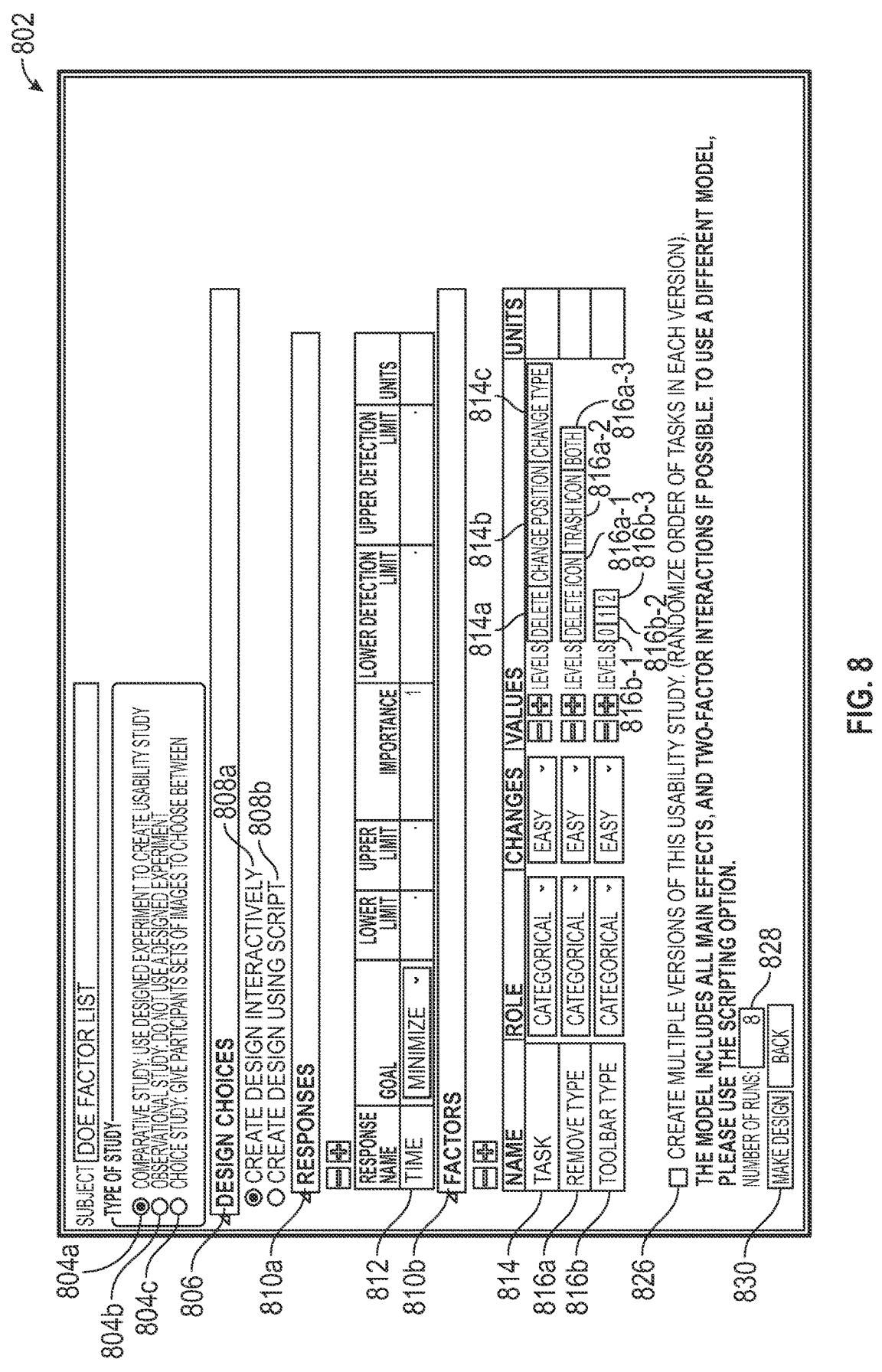

In some embodiments, the application configuration data obtained by process 710 may include the one or more response variables defined in the responses sub-section 810a. The one or more responsive variables, as generally referred to herein, may represent variables that a designed experiment aims to optimize. For instance, as illustrated in FIG. 8, the application configuration data obtained by process 710 includes a response variable 812 named "Time" with a goal of "Minimize." Specifically, the goal of the response variable 812 instructs method 700 to create a designed experiment that identifies factors that lead to the minimum value of the response variable 812 (e.g., factors that minimize the time it takes for a user to complete a respective usability task). Put differently, a goal of a response variable may indicate an optimization objective of the response variable.

Additionally, or alternatively, in some embodiments, the application configuration data obtained by process 710 may include the one or more factors defined in the factors sub-section 810b. The one or more factors, in some embodiments, may include a usability task factor. The usability task factor, as generally referred to herein, may represent a specific task or set of usability tasks that are to be assessed during the comparative usability study. For instance, in the example illustrated in FIG. 8, the application configuration data obtained by process 710 includes a usability task factor 814. The usability task factor 814, as depicted in FIG. 8, is a categorical factor and includes a first level 814a with a value of "Delete," a second level 814b with a value of "Change position," and a third level 814c with a value of "Change type." Collectively, the first level 814a, the second level 814b, and the third level 814c of the usability task factor 814 instruct method 700 to create a designed experiment that assesses the usability tasks "Delete," "Change position," and "Change type" within the target software application.

Furthermore, in some embodiments, the one or more factors defined in the factors sub-section 810b may include one or more application-configuration factors. The one or more application-configuration factors, as generally referred to herein, may each represent or relate to a distinct configurable feature of the target software application. Additionally, in some embodiments, the one or more application-configuration factors may each specify possible configurations for the distinct configurable feature of the target software application.

For instance, as further illustrated in FIG. 8, the application configuration data obtained by process 710 also includes a plurality of application-configuration factors 816a and 816b. The application-configuration factor 816a is named "Remove Type" and relates to a configurable feature of the target software application that allows users to remove a specific type of item. As also illustrated in FIG. 8, the application-configuration factor 816a includes a first level 816a-1, a second level 816a-2, and a third level 816a-3 that each specify a possible configuration for removing a specific type of item within the target software application. Specifically, the first level 816a-1 of the application-configuration factor 816a has a value "Delete icon," indicating that specific items in one configuration of the target software application may be removed via interaction with a "Delete icon." The second level 816a-2 of the application-configuration factor 816a has a value "Trash icon," indicating that specific items in a second configuration of the target software application may be removed via interaction with a "Trash icon." Lastly, the third level 816a-3 of the application-configuration factor 816a has a value "Both," indicating that specific items in a third configuration of the target software application may be removed via interaction with either the "Delete icon" or the "Trash icon."

Conversely, as illustrated in FIG. 8, the application-configuration factor 816b is named "Toolbar Type" and relates to a configurable feature of the target software application that represents different types of toolbars that the target software application or system may display. Specifically, in the example of FIG. 8, the application-configuration factor 816b includes a first level 816b-1, a second level 816b-2, and a third level 816b-3. The first level 816b-1 of the application-configuration factor 816b has a value of zero (0), indicating a first type of toolbar that the target software application may display. The second level 816b-2 of the application-configuration factor 816b has a value of one (1), indicating a second type of toolbar the target software application may display. The third level 816b-3 of the application-configuration factor 816b has a value of two (2), indicating a third type of toolbar the target software application may display.

Alternatively, in some embodiments, when a selection of the usability type study option 804b corresponding to "Observational Study" is detected, the user interface 802 may display user interface elements associated with generating a computer-executable observational usability study application. For instance, in the example illustrated in FIG. 9, the user interface 802 receives a user input selecting the usability study option 804b and, in response, displays an observational study tasks section 818 that is configured to receive user inputs for defining usability tasks that are to be assessed for usability during the observational usability study.

In some embodiments, the application configuration data obtained by process 710 may include the one or more usability tasks defined in the observational study tasks section 818. For instance, in the example of FIG. 9, the application configuration data obtained by process 710 includes a plurality of usability tasks 820a and 820b. Specifically, the usability task 820a has a text value of "Fit Model Equivalence Test" and corresponds to a respective usability operation or activity of the target software application that is to be accessed during the observational usability study. Conversely, the usability task 820b has a text value of "FDE Wavelets" and corresponds to another respective usability operation or activity of the target software application that is to be accessed during the observational usability study.

Furthermore, in some embodiments, when a selection of the usability type study option 804c corresponding "Choice Study" is detected, the user interface 802 may display user interface elements associated with generating a computer-executable choice usability application. For instance, in the example illustrated in FIG. 10, the user interface 802 receives a user input selecting the usability study option 804c. In response to receiving the user input, the user interface 802 displays a compare images section 822 that is configured to receive user inputs for defining a set of one or more graphical representations (e.g., images) to be assessed during the choice usability study.

In some embodiments, the application configuration data obtained by process 710 may include the set of graphical representations defined in the compare images section 822. For instance, in the example of FIG. 10, the application configuration data obtained by process 710 includes a plurality of graphical representations 824a-824d. Specifically, the graphical representation 824a corresponds to a first image named "Green to Red.PNG". The graphical representation 824b corresponds to a second image named "Green to Gray.png". The graphical representation 824c corresponds to a third image named "Green to Blue.png". Lastly, the graphical representation 824d corresponds to a fourth image named "Green to Back.png".

Referring to FIG. 7, in some embodiments, method 700 may include process 720 that computes, via an execution of a designed experiment, a plurality of application usability tests based on the application configuration data. As generally referred to herein, the plurality of application usability tests computed via the designed experiment may refer to the usability exercises that are ideally suited (e.g., most optimal) for assessing the usability of a target software application (or one or more features of the target software application). For instance, in a non-limiting example, based on the application configuration data obtained by process 710, the universe of possible application usability tests that could be used to access the usability of the target software application may be vast, potentially numbering in the hundreds or thousands. However, the designed experiment employed by process 720 may ensure that only the application usability tests most suitable for evaluating the usability of the target software application are selected. Various non-limiting examples of process 720 generating a plurality of application usability tests will now be described with respect to FIGS. 11-14.

It shall be noted that, in some embodiments, the universe of possible application usability tests may be determined by the combinatorial complexity of the application configuration data obtained by process 710. For instance, in a non-limiting example, the application configuration data obtained by process 710 may include five factors—such as color scheme, layout, font size, button style, and navigation type—with each factor having three possible levels. Thus, in such an example, the universe of possible application usability tests would be $3^5$ (or 243) different application usability tests. It may not be practical or feasible to test all possible application usability tests due to resource and time constraints. Therefore, process 720 may select, from the universe of possible application usability tests, a subset of application usability tests that will yield the greatest insights into the usability of the target software application.

Figure 11:
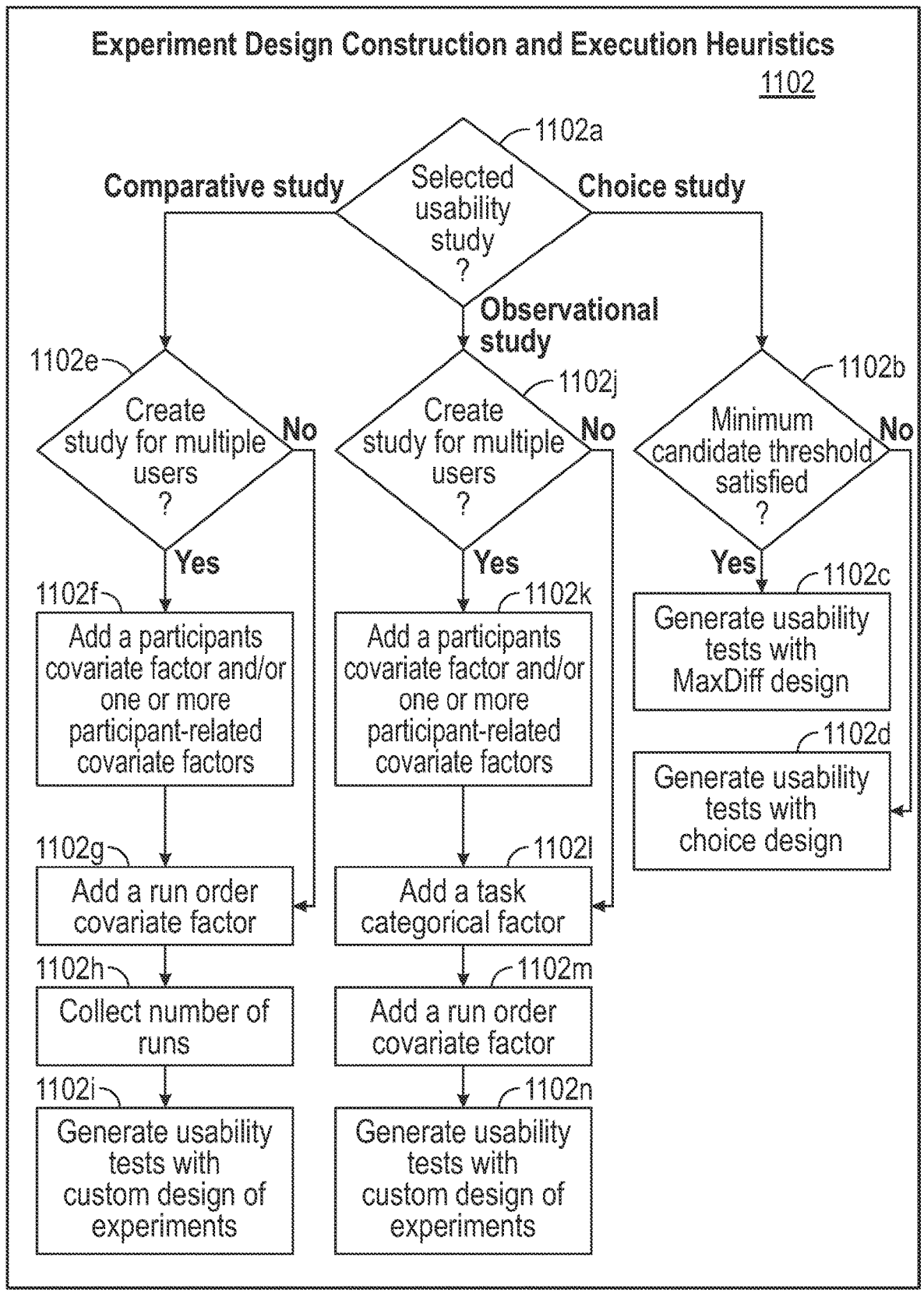
FIG. 11 illustrates an example schematic for generating application usability tests according to at least one embodiment of the present technology.

In some embodiments, process 720 may generate the plurality of application usability tests based on a set of experiment design construction and execution heuristics. For instance, in a non-limiting example, process 720 may implement one or more of the experiment design construction and execution heuristics 1102 illustrated in FIG. 11. As shown in FIG. 11, the experiment design construction and execution heuristics 1102 may include a determination 1102a that determines the type of usability study selected in the user interface 802. For instance, in the example of FIG. 12, the determination 1102a may determine that the selectable option 804c corresponding to the "Choice Study" is selected. Conversely, in the example of FIG. 13, the determination 1102a may determine that the selectable option 804a corresponding to the "Comparative Study" is selected. Lastly, in the example of FIG. 14, the determination 1102a may determine that the selectable option 804b corresponding to "Observational Study" is selected.

In some embodiments, as illustrated in FIG. 11, if the determination 1102a determines that the "Choice Study" is selected, process 720 may proceed to determination 1102b. The determination 1102b may determine if the number of graphical representations received via the user interface 802 satisfy a minimum candidate threshold. The minimum candidate threshold, in some embodiments, may be satisfied when the number of graphical representations received via the user interface 802 exceeds three (3) graphical representations. Conversely, in some embodiments, the minimum candidate threshold may not be satisfied when the number of graphical representations received via the user interface 802 does not exceed three (3) graphical representations. For instance, in the example of FIG. 12, the determination 1102b may determine that the plurality of graphical representations 824a-824d satisfy the pre-determined minimum candidate threshold because the plurality of graphical representations 824a-824d include more than three (3) graphical representations.

In some embodiments, as illustrated in FIG. 11, if the determination 1102b determines that the number of graphical representations received via the user interface 802 satisfies the minimum candidate threshold, process 720 may proceed to step 1102c that generates a plurality of application usability tests using a MaxDiff Design. Specifically, in some embodiments, process 720 may add, to the MaxDiff Design, a graphical representation factor that includes a level corresponding to each respective graphical representation received at the compare images section 822 of the user interface 802. For instance, in the example of FIG. 12, process 720 may add, to the Max Diff Design, a graphical representation factor that includes four (4) levels. The first level, second level, the third level, and the fourth level of the graphical representation factor may correspond to the graphical representation 824a, 824b, 824c, and 824d, respectively.

Figure 12:
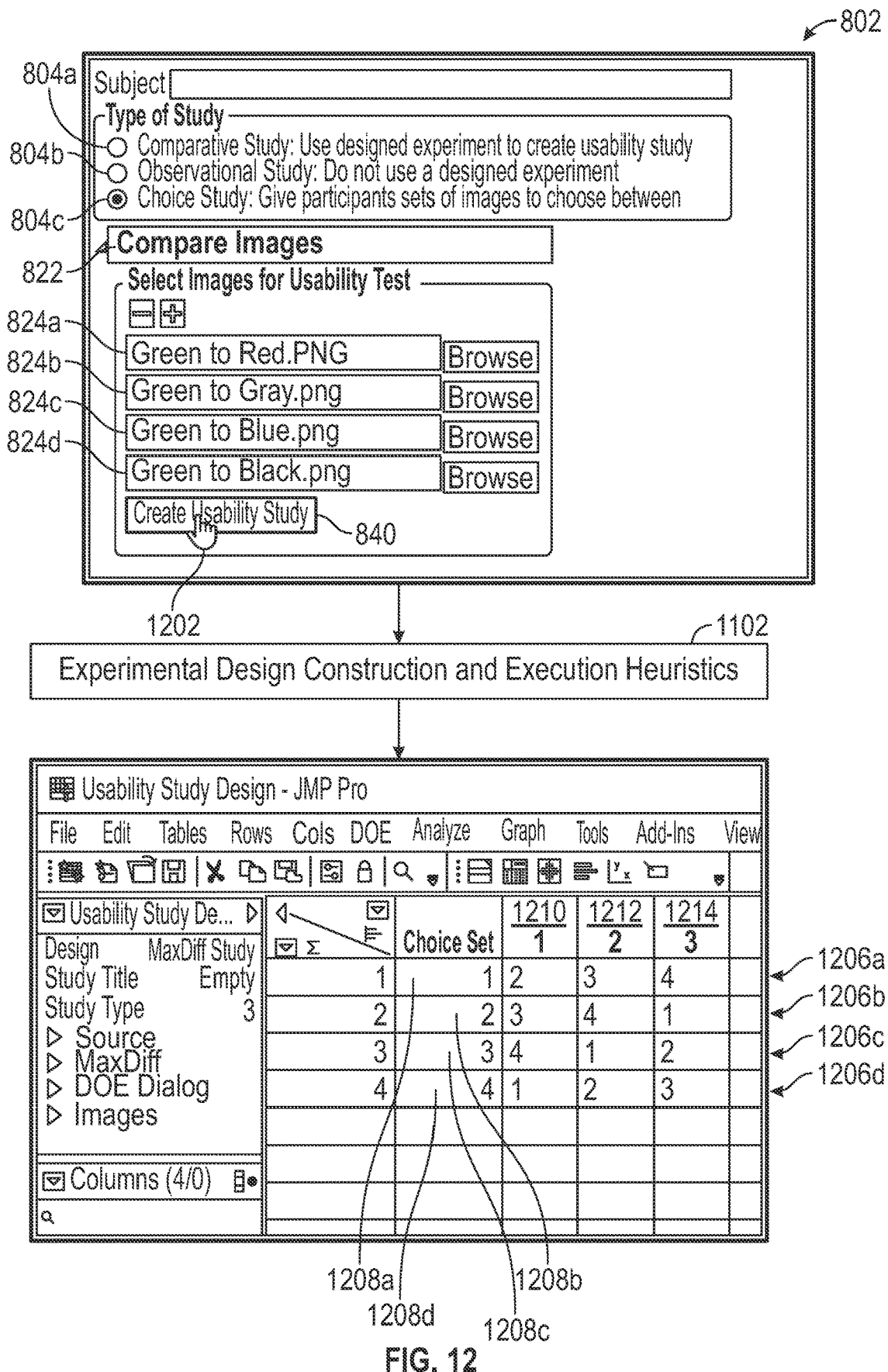

In turn, the MaxDiff Design may use the graphical representation factor to generate a plurality of application usability tests. Process 720, in some embodiments, may generate the plurality of application usability tests upon (e.g., based on) receiving an input requesting a creation of the plurality of application usability tests. For instance, as illustrated in FIG. 12, process 720 receives an input 1202 selecting the "Create Usability Study" option 840. In response, process 720 creates the graphical representation factor and uses the graphical representation factor in a MaxDiff Design to generate a plurality of application usability tests 1206a-1206d.

In some embodiments, a respective application usability test generated by the MaxDiff Design may include an exercise order value that defines when a computer-executable usability study application (e.g., the computer-executable application generated by process 730) presents such application usability test. For instance, in the example of FIG. 12, the plurality of application usability tests 1206a-1206d include exercise order values 1208a-1208d. Specifically, the exercise order value 1208a of the application usability test 1206a has a value of one (1), indicating that the computer-executable usability study application is to present the application usability test 1206a first. The exercise order value 1208b of the application usability test 1206b has a value of two (2), indicating that the computer-executable usability study application is to present the application usability test 1206b second (e.g., after the application usability test 1206a). The exercise order value 1208c of the application usability test 1206c has a value of three (3), indicating that the computer-executable usability study application is to present the application usability test 1206c third (e.g., after the application usability test 1206b). Lastly, the exercise order value 1208d of the application usability test 1206d has a value of four (4), indicating that the computer-executable usability study application is to present the application usability test 1206d fourth (e.g., after the application usability test 1206c).

Additionally, in some embodiments, a respective application usability test generated by the MaxDiff Design may define a set of graphical representations to present during such application usability test and a (e.g., visual) layout to present the set of graphical representations. For instance, in the example of FIG. 12, the plurality of application usability tests 1206a-1206d define a three (3) column visual layout, as indicated by the columns 1210-1214. Columns 1210, 1212, and 1214 define which graphical representations are to be displayed in positions within the three (3) column visual layout. Specifically, for the application usability test 1206*a*, the column 1210 includes the value of two (2), indicating that the graphical representation 824*b* is to be displayed in a beginning column of the three (3) column visual layout. Conversely, the column 1212 includes the value of three (3), indicating that the graphical representation 824*c* is to be displayed in a middle column of the three (3) column visual layout. Lastly, the column 1214 includes the value of four (4), indicating that the graphical representation 824*d* is to be displayed in an end column of the three (3) column visual layout. It shall be noted that, for the other application usability tests 1206*b*-1206*d*, the values defined in the columns 1210-1214 may be interpreted in analogous ways as described with respect to application usability test 1206*a*.

Alternatively, as illustrated in FIG. 11, if the determination 1102*b* determines that the number of graphical representations received at the compare images section 822 of user interface 802 include less than the minimum candidate threshold, process 720 may proceed to step 1102*d* that generates a plurality of application usability tests using a Choice Design. Step 1102*d* may perform similar steps as described with respect to step 1102*c*. However, in contrast to the MaxDiff Design, a respective application usability test computed via the Choice Design may define a smaller set of graphical representations to present (e.g., define two (2) graphical representations to present vs. three (3) graphical representations in the MaxDiff Design).

Additionally, or alternatively, in some embodiments, the respective application usability test computed via the Choice Design may define a different visual layout compared to the MaxDiff Design. For instance, in contrast to the three-column visual layout of the MaxDiff Design, the Choice Design may define a two-column visual layout for the set of graphical representations defined in the respective application usability test. For instance, in a non-limiting example, the set of graphical representations defined in the respective application usability test computed via the Choice Design may include a first graphical representation and a second graphical representation. In such a non-limiting example, the two-column visual layout may define that the second graphical representation is to be displayed in a beginning column of the two-column visual layout and that the first graphical representation is to be displayed in an end column of the two-column visual layout.

Figure 13:
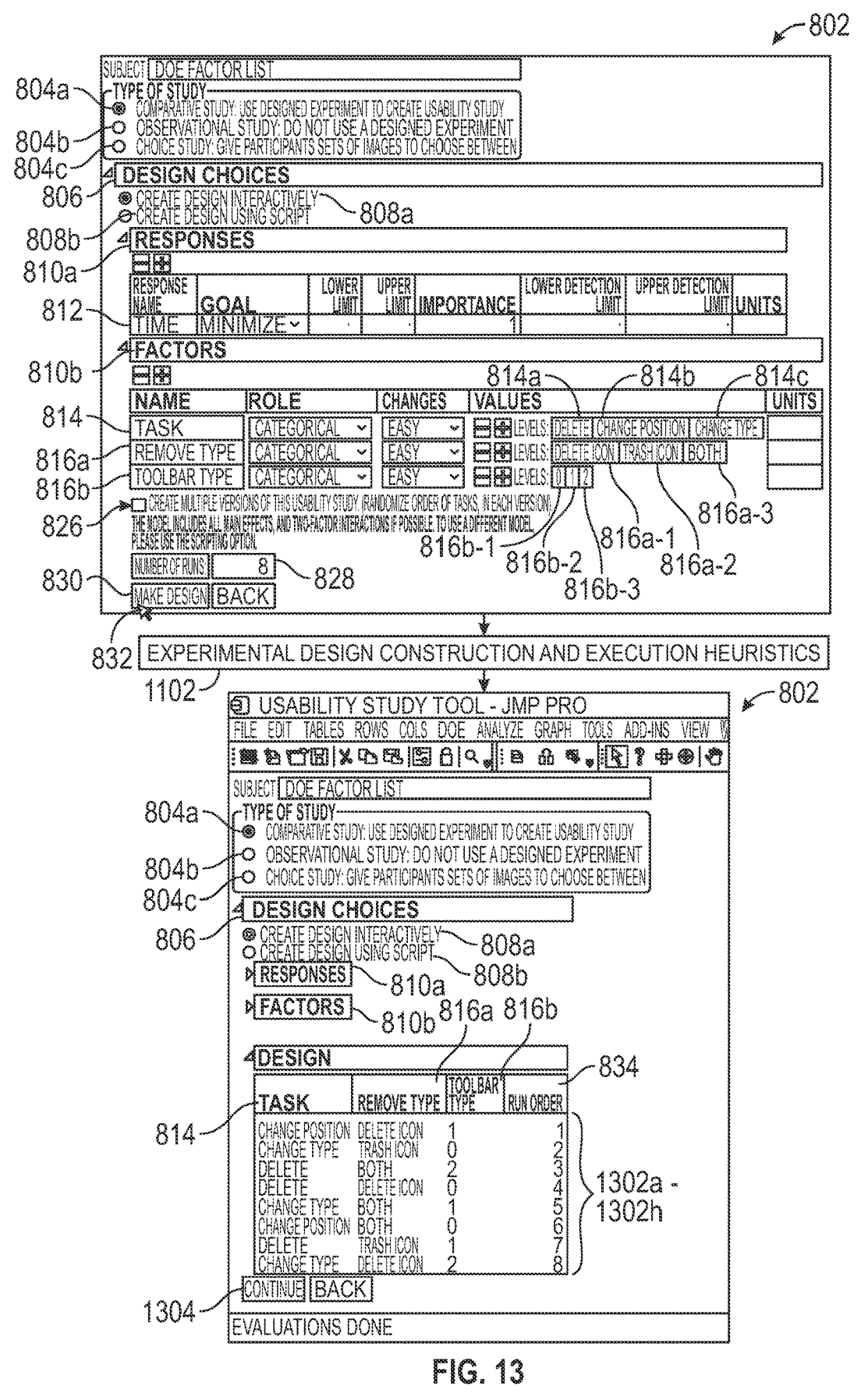

Referring to FIG. 11, in some embodiments, if the determination 1102*a* determines that the selectable option 804*a* corresponding to the "Comparative Study" is selected in the user interface 802, process 720 may proceed to determination 1102*e*. The determination 1102*e* may determine if the selectable option 826 illustrated in FIG. 13 is selected. Specifically, as indicated by the text displayed in associated with the selectable option 826, the selectable option 826 controls whether process 720 creates a single usability study or a different usability study for multiple users.

As shown in FIG. 11, if the determination 1102*e* determines that the selectable option 826 is selected in user interface 802, process 720 may proceed to step 1102*f*. Conversely, if the determination 1102*e* determines that the selectable option 826 is not selected in user interface 802, process 702 may forgo performing step 1102*f* and proceed to step 1102*g*. At step 1102*f*, process 720 may add a participants covariate factor and/or one or participant-related covariate factors to a Custom Design of Experiments (also referred to herein as "Optimal Design of Experiments" or the like). The participants covariate factor, as will be described in more detail in step 1102*i*, may instruct the Custom Design of Experiments to compute (e.g., determine) a participant that is to complete each computed application usability test. Conversely, as generally used herein, a respective participant-related covariate factor may refer to a surrogate factor that can act as a proxy for various unmeasured or latent variables that are expected to influence the outcomes of the application usability tests. Examples of participant-related covariate factors may include, but should not be limited to, a 'years of experience' factor, a 'job title' factor, an 'educational background' factor, an 'age' factor, and/or the like.

In some embodiments, after performing step 1102*f*, process 720 may proceed to step 1102*g*. At step 1102*g*, process 720 may add a run order covariate factor to the Custom Design of Experiments. The run order covariate factor, as will also be described in more detail in step 1102*i*, may instruct the Custom Design of Experiments to compute (e.g., determine) an order in which each computed application usability test is to be presented to the user(s).

In some embodiments, after performing step 1102*g*, process 720 may perform step 1102*h*. Step 1102*h* may function to collect the number of runs (e.g., the number of application usability tests) to generate via the Custom Design of Experiments. Step 1102*h*, in some embodiments, may collect the number of runs via the user interface 802. For instance, in the example of FIG. 13, the user interface 802 displays a user interface element 828 that is configured to obtain user input specifying a total number of runs to generate via Custom Design of Experiments. Specifically, in the example of FIG. 13, the user interface element 828 obtains user input specifying the numerical number eight (8), which instructs process 720 to generate eight (8) runs (e.g., eight (8) application usability tests) via the Custom Design of Experiments.

After performing step 1102*h*, process 720 may perform step 1102*i*. At step 1102*i*, process 720 may add the usability task factor and the one or more application-configuration factors obtained via the user interface 802 to the Custom Design of Experiments. For instance, in the example of FIG. 13, step 1102*i* may add the usability task factor 814 and the plurality of application-configuration factors 816*a* and 816*b* to the Custom Design of Experiments.

Additionally, or alternatively, in some embodiments, step 1102*i* may execute the Custom Design of Experiments configured via steps 1102*e*-1102*i*. Step 1102*i*, in some embodiments, may execute the Custom Design of Experiments upon (e.g., based on) receiving an input requesting a creation of a plurality of application usability tests. For instance, in the example of FIG. 13, process 720 receives an input 832 selecting the "Make Design" option 830 and, in response, executes the Custom Design of Experiments configured via steps 1102*e*-1102*i*. Furthermore, as also illustrated in FIG. 13, the execution of the Custom Design of Experiments produces an output that includes a plurality of application usability exercises 1302*a*-1302*h*.

In some embodiments, a respective application usability test computed by step 1102*i* may define a value (e.g., level) of the usability task factor 814 during such application usability test. As will be described in more detail herein, the value (e.g., level) of the usability task factor may determine the type of usability task that is to be performed during the respective application usability test. For instance, as shown in the example of FIG. 13, the plurality of application usability tests 1302*a*-1302*h* each define a respective value for the usability task factor 814. Specifically, the value of the usability task factor 814 in the plurality of application usability tests 1302a-1302h corresponds to the second level 814b (e.g., the usability task 'Change position'), the third level 814c (e.g., the usability task 'Change type), the first level 814a (e.g., the usability task 'Delete'), the first level 814a, the third level 814c, the second level 814b, the first level 814a, and the third level 814c, respectively.

Additionally, in some embodiments, a respective application usability test computed by step 1102i may define a value (e.g., level) for the plurality of application-configuration factors 816a and 816b received via the user interface 802. Collectively, as will be described in more detail herein, the values of the plurality of application-configuration factors 816a and 816b may determine the specification configuration of the target software application during the respective application usability test. For instance, as shown in FIG. 13, the plurality of application usability tests 1302a-1302h each define values for the plurality of application-configuration factors 816a and 816b.

Specifically, in the example of FIG. 13, the values of the application-configuration factors 816a and 816b in the application usability test 1302a correspond to the first level 816a-1 (e.g., "Delete icon") and the second level 816b-2 (e.g., "1"), respectively. The values of the application-configuration factors 816a and 816b in the application usability test 1302b correspond to the second level 816a-2 (e.g., "Trash icon") and the first level 816b-1 (e.g., "0"), respectively. The values of the application-configuration factors 816a and 816b in the application usability test 1302c correspond to the third level 816a-3 (e.g., "Both") and the third level 816b-3 (e.g., "2"), respectively. The values of the application-configuration factors 816a and 816b in the application usability test 1302d correspond to the first level 816a-1 (e.g., "Delete icon") and the first level 816b-1 (e.g., "0"), respectively. The values of the application-configuration factors 816a and 816b in the application usability test 1302e correspond to the third level 816a-3 (e.g., "Both") and the second level 816b-2 (e.g., "1"), respectively. The values of the application-configuration factors 816a and 816b in the application usability test 1302f correspond to the third level 816a-3 (e.g., "Both") and the first level 816b-1 (e.g., "0"), respectively. The values of the application-configuration factors 816a and 816b in the application usability test 1302g correspond to the second level 816a-2 (e.g., "Trash icon") and the second level 816b-2 (e.g., "1"), respectively. Lastly, the values of the application-configuration factors 816a and 816b in the application usability test 1302h correspond to the first level 816a-1 (e.g., "Delete icon") and the third level 816b-3 (e.g., "2"), respectively.

Additionally, in some embodiments, a respective application usability test computed by step 1102i may define a value for the run order factor added via step 1102g. As will also be described in more detail herein, the value of the run order factor may determine the order in which the respective application usability test is to be presented to the user(s). For instance, as also shown in FIG. 13, the plurality of application usability tests 1302a-1302h each define a respective value for the run order factor 834 (added via step 1102g). Specifically, in FIG. 13, the value of the run order factor 834 in the plurality of application usability tests 1302a-1302h correspond to the run order factor values one (1), two (2), three (3), four (4), five (5), six (6), seven (7), and eight (8), respectively. Thus, in such an example, the run order factor values one (1), two (2), three (3), four (4), five (5), six (6), seven (7), and eight (8) are instructing method 700 to present the application usability test 1302a first, the application usability test 1302b second, the application usability test 1302c third, the application usability test 1302d fourth, the application usability test 1302e fifth, the application usability test 1302f sixth, the application usability test 1302g seventh, and the application usability test 1302h eighth.

Referring to FIG. 11, in some embodiments, if the determination 1102a determines that the selectable option 804b corresponding to "Observational Study" is selected in the user interface 802, process 720 may proceed to determination 1102j. The determination 1102j, similar to determination 1102e, may determine if method 700 is to generate the "Observational Study" for multiple users. The determination 1102j, in some embodiments, may be based on the selection state of the selectable option 825 illustrated in FIG. 14. Specifically, in some embodiments, if process 720 detects that the selectable option 825 is selected, the determination 1102j may generate a positive determination signal and proceed to step 1102k. Conversely, in some embodiments, if process 720 detects that the selectable option 825 is not selected, the determination 1102b may generate a negative determination signal and proceed to step 1102l (e.g., without performing step 1102k).

In some embodiments, at step 1102k, process 720 may add a participants covariate factor and/or one or more participant-related covariate factors to a Custom Design of Experiments in similar ways described in step 1102f. After performing step 1102k, process 720 may proceed to step 1102l. At step 1102l, process 720 may add a task categorical factor to the Custom Design of Experiments. The task categorical factor, in some embodiments, may be or relate to a design of experiment factor with one or more categorical levels corresponding to usability tasks to be assessed during the observational usability study. For instance, in the example of FIG. 14, step 1102l may add, to the Custom Design of Experiments, a task categorical factor that includes a first level corresponding to the usability task 820a and a second level corresponding to the usability task 820b.

Figure 14:
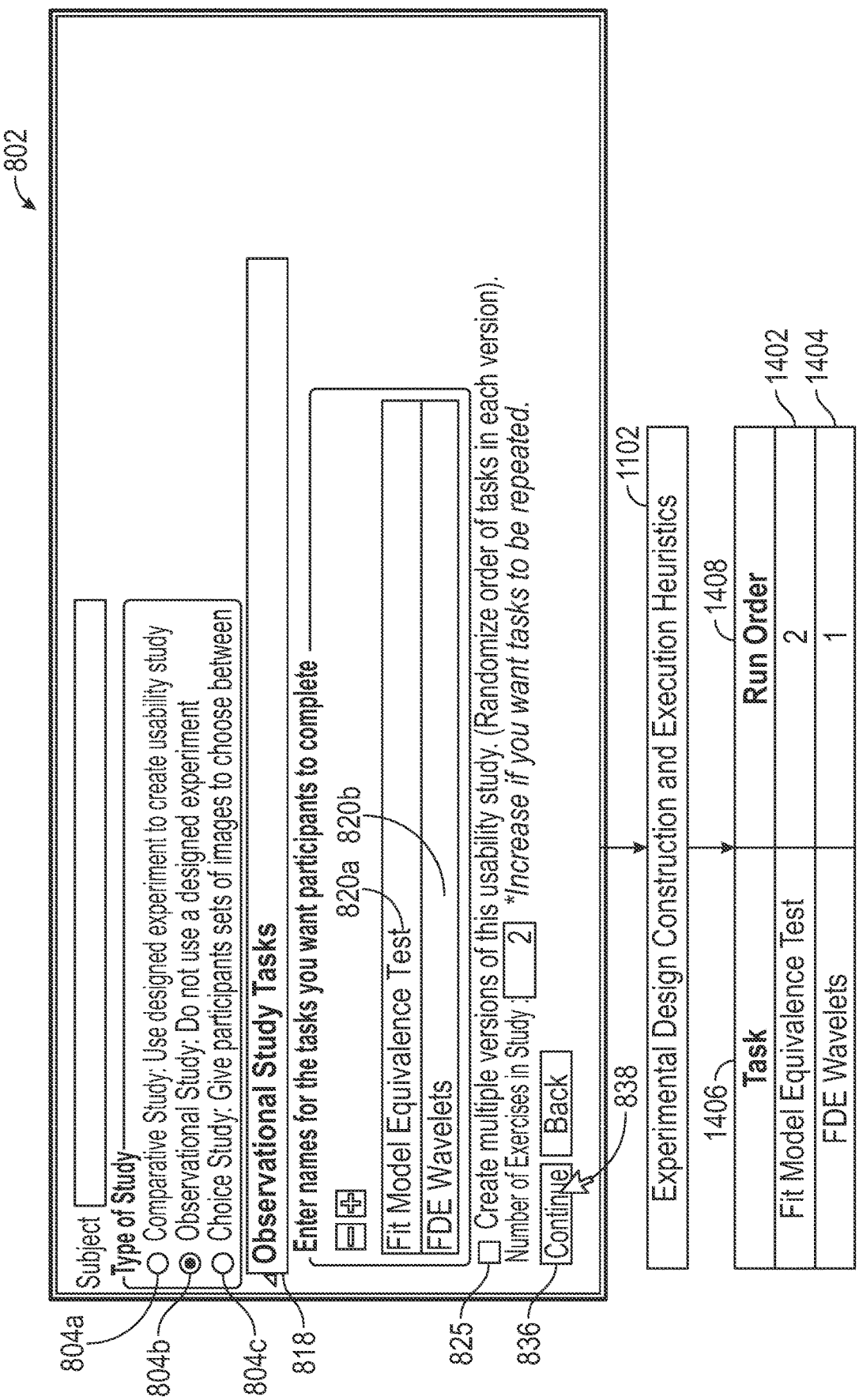

In some embodiments, after step 1102l, process 720 may proceed to step 1102m. At step 1102m, process 720 may add a run order covariate factor to the Custom Design of Experiments in similar ways described with respect to step 1102g. After step 1102m, process 720 may proceed to step 1102n. Step 1102m, in some embodiments, may execute a Custom Design of Experiments after (e.g., in response to) receiving an input requesting a creation of a plurality of application usability tests. For instance, in the example of FIG. 14, the user interface 802 receives an input 838 selecting a "Continue" option 836 and, in response, executes the Custom Design of Experiments. Furthermore, as also illustrated in FIG. 14, the execution of the Custom Design of Experiments causes a plurality of application usability tests 1402 and 1404 to be generated.

In some embodiments, a respective application usability test computed by step 1102n may define a value (e.g., level) for the task categorical factor added via step 1102l. The value of the task categorical factor, as described in more detail herein, may determine the type of usability task that is to be performed during the respective application usability test. For instance, as shown in FIG. 14, the plurality of application usability tests 1402 and 1404 each define a respective value for the task categorical factor 1406. Specifically, the value of the task categorical factor 1406 in the application usability test 1402 corresponds to the "Fit Model Equivalence Test" usability task 820a. Conversely, the value of the task categorical factor 1406 in the application usability test 1404 corresponds to the "FDE Wavelets" usability task 820b.

Additionally, in some embodiments, a respective application usability test computed by step 1102n may define a value for the run order factor added via step 1102*m*. As will also be described in more detail herein, the value of the run order factor may determine the order in which the respective application usability test is to be presented to the user(s). For instance, as also shown in FIG. 14, the plurality of application usability tests 1402-1404 each define a respective value for the run order factor 1408 added via step 1102*m*. Specifically, in FIG. 14, the value of the run order factor 1408 in the plurality of application usability tests 1402 and 1404 correspond to the run order factor values two (2) and one (1), respectively. Thus, in such an example, the run order factor values of two (2) and one (1) are instructing method 700 to present the application usability test 1404 first and the application usability test 1402 second.

Referring to FIG. 7, in some embodiments, method 700 may include process 730 that generates a computer-executable application based at least on the plurality of application usability tests. Generating a computer-executable application, as generally used herein, may refer to the creation of a software application that is configured to execute (e.g., present) the plurality of application usability tests computed via process 720. Various non-limiting examples of process 730 generating a computer-executable application based on the plurality of application usability tests will now be described with respect to FIGS. 15-26. It shall be noted that, in some portions of the disclosure, the computer-executable application generated via process 730 may be referred to as a "usability study application," an "unmoderated usability study application," and/or the like.

Figure 15:
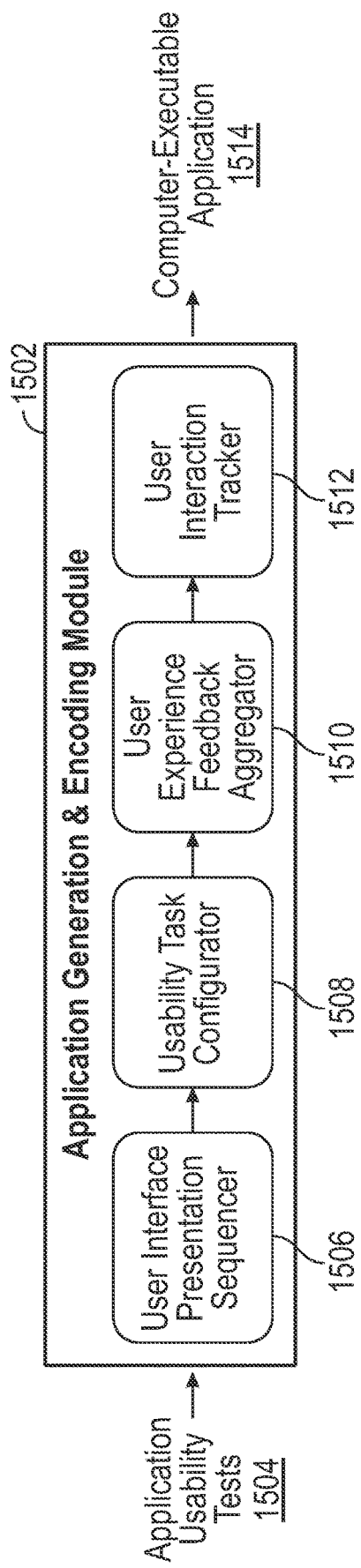

In some embodiments, process 730 may include or be in operative communication with an application generation and encoding module. An example of such a module is illustrated in FIG. 15. Specifically, in FIG. 15, process 730 is using an application generation and encoding module 1502 to generate a computer-executable application 1514. As shown in FIG. 15, in some embodiments, the application generation and encoding module 1502 may receive a plurality of application usability tests 1504. For instance, in a non-limiting example, the application generation and encoding module 1502 may receive the plurality of application usability tests 1206*a*-1206*d* illustrated in FIG. 12, the plurality of application usability tests 1302*a*-1302*h* illustrated in FIG. 13, or the plurality of application usability tests 1402 and 1404 illustrated in FIG. 14.

Figure 16:
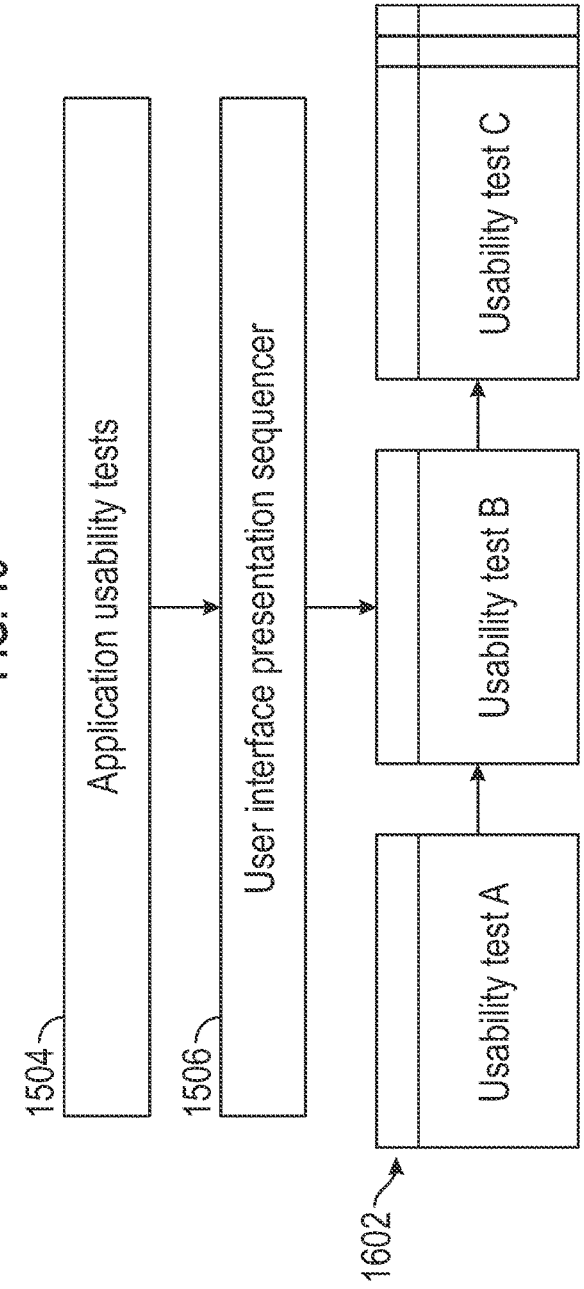

In some embodiments, as illustrated in FIG. 15, the application generation & encoding module 1502 may include a user interface presentation sequencer 1506. The user interface presentation sequencer 1506, as illustrated in FIG. 16, may receive the plurality of application usability tests 1504 and, in turn, define a presentation sequence 1602 for the computer-executable application 1514. For instance, in the example of FIG. 16, the presentation sequence 1602 is illustrating that computer-executable application 1514 is to initially present "Usability Test A", followed by "Usability Test B" second, and then "Usability Test C."

In some embodiments, the user interface presentation sequencer 1506 may derive the presentation sequence 1602 based on the run order factor value associated with each of the plurality of application usability tests. Specifically, in some embodiments, the user interface presentation sequencer 1506 may order a respective application usability test before one or more other application usability tests if the run order factor value of the respective application usability test is smaller than the run order factor values of the one or more other application usability tests. Conversely, in some embodiments, the user interface presentation sequencer 1506 may order a respective application usability test after one or more other application usability tests if the run order factor value of the respective application usability test is larger than the run order factor values of the one or more other application usability tests.

For instance, in a non-limiting example, the user interface presentation sequencer 1506 may receive the plurality of application usability tests 1302*a*-1302*h* illustrated in FIG. 13. As previously described, in the example of FIG. 13, the run order factor 834 has the value one (1), two (2), three (3), four (4), five (5), six (6), seven (7), and eight (8) in the plurality of application usability tests 1302*a*-1302*h*. Thus, in such an example, the presentation sequence 1602 may order the plurality of application usability tests 1302*a*-1302*h* in ascending order, such that the application usability test 1302*a* is presented first, the application usability test 1302*b* is presented second, the application usability test 1302*c* is presented third, the application usability test 1302*d* is presented fourth, the application usability test 1302*e* is presented fifth, the application usability test 1302*f* is presented sixth, the application usability test 1302*g* is presented seventh, and the application usability test 1302*h* is presented eighth. Stated differently, in some embodiments, the computer-executable application generated by process 730 may be configured to present the plurality of application usability tests in a sequence determined by the designed experiment (732).

Figure 17:
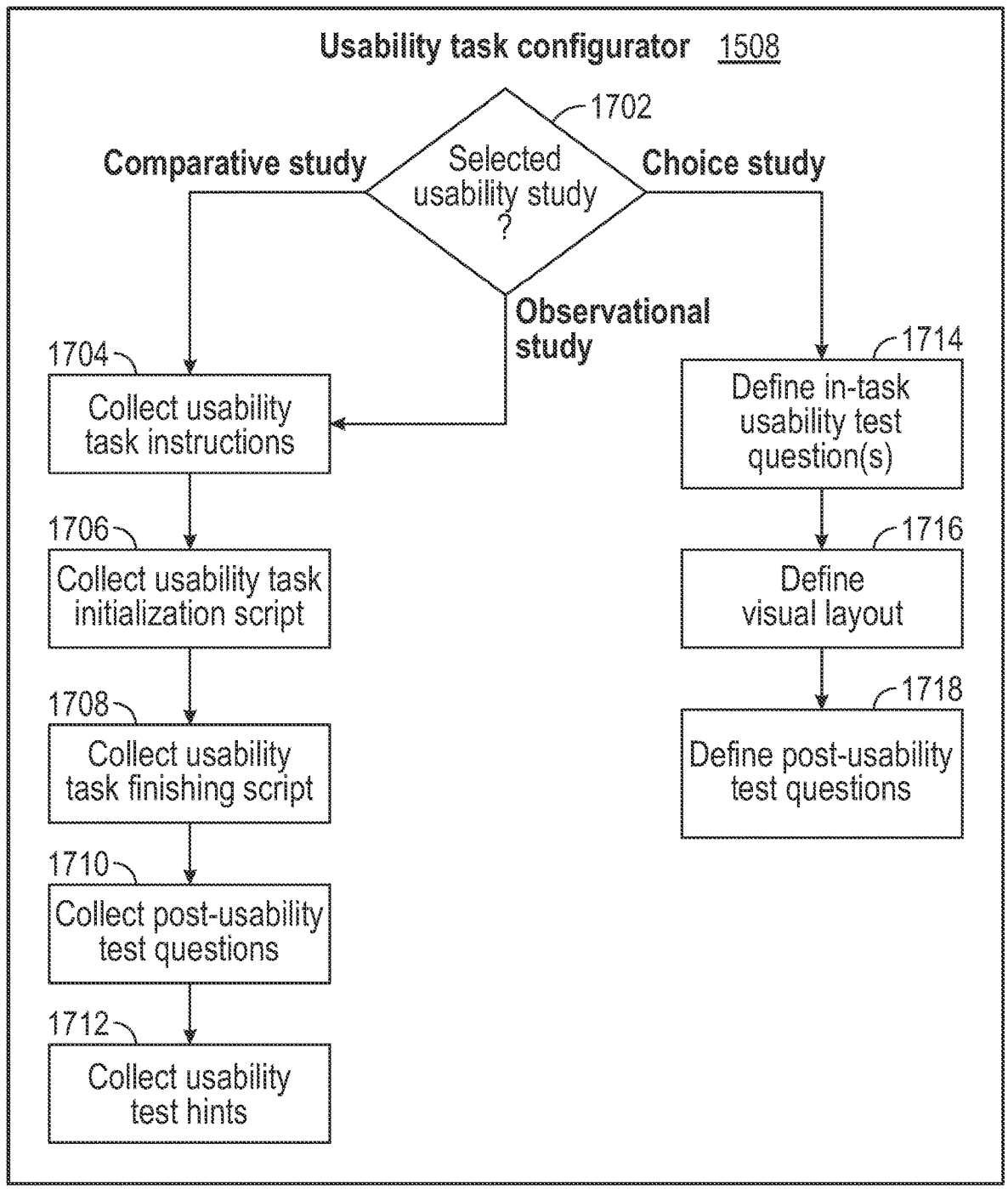

Referring to FIGS. 15 and 17, in some embodiments, the application generation and encoding module 1502 may include a usability task configurator 1508. As shown in FIG. 17, the usability task configurator 1508 may include a determination 1702 that determines the type of usability study selected at the user interface 802. For instance, in the example of FIG. 8, the determination 1702 may determine that the "comparative study" option 804*a* is selected. Conversely, in FIG. 9, the determination 1702 may determine that the "observational study" option 804*b* is selected. Lastly, in FIG. 10, the determination 1702 may determine that the "choice study" option 804*c* is selected.

In some embodiments, as illustrated in FIG. 17, the usability task configurator 1508 may proceed to step 1704 if the determination 1702 determines that the "comparative study" option 804*a* or the "observational study" option 804*b* is selected. At step 1704, the usability task configuration 1508 may collect usability task instructions. The usability task instructions, in some embodiments, may be collected after receiving an input for finalizing the plurality of application usability tests generated by process 720. For instance, in a non-limiting example, step 1704 may be commenced after detecting an input selecting the "Continue" option 1304 illustrated in FIG. 13.

Figure 18A:
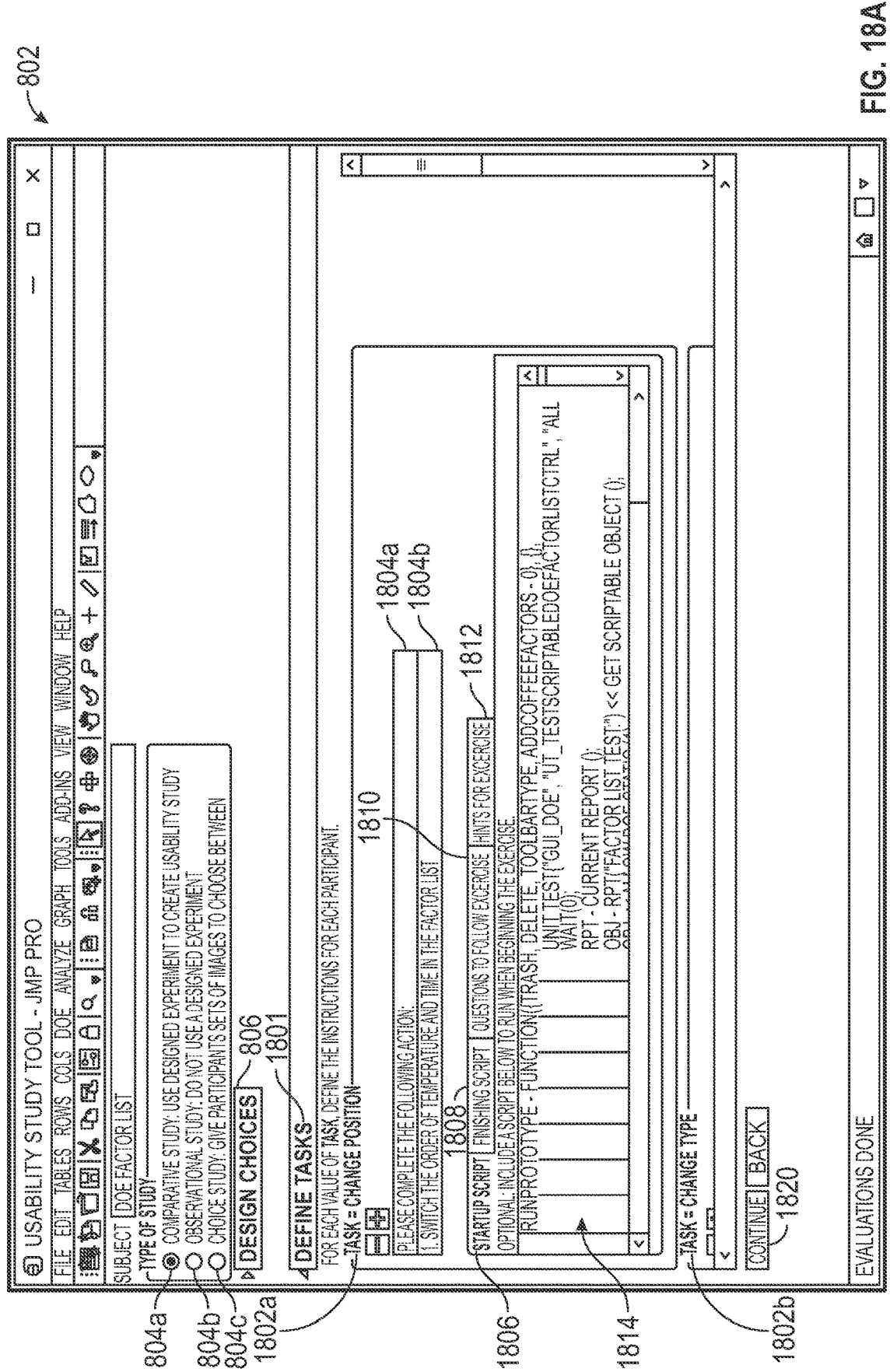

In some embodiments, step 1704 may collect the usability task instructions via a user interface. An example of step 1704 collecting the usability task instructions via a user interface is illustrated in FIG. 18A. Specifically, in FIG. 18A, step 1704 updates the user interface 802 to include a define tasks section 1801. The define tasks section 1801, in some embodiments, may include one or more task configuration panels that enable a user to define the operating behavior of the one or more levels (also referred to as "usability tasks") associated with a usability task factor (e.g., usability task factor 814 in FIG. 8 or usability task factor 1406 in FIG. 14). For instance, in the example of FIG. 18A, the user interface 802 includes a task configuration panel 1802*a* corresponding to the first level 814*a* of the usability task factor 814 illustrated in FIG. 8 and a task configuration panel 1802*b* corresponding to the second level 814*b* of the usability task factor 814 illustrated in FIG. 8. It shall be noted that, in some embodiments, the user interface 802 may be configured to receive scroll input to reveal additional portions of a task configuration panel (e.g., additional portions of the task configuration panel 1802b) and/or additional task configuration panels (e.g., a task configuration panel corresponding to the third level 814c of the usability task factor 814 illustrated in FIG. 8).

In some embodiments, a respective task configuration panel may be configured to collect one or more task instructions that are to be presented during a respective usability task. For instance, in the example of FIG. 18A, the task configuration panel 1802a corresponding to the first level 814b of the usability task factor 814 illustrated in FIG. 8 (e.g., "Change position") collects a plurality of task instructions 1804a and 1804b that are to be displayed for application usability tests of task type "Change position." Specifically, the task instructions 1804a and 1804b instruct the computer-executable application 1514 to display the instructions "Please complete the following action: 1. Switch the order of Temperature and Time in the factor list" when an application usability test of task type "Change position" is being presented.

Figure 26:
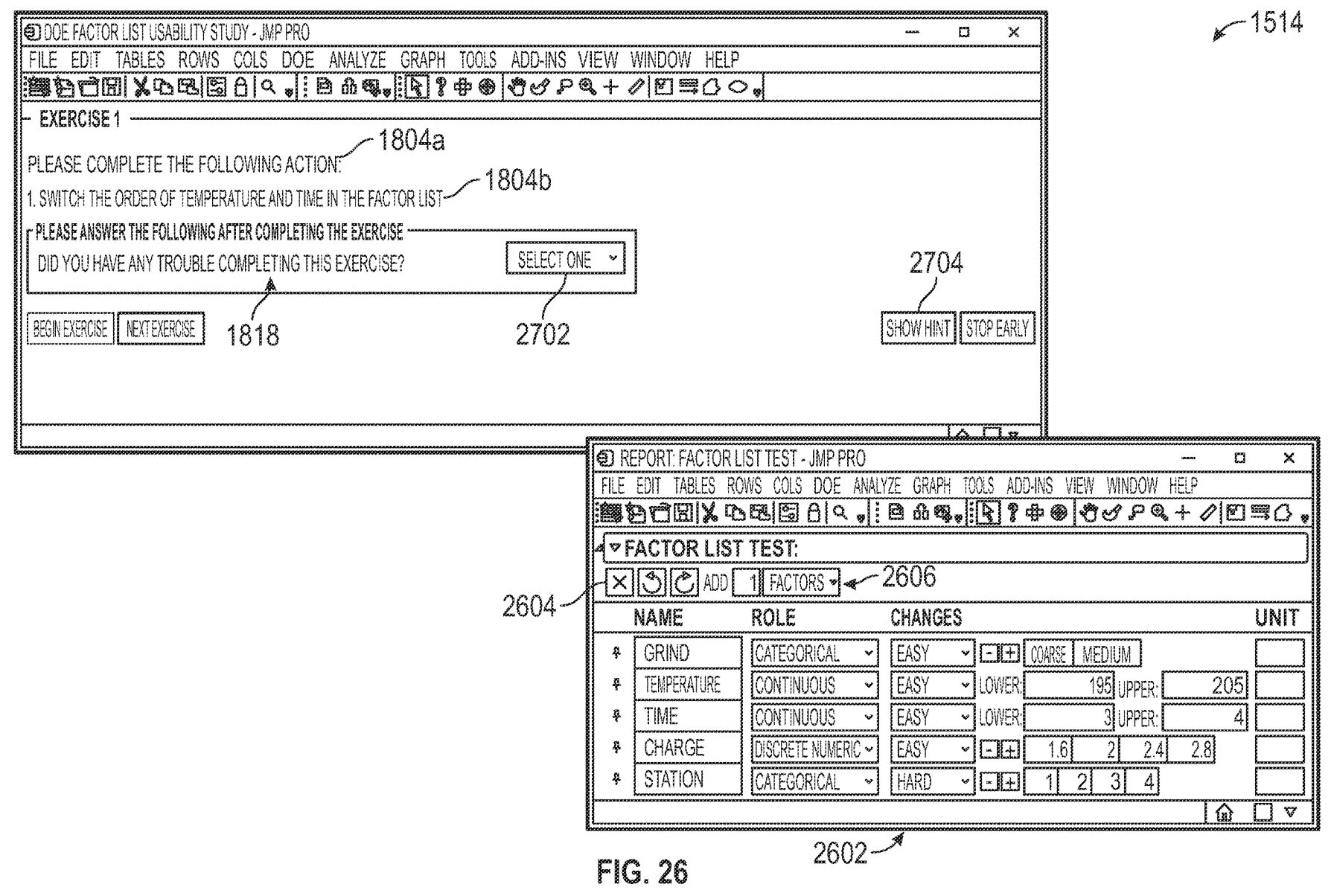

An example of the computer-executable application 1514 presenting such task instructions 1804a and 1804b during execution is illustrated in FIG. 26. In FIG. 26, the computer-executable application 1514 is executing and is currently presenting the application usability test 1302a illustrated in FIG. 13. As previously described in FIG. 13, the value of the usability task factor 814 in the application usability test 1302a corresponds to the first level 814a (e.g., "Change position"). Thus, as shown in FIG. 26, the computer-executable application 1514 displays the plurality of usability task instructions 1804a and 1804b that have been defined for such type of usability task in FIG. 18A.

Referring to FIG. 17, after performing step 1704, the usability task configurator 1508 may proceed to step 1706. At step 1706, the usability task configurator 1508 may function to collect a respective usability task initialization script for one or more levels (e.g., usability tasks) defined in a usability task factor, such as usability task factor 814 in FIG. 8. A respective usability task initialization script collected for a respective level of a usability task factor, in some embodiments, may refer to a set of computer instructions or code that are to be executed at the beginning of a presentation of an application usability test that relates to the respective level.

In some embodiments, the one or more task configuration panels 1802a and 1802b displayed in the user interface 802 may be configured to collect a respective usability task initialization (e.g., startup) script. For instance, in the example of FIG. 18A, the task configuration panel 1802a includes a startup script tab container 1806 that is configured to collect a usability task initialization script. Additionally, as shown in the example of FIG. 18A, the startup script tab container 1806 collects a usability task initialization script 1814. The usability task initialization script 1814 is configured to receive an input of one or more test conditions (e.g., factor values) defined for a respective application usability test and, in turn, dynamically generate an instance of the target software application that satisfies the test conditions of the respective application usability test.

In some embodiments, the computer-executable application 1514 may present the dynamically generated instance of the target software application during the respective application usability test. For instance, in FIG. 26, as previously described, the computer-executable application 1514 is presenting the application usability test 1302a described in FIG. 13. The application usability test 1302a, as also described in FIG. 13, includes a "Remove type" application-configuration factor 816a and a "Toolbar Type" application-configuration factor 816b with values "Delete icon" and "1," respectively. Thus, as illustrated in the example of FIG. 26, the usability task initialization script 1814 collected in FIG. 18A receives such factor values and, in turn, generates an instance 2602 of the target software application according to such factor values for presentation during the application usability test 1302a. Specifically, as illustrated in FIG. 26, the instance 2602 of the target software application displays a "Delete icon" 2604 to satisfy the value of the "Remove type" application-configuration factor 816a and toolbar 2606 to satisfy the value of the "Toolbar Type" application-configuration factor 816b in the application usability test 1302a.

It shall be noted that, in some embodiments, the instance 2602 of the target software application may be configured to receive one or more user inputs for performing the application usability test 1302a. Furthermore, it shall also be noted that if a different application usability test was being presented in FIG. 26, the generated instance of the target software application may be different to reflect the specific test conditions of the different application usability test.

Referring to FIG. 17, after performing step 1706, the usability task configurator 1508, may proceed to step 1708. At step 1708, the usability task configurator 1508 may function to collect a respective usability task finishing script for one or more levels (e.g., usability tasks) defined in a usability task factor, such as usability task factor 814 illustrated in FIG. 8 or the usability task factor 1406 illustrated in FIG. 14. A respective usability task finishing script collected for a respective level of a usability task factor, in some embodiments, may refer to a set of computer instructions or code that are to be executed at the end of an application usability test that relates to the respective level.

Figure 18B:
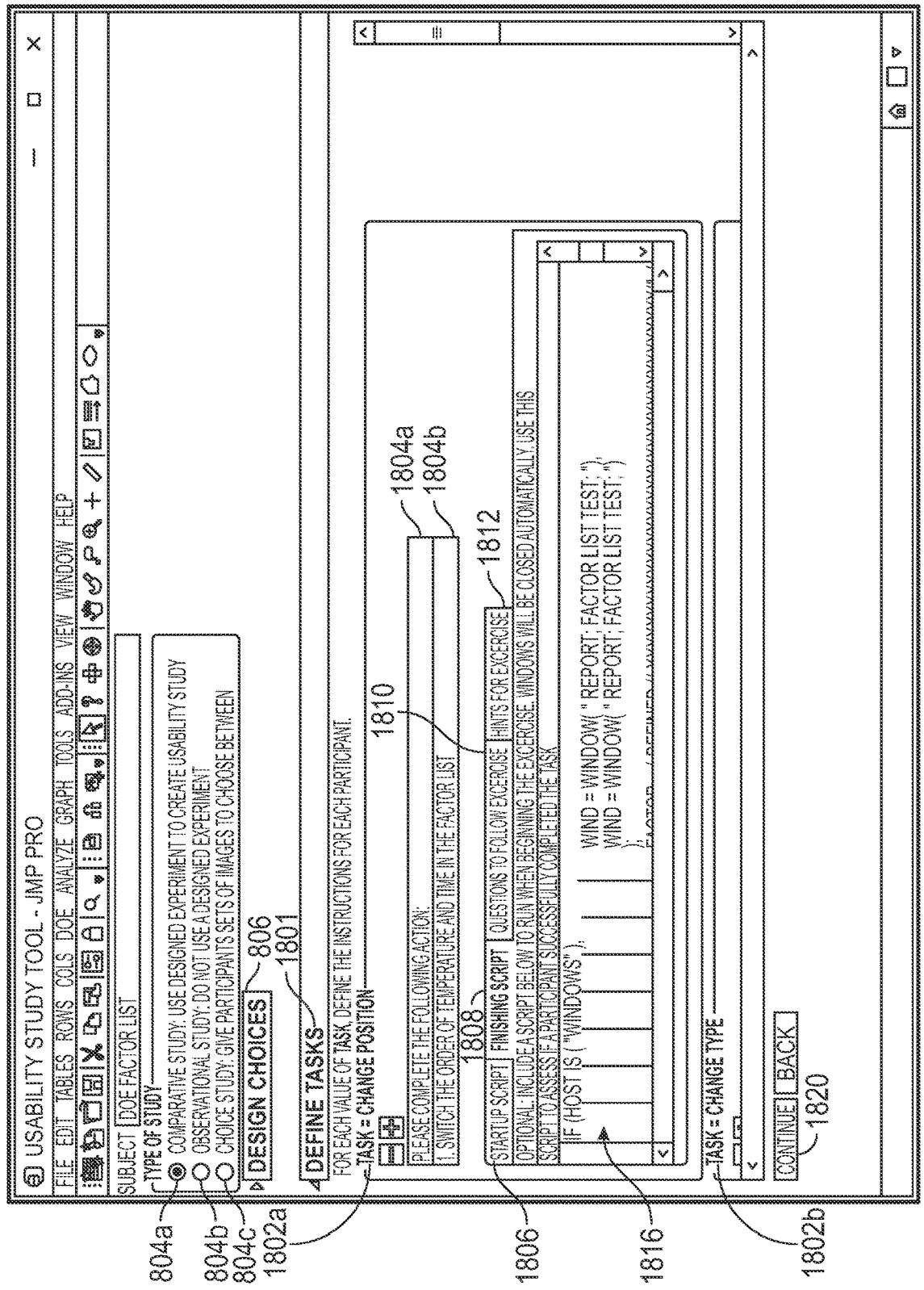

In some embodiments, the one or more task configuration panels 1802a and 1802b displayed in the user interface 802 may be configured to collect a respective usability task finishing script. For instance, in the example of FIG. 18B, the task configuration panel 1802a includes a finishing script tab container 1808 that is configured to collect a usability task finishing script. Additionally, as shown in the example of FIG. 18B, the finishing script tab container 1808 collects a usability task finishing script 1816. Specifically, in FIG. 18B, the usability task initialization script 1816 is configured to receive activity data associated with user operations during a respective application usability test (e.g., associated with the user interactions with a dynamically generated instance of the target software application). In turn, the usability task initialization script 1816 processes this activity data to verify whether the user successfully completed the requested usability task(s) and/or whether the user operations align with the expected outcomes of the application usability test.

Referring to FIG. 17, after performing step 1708, the usability task configurator 1508 may proceed to step 1710. At step 1710, the usability task configurator 1508 may function to collect one or more post-usability test questions for one or more levels (e.g., usability tasks) defined in a usability task factor, such as usability task factor 814 illustrated in FIG. 8 or usability task factor 1406 illustrated in FIG. 14. Post-usability test questions, as generally used herein, may refer to a question or a set of questions that are to be answered by a user after such user has completed a respective application usability test. Some examples of post-usability test questions may include, but should not be limited to, questions relating to the difficulty of a respective usability task, questions relating to the intuitiveness of the presented instance of the target software application, issues or challenges encountered during the application usability test, overall satisfaction with the presented instance of the target software application, and/or the like.

Figure 18C:
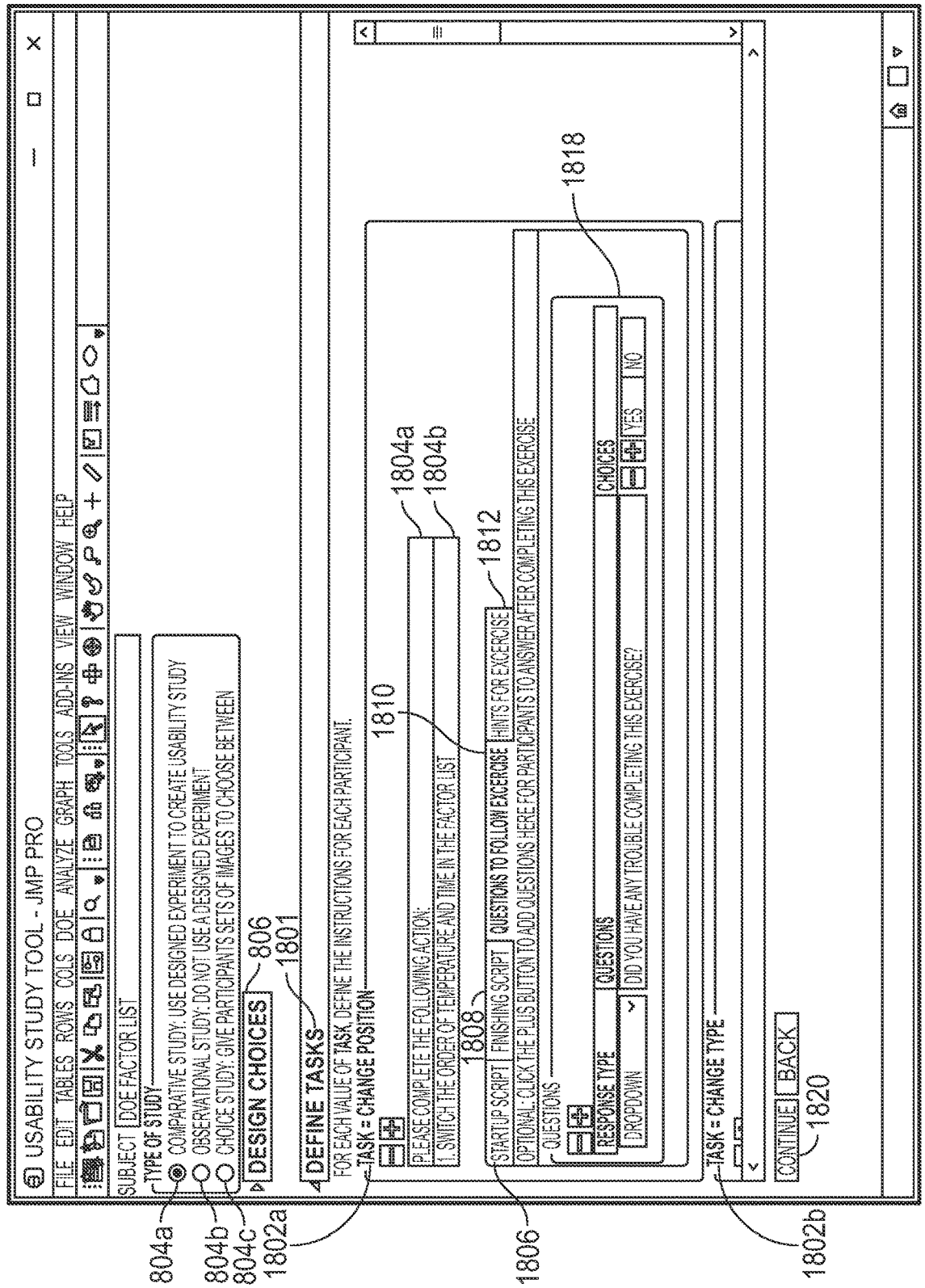
Figure 18D:
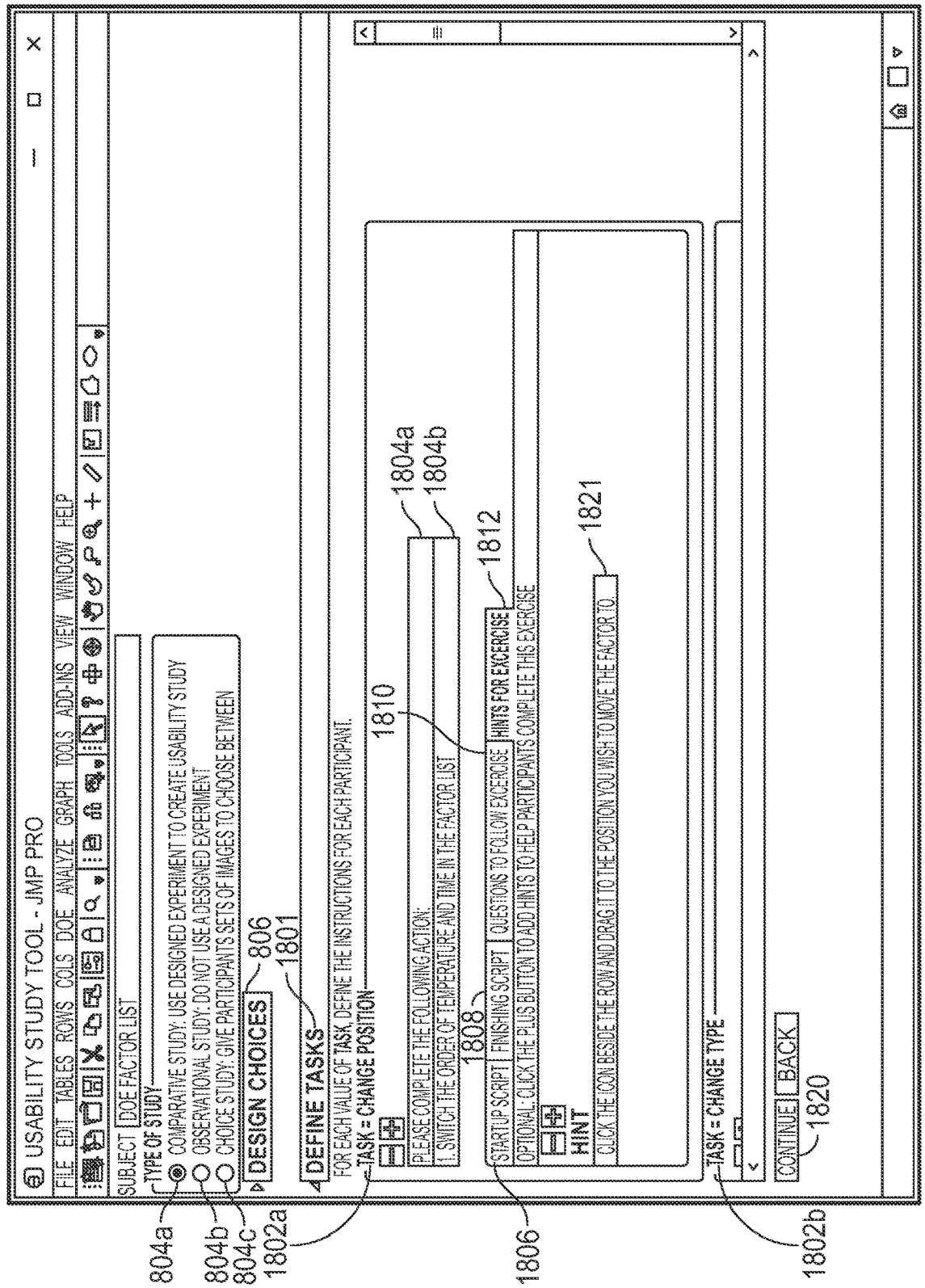

In some embodiments, the one or more task configuration panels 1802*a* and 1802*b* displayed in the user interface 802 may be configured to collect post-usability test questions. For instance, in the example of FIG. 18C, the task configuration panel 1802*a* includes a "Questions to follow exercise" tab container 1810 that is configured to collect post-usability test questions from a user. Specifically, in the example of FIG. 18C, the tab container 1810 collects a post-usability test question 1818. The post-usability test question 1818, as illustrated in FIG. 18C, refers to the question "Did you have any trouble completing this exercise" with dropdown choices "Yes" or "No."

An example of the computer-executable application 1514 presenting the post-usability test questions during execution is illustrated in FIG. 26. As previously described, in FIG. 26, the computer-executable application 1514 is executing and is currently presenting the application usability test 1302*a* described in FIG. 13. The application usability test 1302*a*, as described in FIG. 13, includes the usability task factor 814 and has a value corresponding to the "Change Position" usability task level (e.g., the first level 814*a* in FIG. 13). Thus, as shown in FIG. 26, the computer-executable application 1514 displays the post-usability test question 1818 that has been defined for such a type of usability task in FIG. 18C. Additionally, as shown in FIG. 26, the computer-executable application 1514 is displaying the post-usability test question 1818 with a dropdown option 2702 that is configured to receive input for answering the post-usability test question 1818.

Referring to FIG. 17, after performing step 1710, the usability task configurator 1508 may proceed to step 1712. At step 1712, the usability task configurator 1508 may function to collect one or more usability test hints. Usability test hints, as generally referred to herein, may refer to a hint or a set of hints that aid a user in completing a respective application usability test. Some examples of usability hints may be, but should not be limited to, "Remember, the 'Save' button is located at the top right corner of the screen.", or the like. Accordingly, in this example, such a usability test hint may assist a user who is tasked with saving a document or changes during a respective application usability test.

In some embodiments, the one or more task configuration panels 1802*a* and 1802*b* displayed in the user interface 802 may be configured to collect the usability tests hints. For instance, in the example of FIG. 18D, the task configuration panel 1802*a* includes a "Hints for exercise" tab container 1812 that is configured to collect usability test hints from a user. Specifically, in the example of FIG. 18D, the tab container 1812 collects a usability test hint 1821 that includes the text "Click the icon beside the row and drag it to the position you wish to move the factor to."

In operation, the usability test hint 1821 may be presented to the user upon detection of a "Show Hint" selectable option (or the like). For instance, in the example of FIG. 26, the computer-executable application 1514 may display the usability test hint 1821 when a selection of the "Show Hint" selectable option 2704 is detected. It shall be noted that while the user interface 802 displayed in FIGS. 18A-18D illustrates the selectable option 804*a* being selected, steps 1704-1712 may present analogous user interfaces when the selectable option 804*b* is selected.

Conversely, as shown in FIG. 17, if the determination 1702 determines that the "choice study" option 804*c* is selected in the user interface 802, the usability task configurator 1508 may proceed to step 1714. At step 1714, the usability task configurator 1508 may (e.g., automatically) define one or more in-task usability exercise questions that are to be completed during a respective application usability test. The one or more in-task usability exercise questions, in some embodiments, may be based on the type of design of experiment used to generate the plurality of application usability tests. For instance, in a non-limiting example, if process 720 computes the plurality of application usability via step 1102*c* in FIG. 11, the one or more in-task usability exercise questions may include questions that prompt a user to select a preferred graphical representation and a least preferred graphical representation from a set of graphical representations associated with a respective application usability test. Conversely, in some embodiments, if process 720 computes the plurality of application usability via step 1102*d* in FIG. 11, the one or more in-task usability exercise questions may include a question that prompts a user to select a preferred graphical representation from a set of graphical representations associated with a respective application usability test (and, optionally, a least preferred graphical representation from the set of graphical representations).

Figure 25:
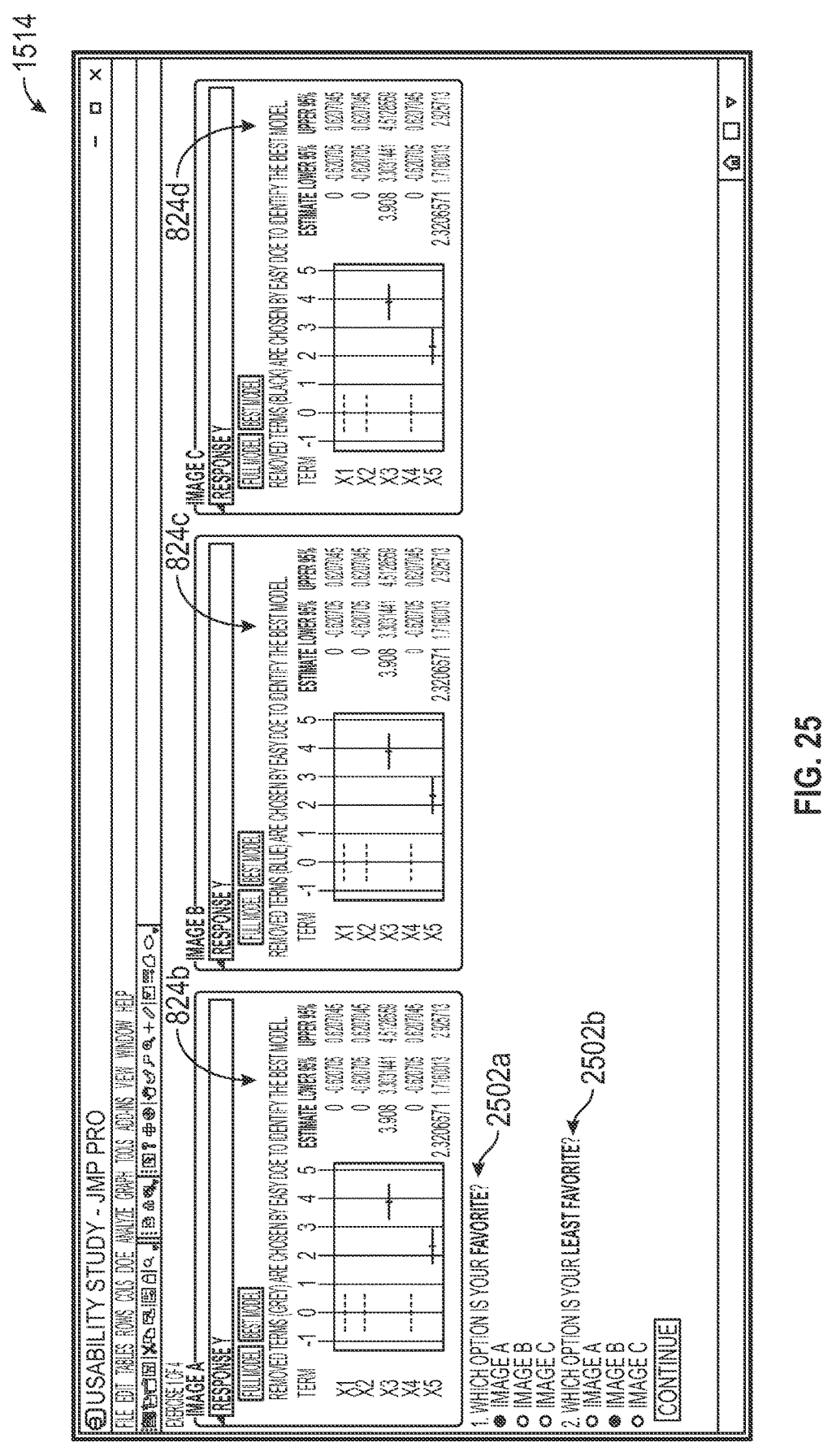

An example of the computer-executable application 1514 presenting the in-task usability exercise questions is illustrated in FIG. 25. In the example of FIG. 25, the computer-executable application 1514 is executing and presenting the application usability test 1206*a* described in FIG. 12. Specifically, in FIG. 25, the application usability test 1206*a* is displaying a set of graphical presentations 824*b*-824*d* for the reasons described in FIG. 12. Additionally, as described previously, the application usability test 1206*a* (and the other application usability tests 1206*b*-1206*d*) were computed via a MaxDiff Designed Experiment. Thus, as shown in FIG. 25, because the application usability test 1206*a* was computed via a MaxDiff Designed Experiment, the application usability test 1206*a* includes questions 2502*a* and 2502*b* that prompt the user to select a preferred graphical representation and a least preferred graphical representation from the set of graphical presentations 824*b*-824*d*.

It shall be noted that while FIG. 25 illustrates the computer-executable application presenting the application usability test 1206*a*, the computer-executable application 1514 is also configured to present other application usability tests, such as 1206*b*-1206*d*, in a similar manner. Each of the other application usability tests may define a respective set of graphical presentations to present and corresponding in-task usability exercise questions, based on the design of experiments used to compute such application usability tests.

Referring to FIG. 17, after performing step 1714, the usability task configurator 1508 may proceed to step 1716. In step 1716, the usability task configurator 1508 may (e.g., automatically) define a visual layout for presenting a set of graphical representations. The visual layout, as generally used herein, may control the manner in which the set of graphical representations are displayed to the users during the respective application usability test and/or may allow the user to view multiple graphical representations at once to facilitate user comparison and selection. Step 1716, in some embodiments, may define a three-column visual layout. For instance, in the example of FIG. 25, the computer-executable application 1514 is presenting the plurality of graphical representations 824*b*-824*d* a three-column visual layout during the application usability test 1206*a*.

It shall be noted that while the above description describes embodiments where step 1716 defines a three-column layout, other visual layouts may be defined by step 1716 without departing from the scope of the disclosure. For example, in another non-limiting example, step 1716 may define visual layouts based on the requirements of the usability study or preferences of the users, such as a two-column layout, a grid layout, a carousel layout, or any other layout that effectively presents the graphical representations to the users.

Referring to FIG. 17, after performing step 1716, the usability task configurator 1508 may proceed to step 1718. At step 1718, the usability task configurator 1508 may (e.g., automatically) define post-usability test questions for the choice usability study. Similar to step 1710, the post-usability test questions defined for the choice usability study may refer to a question or a set of questions that are to be answered by a user after the user has completed a respective application usability test. Some examples of post-usability test questions may include, but should not be limited to, open-ended questions that allow users to provide unstructured feedback, multiple-choice questions, scale-based questions, or the like. In operation, the computer-executable application 1514 may present the post-usability test questions upon completion of a respective choice usability test.

Figure 19:
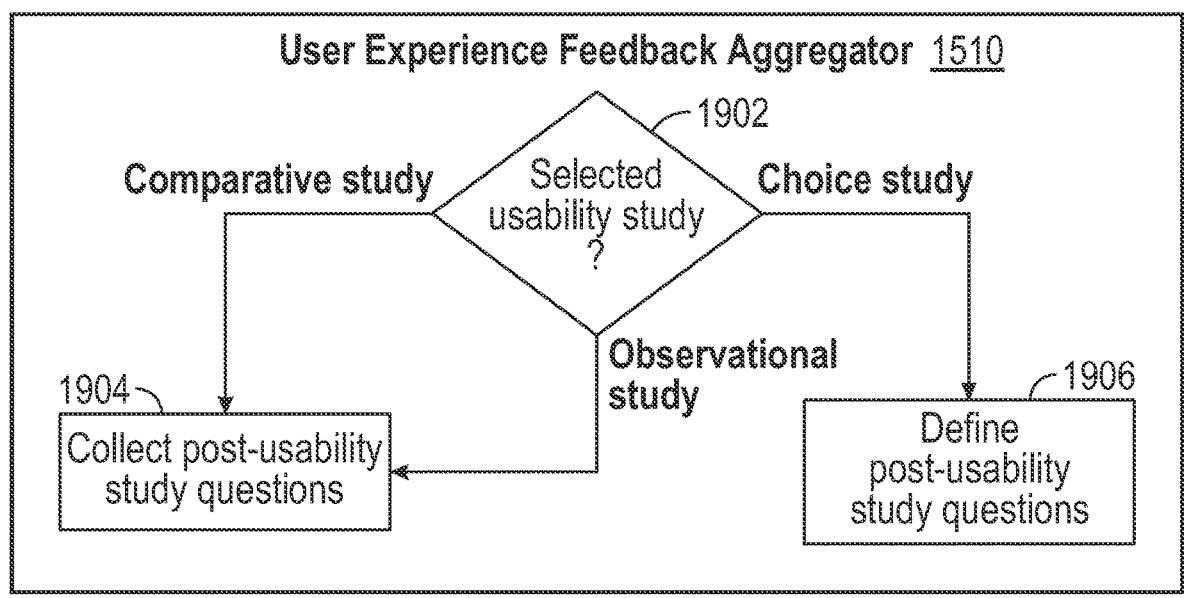

Referring to FIGS. 15 and 19, in some embodiments, the application generation and encoding module 1502 may include a user experience feedback aggregator 1510. As shown in FIG. 19, the user experience feedback aggregator 1510 may include a determination 1902 that determines the type of usability study selected at the user interface 802. The determination 1902 may determine the type of usability study selected at the user interface 802 in similar ways as determination 1102*a* in FIG. 11 or determination 1702 in FIG. 17.

In some embodiments, as illustrated in FIG. 19, if the determination 1902 determines that the "comparative study" option 804*a* or the "observational study" option 804*b* is selected, the user experience feedback aggregator 1510 may proceed to step 1904. At step 1904, the user experience feedback aggregator 1510 may function to collect one or more post-usability study questions that the computer-executable application 1514 is to display. Post-usability study questions, as generally used herein, may refer to a question or a set of questions that are to be answered by a user after the user has completed the plurality of application usability tests (e.g., the application usability tests 1206*a*-1206*d*, 1302*a*-1302*h*, or 1402-1404 described in FIGS. 11-14, respectively). The post-usability study questions may also be of one or more types including, but not limited to, multiple choice type questions, free response type questions, binary answer type questions, and/or the like.

Figure 20:
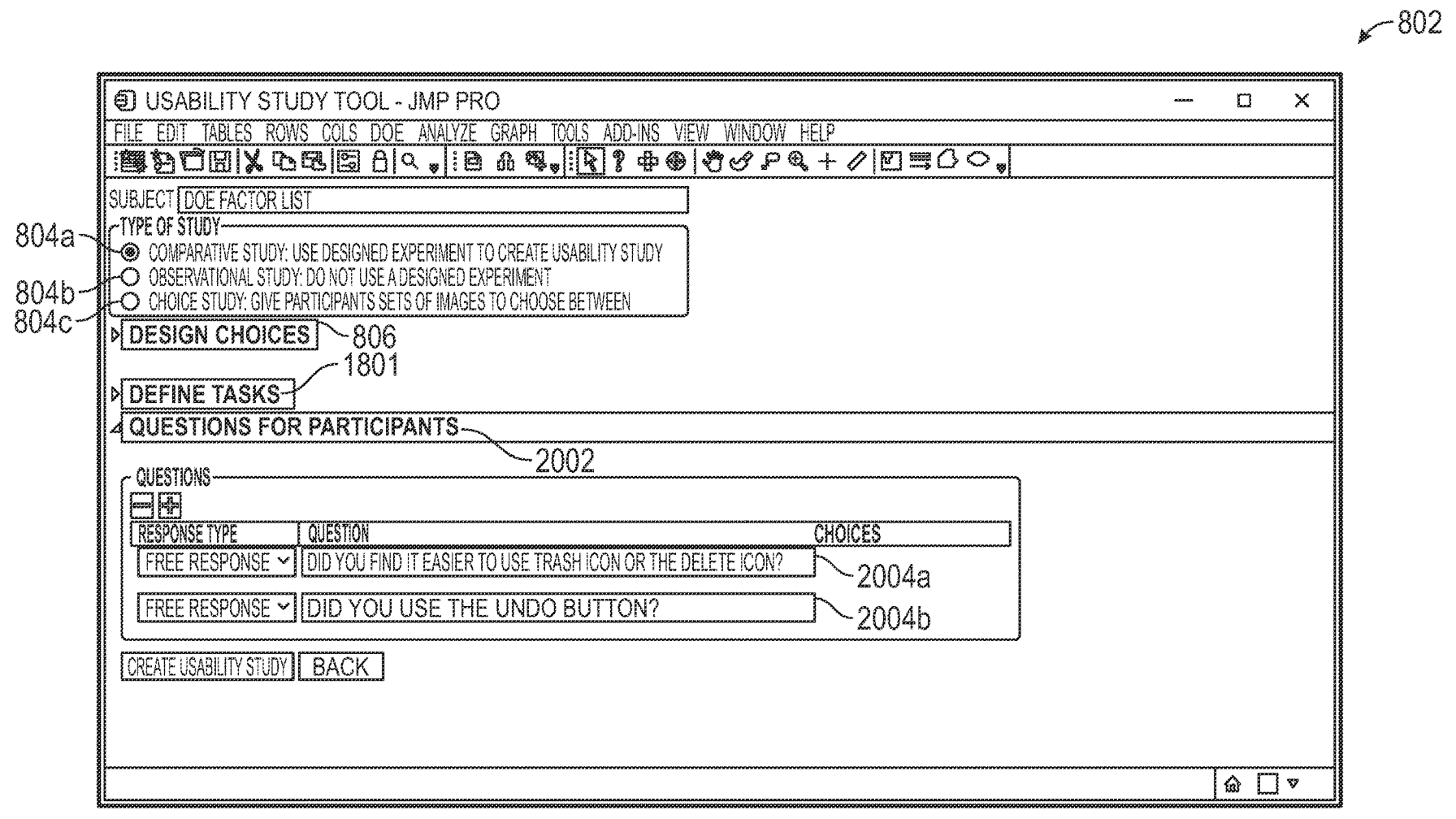

In some embodiments, step 1904 may be commenced after detecting an input for finalizing the usability tasks. For instance, in a non-limiting example, step 1904 may be commenced upon detecting an input selecting the "Continue" selectable option 1820 in FIGS. 18A-18D. After detecting such an input, step 1904 may display a new user interface or update a currently displayed user interface to collect the post-usability study question. For instance, as illustrated in FIG. 20, after detecting such an input, step 1904 updates the user interface 802 to include a questions for participant section 2002 that is configured to collect one or more post-usability study questions from a user. Additionally, as illustrated in FIG. 20, the questions for participant section 2002 collects a plurality of post-usability study questions 2004*a* and 2004*b*. The post-usability study question 2004*a*, in the example of FIG. 20, relates to a free response type question and includes question text "Did you find it easier to use the Trash icon or the Delete icon?". Similarly, the post-usability study question 2004*b*, relates to a free response type question and includes question text "Did you use the Undo button?".

Conversely, as shown in FIG. 19, if the determination 1902 determines that the "choice study" option 804*c* is selected in the user interface 802, the user experience feedback aggregator 1510 may proceed to step 1906. At step 1906, the user-experience feedback aggregator 1510 may (e.g., automatically) define one or more post-usability study questions for the choice usability study. In a manner similar to step 1904, the post-usability study questions defined by step 1906 may refer to a question or a set of questions that the computer-executable application 1514 is to display after a user has completed the plurality of application usability tests 1504. The post-usability study questions defined by step 1906 may also be of one or more types including, but not limited to, multiple choice type questions, free response type questions, binary answer type questions, and/or the like.

In some embodiments, step 1906 may use statistical measures collected from earlier usability studies to automatically define the one or more post-usability study questions. Specifically, in some embodiments, step 1906 may utilize prior mean or other statistical measures available in a design of experiments platform (e.g., a choice design platform) to determine optimal post-usability study questions. Accordingly, in such embodiments, step 1906 may be able to dynamically define post-usability study questions based on emerging data trends and insights derived from previous usability studies, thereby enhancing the precision of subsequent iterations of a usability study.

Figure 21:
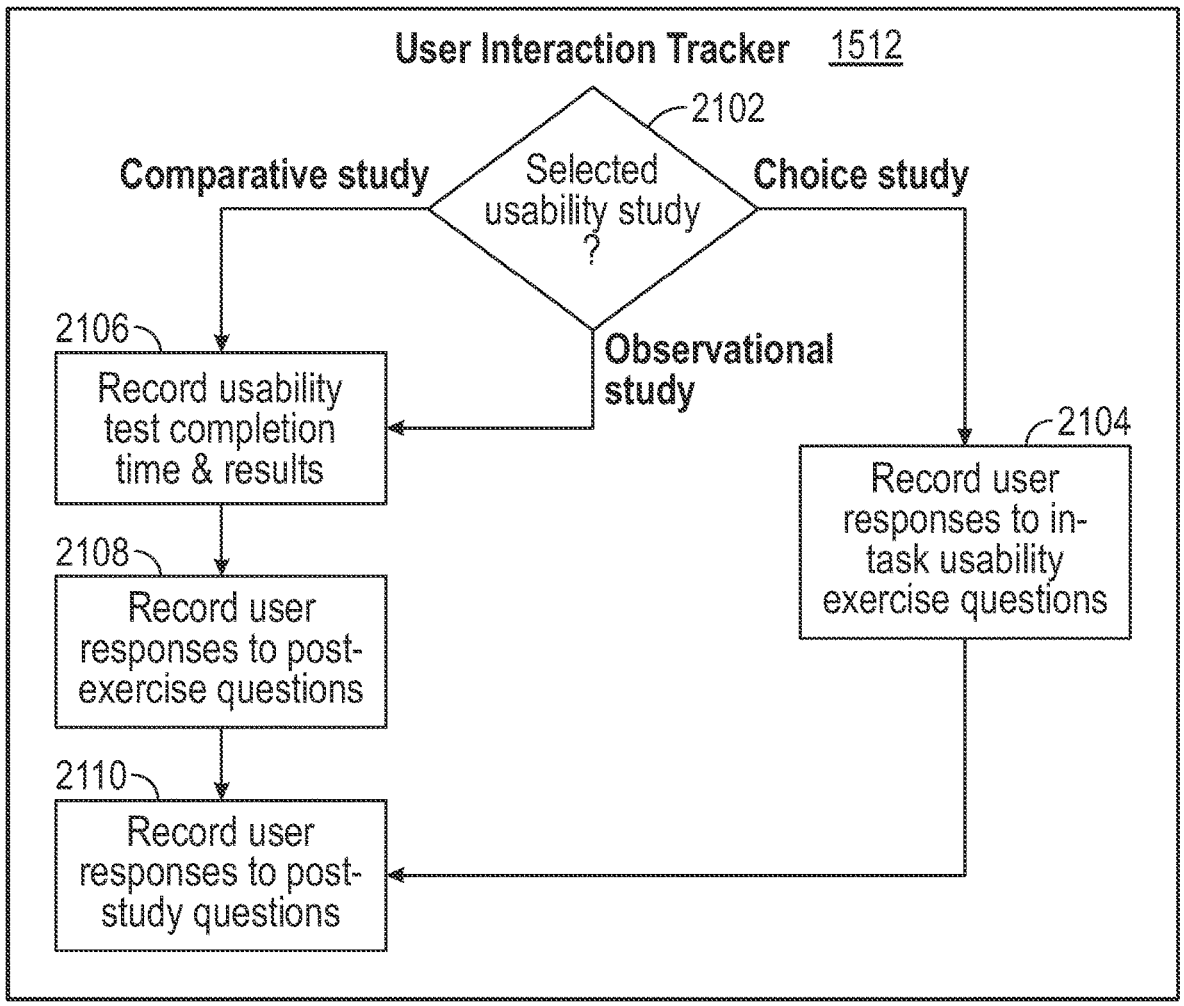

Referring to FIGS. 15 and 21, in some embodiments, the application generation and encoding module 1502 may include a user interaction tracker 1512. As shown in FIG. 21, the user interaction tracker 1512 may include a determination 2102 that determines the type of usability study selected in user interface 802. The determination 1902 may determine the type of usability study selected at the user interface 802 in the same way or similar ways as determination 1102*a* in FIG. 11, determination 1702 in FIG. 17, or determination 1902 in FIG. 19.

In some embodiments, as also illustrated in FIG. 21, if the determination 2102 determines that the "choice study" option 804*c* is selected in the user interface 802, the user interaction tracker 1512 may proceed to step 2104. At step 2104, the user interaction tracker 1512 may cause the computer-executable application 1514 to record user responses to in-task usability exercise questions (e.g., the in-task usability exercises defined by step 1714 in FIG. 17).

In some embodiments, step 2104 may record interactions in a data table. The data table, in some embodiments, may comprise a plurality of rows and a plurality of columns. The plurality of rows may each correspond to a respective application usability test completed by a user. For instance, in the example of FIG. 22, the user interaction tracker 1512 caused the computer-executable application 1514 to generate a data table 2200 that includes user activity records 2202*a*-2202*l*. Specifically, in the example of FIG. 22, the user interaction tracker 1512 generates the user activity records 2202*a*-2202*c*, 2202*d*-2202*f*, 2202*g*-2202*i*, and 2202*k*-2202*l* based on the user responses collected in the application usability exercise 1206*a*, 1206*b*, 1206*c*, and 1206*d*, respectively.

In some embodiments, the data table 2200 may also include one or more columns. For instance, as also shown in FIG. 22, the data table 2200 includes a choice set column 2204*a*, a favorite graphical representation column 2204*b*, a least favorite graphical representation column 2204*c*, a position column 2204*d*, an image column 2204*e*, a choice column 2204*f*, and a subject ID column 2204*g*. The values of the columns 2204*a*-2204*g* may each correspond to specific data collected during the plurality of application usability tests 1206*a*-1206*d*. For instance, in FIG. 22, the user activity record 2202*a* includes the value one (1) in the choice set column 2204*a* indicating that the activity record 2202*a* corresponds to the application usability test with a choice set value of one (1) in FIG. 12 (e.g., application usability test 1206*a*).

Additionally, as shown in FIG. 12, the user activity record 1206*a* also includes the value two (2) in the favorite graphical representation column 2204*b* indicating that the user selected graphical representation 824*b* as the preferred graphical representation among the set of graphical representations 824*b*-824*d*. The user activity record 1206*a* also includes the value three (3) in the choice set column 2204*c* indicating that the user selected graphical representation 824*d* as the least preferred graphical representation among the set of graphical representations 824*b*-824*d*. The user activity record 1206*a* also includes the value one (1) in the position column 2204*c* indicating that the application usability test 1206*a* displayed the graphical representation 824*b* in a beginning column of a three-column layout. The user activity record 1206*a* also includes the value two (2) in the image column 2204*f* indicating that activity record 2202*a* relates to the graphical representation 824*b*. The user activity record 1206*a* also includes the value one (1) in the choice column 2204*f* indicating the user most preferred the graphical representation 824*b*. Lastly, the user activity record 1206*a* also includes the value "813338315 . . . " in the subject column 2204*g* indicating that such participant ID number is associated with the activity record 2202*a*. It shall be noted that the remaining activity records 2202*b*-2202*l* may be interpreted in analogous ways.

Thus, in some embodiments, the computer-executable application 1514 is configured to collect activity data associated with one or more user operations during one or more of the plurality of application usability tests (736). After performing step 2104, the user interaction tracker 1512 may proceed to step 2110, which will be described in more detail herein.

Conversely, as illustrated in FIG. 21, if the determination 2102 determines that the "comparative study" option 804*a* or the "observational study" option 804*b* is selected in the user interface 802, the user interaction tracker 1512 may proceed to step 2106. At step 2106, the user interaction tracker 1512 may cause the computer-executable application 1514 to record application usability test completion times and the results of such application usability tests. Step 2106, in some embodiments, may record the application usability test completion times and the results of such application usability tests in a data table that comprises one or more user activity records. For instance, in the example of FIG. 23, the user interaction tracker 1512 causes the computer-executable application 1514 to generate a data table 2300 comprising a plurality of user activity records 2302*a*-2302*h*.

In some embodiments, the plurality of user activity records 2302*a*-2302*h* may each correspond to a respective application usability exercise. For instance, in the example of FIG. 23, the plurality of user activity records 2302*a*-2302*h* correspond to the plurality of application usability tests 1302*a*-1302*h* illustrated in FIG. 13, respectively. Additionally, as also illustrated in FIG. 23, the data table 2300 may include one or more columns. Specifically, in the example of FIG. 23, the data table 2300 includes an exercise column 2304*a*, a time(s) column 2304*b*, a finishing script result column 2304*c*, and a participant ID column 2304*d*.

In some embodiments, the values of the columns 2304*a*-2304*d* may include data collected during the plurality of application usability tests 1302*a*-1302*h*. For instance, as shown in FIG. 23, the user activity record 2302*a* includes the value one (1) in the exercise column 2304*a*, indicating that the user activity record 2302*a* corresponds to application usability test 1302*a* in FIG. 13. The user activity record 2302*a* also includes the value "168.867463" in the "Time (s)" column 2304*b*, indicating that the user completed the application usability test 1302*a* in 168.867463 seconds. The user activity record 2302*a* also includes the value "factors=expected . . . " in the finishing script result column 2302*c*. Lastly, the user activity record 2302*a* also includes the value "9839253662" in the participant ID column 2304*d*, indicating that the user activity record 2302*a* is associated with activity from a user with the ID "9839253662."

Referring to FIG. 21, after performing step 2106, the user interaction tracker 1512 may proceed to steps 2108 and 2110. At step 2108, the user interaction tracker 1512 may cause the computer-executable application 1514 to record user responses to post-exercise questions. Conversely, at step 2110, the user interaction tracker 1512 may cause the computer-executable application 1514 to record user responses to post-study questions. In analogous ways to the aforementioned steps, steps 2108 and/or 2110, in some embodiments, may generate a user activity data table. For instance, as shown in the example of FIG. 24, steps 2108 and/or 2110 cause the computer-executable application 1514 to generate a data table 2400.

In some embodiments, the data table 2400 may include one or more user activity rows. Each user activity row of the data table 2400 may correspond to a respective post-usability test question or a post-usability study question. For instance, in the example of FIG. 24, the user activity rows 2402*a* and 2402*b* correspond to user answers collected for the question 1818 defined in FIG. 18C. Conversely, the user activity rows 2402*c* and 2402*d* correspond to user answers collected for the post-usability study questions 2004*a* and 2004*b* defined in FIG. 20.

Additionally, as illustrated in FIG. 24, the data table 2400 may include one or more columns. Specifically, in the example of FIG. 24, the data table 2400 includes an exercise column 2404*a*, a question column 2404*b*, an answer column 2404*c*, and a participant ID column 2404*d*. The values of the columns 2404*a*-2404*d* may each correspond to specific data collected for a respective question. For instance, in the example of FIG. 24, the user activity row 2402*a* includes the value "Exercise 1" indicating that the user activity row relates to a post-exercise question prompted after "Exercise 1" (e.g., application usability test 1302*a*). Additionally, the user activity row 2402*a* also includes the value "Did you have any trouble completing this exercise" indicating the user activity row 2402*a* relates to the prompting of question 1818 in FIG. 18C. The user activity row 2402*a* also includes the value "No" indicating that a user answered "No" to the question 1818. Lastly, the user activity row 2402*a* also includes the value "9839253662" in the participant ID column 2404*d*, indicating that the user activity record 2402*a* is associated with activity collected from a user with the ID "9839253662."

Figure 27:
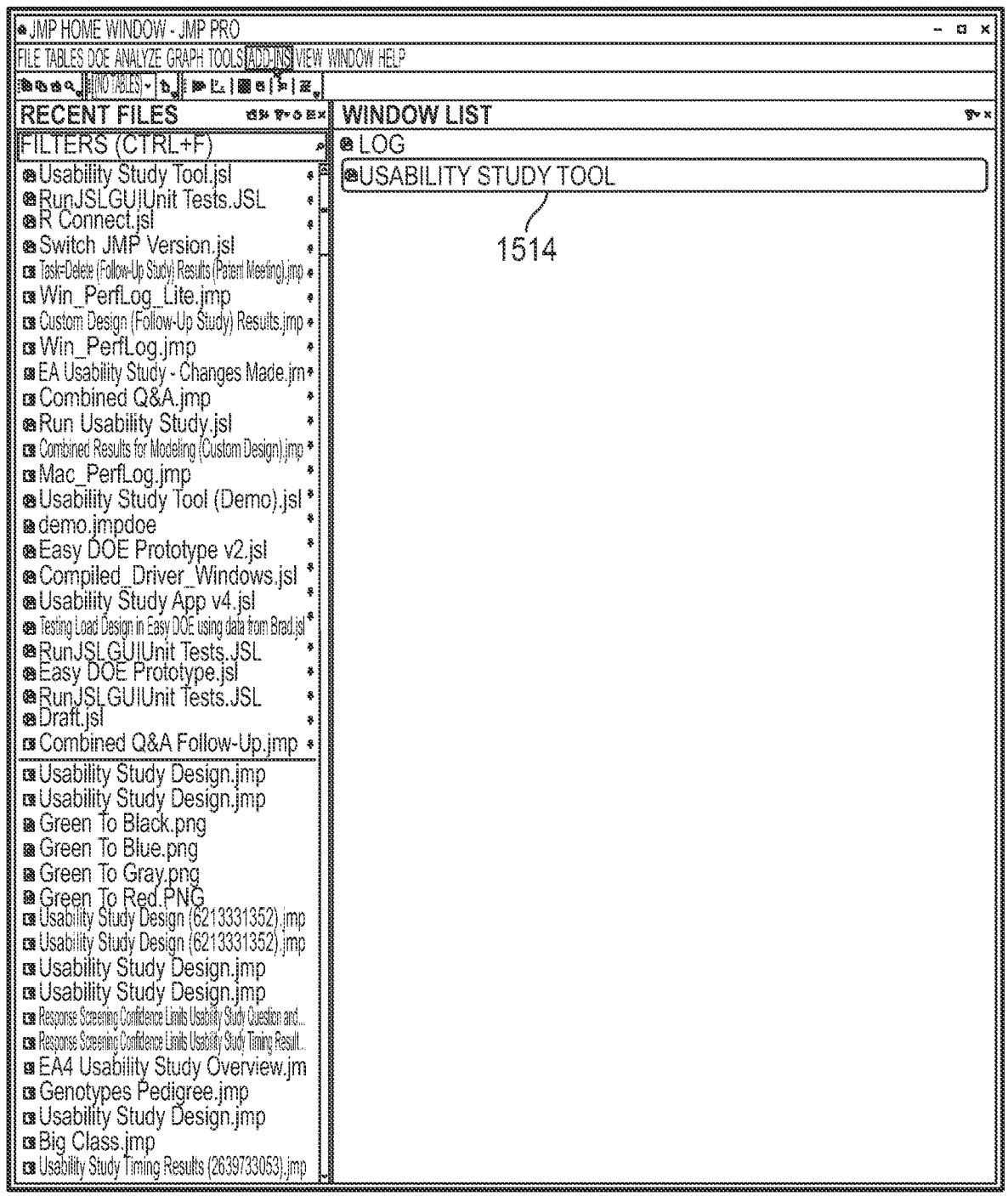
FIG. 27 illustrates an example of deploying a computer-executable application as a software extension according to at least one embodiment of the present technology.

Referring to FIG. 7, in some embodiments, method 700 may include process 740 that deploys the computer-executable application to a target computing environment for execution by one or more users. Process 740, in some embodiments, the target computing environment may correspond to a statistical software application. For instance, in the example of FIG. 27, process 740 deploys the computer-executable application 1514 illustrated in FIG. 15 as a software extension that is accessible via a statistical software application 2700.

In some embodiments, the computer-executable application 1514 may be launchable from the statistical software application 2700. For instance, in the example of FIG. 27, process 740 may launch the computer-executable application 1514 upon receiving such a request from the statistical software application 2700. Process 740, in some embodiments, may receive a request to launch the computer-executable application 1514 when the statistical software application 2700 receives an input selecting the computer-executable application 1514. As previously described with respect to FIGS. 25 and 26, the computer-executable application 1514, when executed, may sequentially present a plurality of application usability tests for a user to complete (e.g., the plurality of application usability tests 1206a-1206d illustrated in FIG. 12, the plurality of application usability tests 1302a-1302h illustrated in FIG. 13, or the plurality of application usability tests 1402 and 1404 illustrated in FIG. 14).

It shall be noted that the system and methods of the embodiment and variations described herein can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, memory sticks (e.g., SD cards, USB flash drives), cloud-based services (e.g., cloud storage), magnetic storage devices, Solid-State Drives (SSDs), or any suitable device. The computer-executable component is preferably a general or application-specific processor, but any suitable dedicated hardware or hardware/firmware combination device can alternatively or additionally execute the instructions.

The systems and methods of the preferred embodiments may additionally, or alternatively, be implemented on an integrated data analytics software application and/or software architecture such as those offered by SAS Institute Inc. or JMP Statistical Discovery LLC of Cary, N.C., USA. Merely for illustration, the systems and methods of the preferred embodiments may be implemented using or integrated with one or more software tools such as JMP®, which is developed and provided by JMP Statistical Discovery LLC.

Although omitted for conciseness, the preferred embodiments include every combination and permutation of the implementations of the systems and methods described herein.

As a person skilled in the art will recognize from the previous detailed description and from the figures and claims, modifications and changes can be made to the embodiments of the disclosure without departing from the scope of the various described embodiments.

What is claimed is:

1. A computer-program product embodied in a non-transitory machine-readable storage medium storing computer instructions that, when executed by one or more processors, perform operations comprising:

receiving, via a user interface, user input selecting a respective usability study option;

obtaining application configuration data specifying a set of possible configurations for one or more features of an application;

determining, from the application configuration data, a set of application usability tests associated with the application;

selecting, via an execution of a designed experiment, a plurality of application usability tests from the set of application usability tests that optimally assess the one or more features of the application, wherein the plurality of application usability tests include a usability task factor;

collecting, via the user interface, a first computer-executable script and one or more first usability questions for a first level of the usability task factor;

collecting, via the user interface, a second computer-executable script and one or more second usability questions for a second level of the usability task factor, wherein the second computer-executable script and the one or more second usability questions are collected in a different task configuration panel of the user interface than the first computer-executable script and the one or more first usability questions;

generating a computer-executable application based at least on the plurality of application usability tests, wherein the computer-executable application is of a first usability study type when the respective usability study option corresponds to a first usability study option, of a second usability study type when the respective usability study option corresponds to a second usability study option, and configured to:

present the plurality of application usability tests in a sequence determined by the designed experiment, present, during a first respective application usability test of the plurality of application usability tests, the one or more first usability questions and one or more first instances of the application that satisfy first usability test conditions of the first respective application usability test, wherein the one or more first instances of the application:

are dynamically generated at a beginning of the first respective application usability test using the first computer-executable script with the first usability test conditions as input; and includes one or more first user interface objects based on the first computer-executable script processing a first value of an application-configuration factor specified in the first usability test conditions, present, during a second respective application usability test of the plurality of application usability tests, the one or more second usability questions and one or more second instances of the application that satisfy second usability test conditions of the second respective application usability test, wherein the one or more second instances of the application:

are dynamically generated at a beginning of the second respective application usability test using the second computer-executable script with the second usability test conditions as input; and includes one or more second user interface objects based on the second computer-executable script processing a second value of the application-configuration factor specified in the second usability test conditions, and collect activity data associated with one or more user operations during one or more of the plurality of application usability tests;

deploying the computer-executable application to a target computing environment for execution by one or more users; and receiving, via the computer-executable application, one or more second user inputs interacting with the one or more first user interface objects and the one or more second user interface objects to perform the first respective application usability test and the second respective application usability test.

2. The computer-program product according to claim 1, wherein:

the computer-executable application is of a third usability study type when the respective usability study option corresponds to a third usability study option, and when the respective usability study option corresponds to the third usability study option:

the application configuration data includes a plurality of graphical representations of different configurations of the application, and the computer-executable application is a computer-executable choice usability study application.

3. The computer-program product according to claim 1, wherein:

second application configuration data includes a plurality of graphical representations of different configurations of the application, and a third respective application usability test of a second plurality of application usability tests defines:

a set of graphical representations from the plurality of graphical representations to present via a second computer-executable application;

a visual layout for presenting the set of graphical representations to the one or more users; and an exercise order value that defines when the second computer-executable application is to present the third respective application usability test.

4. The computer-program product according to claim 3, wherein:

the designed experiment corresponds to a MaxDiff designed experiment when a total number of graphical representations included in the second application configuration data exceeds a pre-determined number of graphical representations, and the designed experiment corresponds to a Choice designed experiment when the total number of graphical representations does not exceed the pre-determined number of graphical representations.

5. The computer-program product according to claim 4, wherein:

when presenting the third respective application usability test selected by the MaxDiff designed experiment, the second computer-executable application is configured to prompt the one or more users to select a preferred graphical representation and a least preferred graphical representation from the set of graphical representations specified by the third respective application usability test selected by the MaxDiff designed experiment, and when presenting the third respective application usability test selected by the Choice designed experiment, the second computer-executable application is configured to prompt the one or more users to select the preferred graphical representation from the set of graphical representations specified by the third respective application usability test selected by the Choice designed experiment.

6. The computer-program product according to claim 1, wherein:

when the respective usability study option corresponds to the first usability study option:

the application configuration data includes:

the usability task factor defining one or more usability tasks, one or more second application-configuration factors that each relate to a distinct configurable feature of the application and enumerate possible configurations of the distinct configurable feature, and one or more response variables that each define a usability objective; and the computer-executable application is a computer-executable comparative usability study application.

7. The computer-program product according to claim 1, wherein:

the application configuration data defines a plurality of design of experiment factors, including the usability task factor and one or more second application-configuration factors, the designed experiment selects the plurality of application usability tests via an optimal design of experiments module, and the first respective application usability test of the plurality of application usability tests selected via the optimal design of experiments module defines:

a value of the usability task factor during the first respective application usability test, a value for each of the one or more second application-configuration factors during the first respective application usability test, an exercise order value that defines when the computer-executable application is to present the first respective application usability test, and a participant value that specifies which of the one or more users is to complete the first respective application usability test.

8. The computer-program product according to claim 1, wherein:

the plurality of application usability tests include a third respective application usability test, and the computer-executable application is further configured to:

present, during the third respective application usability test, one or more third instances of the application, wherein presenting the one or more third instances of the application includes presenting a first instance of the one or more third instances that is dynamically generated based on values of one or more second application-configuration factors in the third respective application usability test.

9. The computer-program product according to claim 8, wherein:

the third respective application usability test further includes the usability task factor with a value corresponding to a respective usability task, and the first instance of the one or more third instances is configured to receive one or more third user inputs for performing the respective usability task.

10. The computer-program product according to claim 8, wherein:
the plurality of application usability tests include a fourth respective application usability test,
values of the one or more second application-configuration factors in the fourth respective application usability test are different from the values of the one or more second application-configuration factors in the third respective application usability test, and
the computer-executable application is further configured to:
present, during the fourth respective application usability test, one or more fourth instances of the application, wherein presenting the one or more fourth representative-instances of the application includes presenting a second instance of the one or more fourth instances, different from the first instance of the one or more third instances, that is dynamically generated based on the values of the one or more second application-configuration factors in the fourth respective application usability test.

11. The computer-program product according to claim 1, wherein:
presenting the plurality of application usability tests in the sequence determined by the designed experiment includes:
presenting the first respective application usability test before the second respective application usability test if an exercise order value defined in the first respective application usability test is smaller than an exercise order value defined in the second respective application usability test, and
presenting the first respective application usability test after the second respective application usability test if the exercise order value of the first respective application usability test is larger than the exercise order value of the second respective application usability test.

12. The computer-program product according to claim 1, wherein:
a second plurality of application usability tests include a third respective application usability test, and
a second computer-executable application is configured to:
present, during the third respective application usability test, one or more third instances of the application, wherein presenting the one or more third instances of the application includes:
presenting a set of graphical representations associated with the third respective application usability test, wherein the set of graphical representations are presented according to a visual layout defined by the third respective application usability test, and
presenting the set of graphical representations in association with one or more selectable user interface elements that are configured to receive a third user input indicating a preferred graphical representation and a least preferred graphical representation from the set of graphical representations.

13. The computer-program product according to claim 1, wherein:
when the respective usability study option corresponds to the second usability study option:
the application configuration data includes the usability task factor defining one or more usability tasks, and
the computer-executable application is a computer-executable observational usability study application.

14. The computer-program product according to claim 1, wherein:
deploying the computer-executable application includes deploying the computer-executable application as a software extension that is accessible to the computer-program product.

15. The computer-program product according to claim 1, wherein:
the computer-executable application, once deployed, is launchable by the one or more users, and
when launched, the computer-executable application presents the plurality of application usability tests in the sequence determined by the designed experiment and collects the activity data associated with the one or more user operations received during a presentation of one or more of the plurality of application usability tests.

16. A computer-implemented method comprising:
receiving, via a user interface, user input selecting a respective usability study option;
obtaining application configuration data specifying a set of possible configurations for one or more features of an application;
determining, from the application configuration data, a set of application usability tests associated with the application;
selecting, via an execution of a designed experiment, a plurality of application usability tests from the set of application usability tests that optimally assess the one or more features of the application, wherein the plurality of application usability tests include a usability task factor;
collecting, via the user interface, a first computer-executable script and one or more first usability questions for a first level of the usability task factor;
collecting, via the user interface, a second computer-executable script and one or more second usability questions for a second level of the usability task factor, wherein the second computer-executable script and the one or more second usability questions are collected in a different task configuration panel of the user interface than the first computer-executable script and the one or more first usability questions;
generating a computer-executable application based at least on the plurality of application usability tests, wherein the computer-executable application is of a first usability study type when the respective usability study option corresponds to a first usability study option, of a second usability study type when the respective usability study option corresponds to a second usability study option, and configured to:
present the plurality of application usability tests in a sequence determined by the designed experiment,
present, during a first respective application usability test of the plurality of application usability tests, the one or more first usability questions and one or more first instances of the application that satisfy first usability test conditions of the first respective application usability test, wherein the one or more first instances of the application:
are dynamically generated at a beginning of the first respective application usability test using the first computer-executable script with the first usability test conditions as input; and includes one or more first user interface objects based on the first computer-executable script processing a first value of an application-configuration factor specified in the first usability test conditions, present, during a second respective application usability test of the plurality of application usability tests, the one or more second usability questions and one or more second instances of the application that satisfy second usability test conditions of the second respective application usability test, wherein the one or more second instances of the application:

are dynamically generated at a beginning of the second respective application usability test using the second computer-executable script with the second usability test conditions as input; and includes one or more second user interface objects based on the second computer-executable script processing a second value of the application-configuration factor specified in the second usability test conditions, and collect activity data associated with one or more user operations during one or more of the plurality of application usability tests;

deploying the computer-executable application to a target computing environment for execution by one or more users; and receiving, via the computer-executable application, one or more second user inputs interacting with the one or more first user interface objects and the one or more second user interface objects to perform the first respective application usability test and the second respective application usability test.

17. The computer-implemented method according to claim 16, wherein:

the computer-executable application is of a third usability study type when the respective usability study option corresponds to a third usability study option, and when the respective usability study option corresponds to the third usability study option:

the application configuration data includes a plurality of graphical representations of different configurations of the application, and the computer-executable application is a computer-executable choice usability study application.

18. The computer-implemented method according to claim 16, wherein:

second application configuration data includes a plurality of graphical representations of different configurations of the application, and a third respective application usability test of a second plurality of application usability tests defines:

a set of graphical representations from the plurality of graphical representations to present via a second computer-executable application;

a visual layout for presenting the set of graphical representations to the one or more users; and an exercise order value that defines when the second computer-executable application is to present the third respective application usability test.

19. The computer-implemented method according to claim 18, wherein:

the designed experiment corresponds to a MaxDiff designed experiment when a total number of graphical representations included in the second application configuration data exceeds a pre-determined number of graphical representations, and the designed experiment corresponds to a Choice designed experiment when the total number of graphical representations does not exceed the pre-determined number of graphical representations.

20. The computer-implemented method according to claim 19, wherein:

when presenting the third respective application usability test selected by the MaxDiff designed experiment, the second computer-executable application is configured to prompt the one or more users to select a preferred graphical representation and a least preferred graphical representation from the set of graphical representations specified by the third respective application usability test selected by the MaxDiff designed experiment, and when presenting the third respective application usability test selected by the Choice designed experiment, the second computer-executable application is configured to prompt the one or more users to select the preferred graphical representation from the set of graphical representations specified by the third respective application usability test selected by the Choice designed experiment.

21. The computer-implemented method according to claim 16, wherein:

when the respective usability study option corresponds to the first usability study option:

the application configuration data includes:

the usability task factor defining one or more usability tasks, one or more second application-configuration factors that each relate to a distinct configurable feature of the application and enumerate possible configurations of the distinct configurable feature, and one or more response variables that each define a usability objective; and the computer-executable application is a computer-executable comparative usability study application.

22. The computer-implemented method according to claim 16, wherein:

the application configuration data defines a plurality of design of experiment factors, including the usability task factor and one or more second application-configuration factors, the designed experiment selects the plurality of application usability tests via an optimal design of experiments module, and the first respective application usability test of the plurality of application usability tests selected via the optimal design of experiments module defines:

a value of the usability task factor during the first respective application usability test, a value for each of the one or more second application-configuration factors during the first respective application usability test, an exercise order value that defines when the computer-executable application is to present the first respective application usability test, and a participant value that specifies which of the one or more users is to complete the first respective application usability test.

23. A computer-implemented system comprising:
one or more processors;
a memory; and
a computer-readable medium operably coupled to the one or more processors, the computer-readable medium having computer-readable instructions stored thereon that, when executed by the one or more processors, cause a computing device to perform operations comprising:
receiving, via a user interface, user input selecting a respective usability study option;
obtaining application configuration data specifying a set of possible configurations for one or more features of an application;
determining, from the application configuration data, a set of application usability tests associated with the application;
selecting, via an execution of a designed experiment, a plurality of application usability tests from the set of application usability tests that optimally assess the one or more features of the application, wherein the plurality of application usability tests include a usability task factor;
collecting, via the user interface, a first computer-executable script and one or more first usability questions for a first level of the usability task factor;
collecting, via the user interface, a second computer-executable script and one or more second usability questions for a second level of the usability task factor, wherein the second computer-executable script and the one or more second usability questions are collected in a different task configuration panel of the user interface than the first computer-executable script and the one or more first usability questions;
generating a computer-executable application based at least on the plurality of application usability tests, wherein the computer-executable application is of a first usability study type when the respective usability study option corresponds to a first usability study option, of a second usability study type when the respective usability study option corresponds to a second usability study option, and configured to:
  present the plurality of application usability tests in a sequence determined by the designed experiment,
  present, during a first respective application usability test of the plurality of application usability tests, the one or more first usability questions and one or more first instances of the application that satisfy first usability test conditions of the first respective application usability test, wherein the one or more first instances of the application:
    are dynamically generated at a beginning of the first respective application usability test using the first computer-executable script with the first usability test conditions as input; and
    includes one or more first user interface objects based on the first computer-executable script processing a first value of an application-configuration factor specified in the first usability test conditions,
  present, during a second respective application usability test of the plurality of application usability tests, the one or more second usability questions and one or more second instances of the application that satisfy second usability test conditions of the second respective application usability test, wherein the one or more second instances of the application:
    are dynamically generated at a beginning of the second respective application usability test using the second computer-executable script with the second usability test conditions as input; and
    includes one or more second user interface objects based on the second computer-executable script processing a second value of the application-configuration factor specified in the second usability test conditions, and
  collect activity data associated with one or more user operations during one or more of the plurality of application usability tests;
deploying the computer-executable application to a target computing environment for execution by one or more users; and
receiving, via the computer-executable application, one or more second user inputs interacting with the one or more first user interface objects and the one or more second user interface objects to perform the first respective application usability test and the second respective application usability test.

24. The computer-implemented system according to claim 23, wherein:
the application configuration data defines a plurality of design of experiment factors, including the usability task factor and one or more second application-configuration factors,
the designed experiment selects the plurality of application usability tests via an optimal design of experiments module, and
the first respective application usability test of the plurality of application usability tests selected via the optimal design of experiments module defines:
  a value of the usability task factor during the first respective application usability test,
  a value for each of the one or more second application-configuration factors during the first respective application usability test,
  an exercise order value that defines when the computer-executable application is to present the first respective application usability test, and
  a participant value that specifies which of the one or more users is to complete the first respective application usability test.

25. The computer-implemented system according to claim 23, wherein:
the plurality of application usability tests include a third respective application usability test, and
the computer-executable application is further configured to:
  present, during the third respective application usability test, one or more third instances of the application, wherein presenting the one or more third instances of the application includes presenting a first instance of the one or more third instances that is dynamically generated based on values of one or more second application-configuration factors in the third respective application usability test.

26. The computer-implemented system according to claim 25, wherein:
the third respective application usability test further includes the usability task factor with a value corresponding to a respective usability task, and
the first instance of the one or more third instances is configured to receive one or more third user inputs for performing the respective usability task.

27. The computer-implemented system according to claim 25, wherein:

the plurality of application usability tests include a fourth respective application usability test, values of the one or more second application-configuration factors in the fourth respective application usability test are different from the values of the one or more second application-configuration factors in the third respective application usability test, and the computer-executable application is further configured to:

present, during the fourth respective application usability test, one or more fourth instances of the application, wherein presenting the one or more fourth instances of the application includes presenting a second instance of the one or more fourth instances, different from the first instance of the one or more third instances, that is dynamically generated based on the values of the one or more second application-configuration factors in the fourth respective application usability test.

28. The computer-implemented system according to claim 23, wherein:

presenting the plurality of application usability tests in the sequence determined by the designed experiment includes:

presenting the first respective application usability test before the second respective application usability test if an exercise order value defined in the first respective application usability test is smaller than an exercise order value defined in the second respective application usability test, and presenting the first respective application usability test after the second respective application usability test if the exercise order value of the first respective application usability test is larger than the exercise order value of the second respective application usability test.

29. The computer-implemented system according to claim 23, wherein:

a second plurality of application usability tests include a third respective application usability test, and a second computer-executable application is configured to:

present, during the third respective application usability test, one or more third instances of the application, wherein presenting the one or more third instances of the application includes:

presenting a set of graphical representations associated with the third respective application usability test, wherein the set of graphical representations are presented according to a visual layout defined by the third respective application usability test, and presenting the set of graphical representations in association with one or more selectable user interface elements that are configured to receive a third user input indicating a preferred graphical representation and a least preferred graphical representation from the set of graphical representations.

30. The computer-implemented system according to claim 23, wherein:

when the respective usability study option corresponds to the second usability study option:

the application configuration data includes the usability task factor defining one or more usability tasks, and the computer-executable application is a computer-executable observational usability study application.

31. A computer-program product embodied in a non-transitory machine-readable storage medium storing computer instructions that, when executed by one or more processors, perform operations comprising:

receiving, via a user interface, user input selecting a respective usability study option;

obtaining application configuration data specifying a set of possible configurations for one or more features of an application;

determining, from the application configuration data, a set of application usability tests associated with the application;

selecting, via an execution of a designed experiment, a plurality of application usability tests from the set of application usability tests that optimally assess the one or more features of the application, wherein the plurality of application usability tests include a usability task factor;

when the respective usability study option corresponds to a first usability study option or a second usability study option:

collecting, via the user interface, a first computer-executable script and one or more first usability questions for a first level of the usability task factor;

collecting, via the user interface, a second computer-executable script and one or more second usability questions for a second level of the usability task factor, wherein the second computer-executable script and the one or more second usability questions are collected in a different task configuration panel of the user interface than the first computer-executable script and the one or more first usability questions;

generating a computer-executable application based at least on the plurality of application usability tests, wherein the computer-executable application is of a first usability study type when the respective usability study option corresponds to the first usability study option, of a second usability study type when the respective usability study option corresponds to the second usability study option, and configured to:

present the plurality of application usability tests in a sequence determined by the designed experiment, present, during a first respective application usability test of the plurality of application usability tests, the one or more first usability questions and one or more first instances of the application that satisfy first usability test conditions of the first respective application usability test, wherein the one or more first instances of the application are dynamically generated at a beginning of the first respective application usability test using the first computer-executable script with the first usability test conditions as input, present, during a second respective application usability test of the plurality of application usability tests, the one or more second usability questions and one or more second instances of the application that satisfy second usability test conditions of the second respective application usability test, wherein the one or more second instances of the application are dynamically generated at a beginning of the second respective application usability test using the second computer-executable script with the second usability test conditions as input, and collect activity data associated with one or more user operations during one or more of the plurality of application usability tests; and deploying the computer-executable application to a target computing environment for execution by one or more users; and when the respective usability study option corresponds to a third usability study option:

receiving the plurality of application usability tests at an application generation and encoding module; and based on the application generation and encoding module receiving the plurality of application usability tests:

automatically setting, via the application generation and encoding module, a visual layout for presenting the application configuration data, automatically setting, via the application generation and encoding module, one or more in-task usability test questions or one or more post-usability test questions associated with the plurality of application usability tests, and automatically creating, via the application generation and encoding module, a second computer-executable application based at least on the automatically setting of the visual layout, the one or more in-task usability test questions, or the one or more post-usability test questions.

* * * * *